United States Patent
DiFazio et al.

(10) Patent No.: US 10,567,147 B2
(45) Date of Patent: Feb. 18, 2020

(54) FULL DUPLEX SINGLE CHANNEL COMMUNICATIONS

(71) Applicant: IDAC Holdings, Inc., Wilmington, DE (US)

(72) Inventors: Robert A. DiFazio, Greenlawn, NY (US); Philip J. Pietraski, Jericho, NY (US); Rui Yang, Greenlawn, NY (US); Erdem Bala, Farmingdale, NY (US); Jialing Li, San Diego, CA (US)

(73) Assignee: IDAC Holdings, Inc., Wilmington, DE (US)

( * ) Notice: Subject to any disclaimer, the term of this patent is extended or adjusted under 35 U.S.C. 154(b) by 212 days.

(21) Appl. No.: 14/424,740

(22) PCT Filed: Aug. 27, 2013

(86) PCT No.: PCT/US2013/056892
§ 371 (c)(1),
(2) Date: Feb. 27, 2015

(87) PCT Pub. No.: WO2014/036025
PCT Pub. Date: Mar. 6, 2014

(65) Prior Publication Data
US 2015/0229461 A1    Aug. 13, 2015

Related U.S. Application Data

(60) Provisional application No. 61/694,094, filed on Aug. 28, 2012, provisional application No. 61/817,838, (Continued)

(51) Int. Cl.
*H04B 7/14* (2006.01)
*H04L 5/14* (2006.01)

(52) U.S. Cl.
CPC ................................. *H04L 5/14* (2013.01)

(58) Field of Classification Search
USPC ......... 370/276-282, 293-295, 321, 347, 329
See application file for complete search history.

(56) References Cited

U.S. PATENT DOCUMENTS 6,810,022 B1 *  10/2004  Young ................. H04B 7/2656
                                                               370/280
7,817,641 B1     10/2010  Khandani
(Continued)

FOREIGN PATENT DOCUMENTS

WO    WO 02/41520 A2    5/2002
WO    WO 2012/106263 A1    8/2012

OTHER PUBLICATIONS

Choi et al., "Achieving Single Channel, Full Duplex Wireless Communication", In Proceedings of the Sixteenth Annual International Conference on Mobile Computing and Networking, MobiCom '10, ACM, Sep. 20-24, 2010, pp. 1-12.
(Continued)

*Primary Examiner* — Hanh N Nguyen
(74) *Attorney, Agent, or Firm* — Condo Roccia Koptiw LLP

(57) ABSTRACT

Embodiments contemplate TDD systems and techniques where timeslots may be allocated as DL, UL, or FDSC; the base station (BS) may be full duplex singled channel (FDSC) capable; and some, all, or none of the UEs (or WTRUs) may be FDSC capable. In one or more embodiments, FDSC1 timeslots may be contemplated that may be used (in some embodiments perhaps exclusively used) by a pair of radios, for example one BS and one UE, both having FD capability. In one or more embodiments, FDSC timeslots may be shared among a BS with FDSC capability and two or more UEs, that may be half duplex (HD). Embodiments also contemplate various FDD systems and techniques, including full duplex FDD systems and techniques.

4 Claims, 32 Drawing Sheets

Related U.S. Application Data filed on Apr. 30, 2013, provisional application No. 61/824,326, filed on May 16, 2013.

(56) References Cited

U.S. PATENT DOCUMENTS

| | | | | |
|---|---|---|---|---|
| 8,165,046 | B2* | 4/2012 | Stanwood | H04B 7/2615 370/280 |
| 8,542,617 | B2* | 9/2013 | Choi | H04W 72/121 370/296 |
| 9,398,592 | B2* | 7/2016 | Eriksson | H04W 8/08 |
| 9,497,770 | B2* | 11/2016 | Wilkinson | H04W 72/1226 |
| 2007/0041347 | A1 | 2/2007 | Beale et al. | |
| 2009/0028074 | A1 | 1/2009 | Knox | |
| 2009/0274072 | A1 | 11/2009 | Knox | |
| 2012/0063373 | A1 | 3/2012 | Chincholi et al. | |
| 2012/0155436 | A1* | 6/2012 | Lindoff | H04W 72/1257 370/336 |
| 2013/0188530 | A1* | 7/2013 | Pirskanen | H04W 72/0453 370/280 |
| 2013/0188536 | A1* | 7/2013 | Pirskanen | H04W 72/0453 370/281 |

OTHER PUBLICATIONS

3rd Generation Partnership Project (3GPP), RWS-120010, "Requirements, Candidate Solutions & Technology Roadmap for LTE Rel-12 Onward", NTT docomo, 3GPP Workshop on Release 12 and Onwards Ljubljana, Slovenia, Jun. 11-12, 2012, 27 pages.

3rd Generation Partnership Project (3GPP), RWS-120039, "Evolving RAN Towards Rel-12 and Beyond", Sharp Corporation, 3GPP RAN Workshop on Release 12 Onward, Ljubljana, Slovenia, Jun. 11-12, 2012, 11 pages.

3rd Generation Partnership Project (3GPP), RWS-120047, "KDDI's Views on LTE Rel.12 and Onwards", KDDI Corporation, 3GPP RAN Workshop, Jun. 11-12, 2012, 27 pages.

3rd Generation Partnership Project (3GPP), TS 36.101 V10.5.0, "Technical Specification Group Radio Access Network, Evolved Universal Terrestrial Radio Access (E-UTRA), User Equipment (UE) Radio Transmission and Reception (Release 10)", Dec. 2011, 288 pages.

3rd Generation Partnership Project (3GPP), TS 36.211 V10.5.0, "Technical Specification Group Radio Access Network, Evolved Universal Terrestrial Radio Access (E-UTRA), Physical Channels and Modulation (Release 10)", Jun. 2012, 101 pages.

Difazio et al., "The Bandwidth Crunch: Can Wireless Technology Meet the Skyrocketing Demand for Mobile Data?", IEEE Long Island Systems, Applications and Technology Conference (LISAT), May 6, 2011, 6 pages.

Duarte et al., "Full-Duplex Wireless Communications Using Off-The-Shelf Radios: Feasibility and First Results", Conference Record of the Forty Fourth Asilomar Conference on Signals, Systems and Computers (ASILOMAR), Nov. 7-10, 2010, pp. 1558-1562.

Gutierrez, Jose, "IEEE 802.15.4 Tutorial", Project: IEEE P802.15 Working Group for Wireless Personal Area Networks (WPANs), IEEE 802.15-03/036r0, Jan. 4, 2003, 26 pages.

Haque, "1350MHz UMTS-FDD UE Radio Feasibility Study Report (Release 2)", Document No. RP79726, InterDigital Communications, LLC, 2007, 181 pages.

ISO/IEC/IEEE, "IEEE Standard for Information Technology—Telecommunications and Information Exchange between Systems—Specific Requirements, Part 11: Wireless LAN Medium Access Control (MAC) and Physical Layer (PHY) Specifications", IEEE Std 802.11 2012, ISO/IEC/IEEE 8802-11:2012(E), Feb. 6, 2012, 7 pages.

Jain et al., "Practical, Real-time, Full Duplex Wireless", In Proceedings of the 17th Annual International Conference on Mobile Computing and Networking, Mobicom, Sep. 19-23, 2011, 12 pages.

Khandani, Amir K., "Two Way Wireless", E&CE Department, University of Waterloo, Apr. 25, 2012, 90 pages.

Kinney, Patrick, "ZigBee Technology: Wireless Control that Simply Works", Communications Design Conference, Oct. 2, 2003, 20 pages.

Knox, M., "Single Antenna Bidirectional Radio Communications", Texas Wireless Summit, Oct. 25, 2011, 15 pages.

Luby, Michael, "LT Codes", Proceedings of the 43rd Symposium on Foundations of Computer Science, IEEE Computer Society Washington, DC, USA, Nov. 16-19, 2002, 10 pages.

Miridakis et al., "A Survey on the Successive Interference Cancellation Performance for Single-Antenna and Multiple-Antenna OFDM Systems", IEEE Communications Surveys & Tutorials, vol. 15, No. 1, Apr. 11, 2012, pp. 312-335.

Mishra et al., "How Much White Space is There?", Department of Electrical Engineering and Computer Sciences, University of California at Berkeley, Technical Report No. UCB/EECS-2009-3, Jan. 11, 2009, 16 pages.

Molisch, A. F., "Wireless Communications", Second Edition, John Wiley & Sons Ltd., 2011, 884 pages.

Perahia et al., "Next Generation Wireless LANs—Throughput, Robustness, and Reliability in 802.11n", Cambridge University Press, 2008, 410 pages.

Prasad et al., "Third Generation Mobile Communication Systems", Artech House, Inc., Norwood, MA, USA, 2000, chapter 7 pp. 191-193.

Radunovic et al., "Rethinking Indoor Wireless: Low Power, Low Frequency, Full-Duplex", Microsoft Research Technical Report-MSR-TR-2009-148, 2009, 7 pages.

Saha! et al., "Pushing the Limits of Full-Duplex: Design and Real-Time Implementation", Rice University Technical Report TREE1104, Jul. 4, 2011, pp. 1-12.

\* cited by examiner

FDD

FDD with a small band gap

FDD with no band gap

FDD with overlapping bands
(non-orthogonal duplexing)

Full Duplex

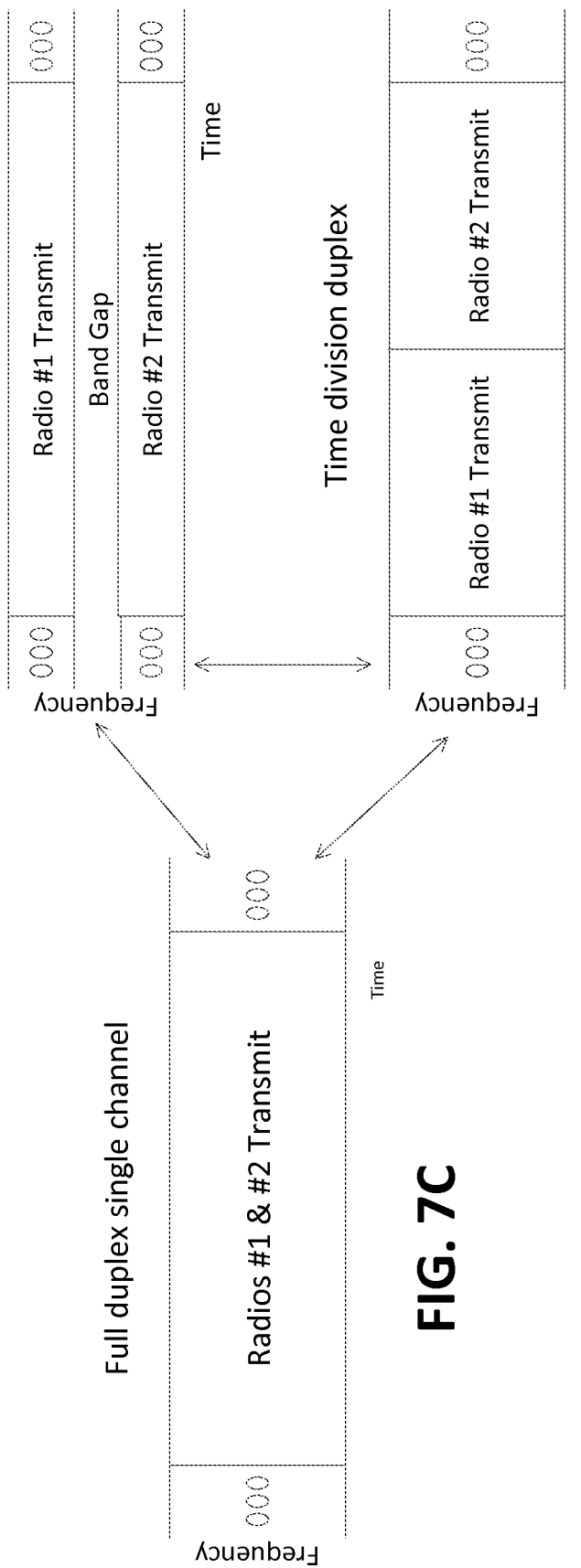

Allocation of uplink and downlink timeslots

Several timeslots allocated to full duplex operation.

Cellular deployment showing a full duplex footprint.

Base station process for FDSC timeslot assignments    WTRU process to assist with FDSC timeslot assignments

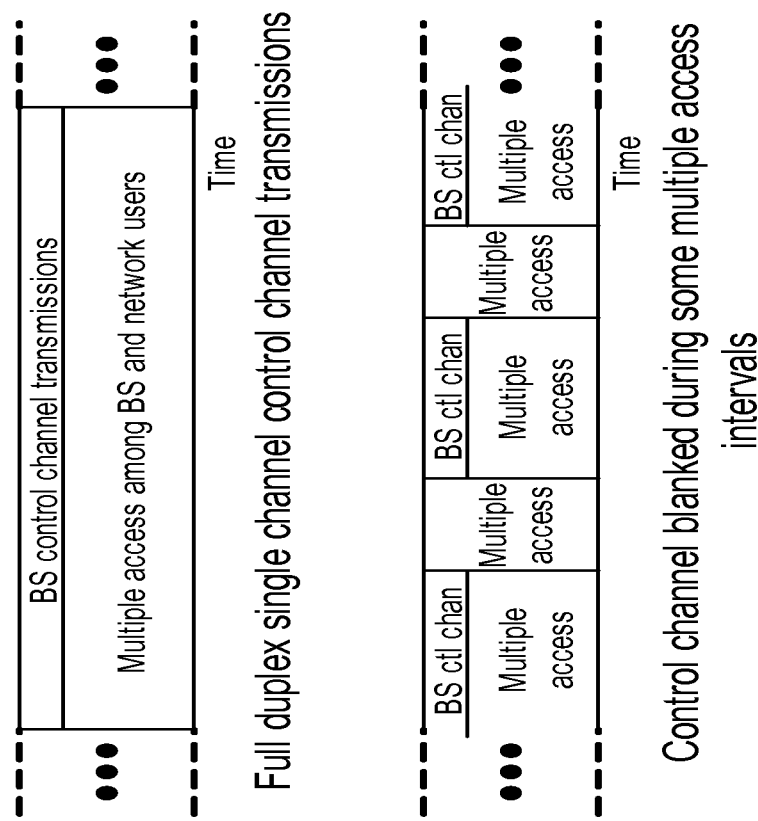
FIG. 15B
Full duplex single channel control channel transmissions
FIG. 15C
Control channel blanked during some multiple access intervals
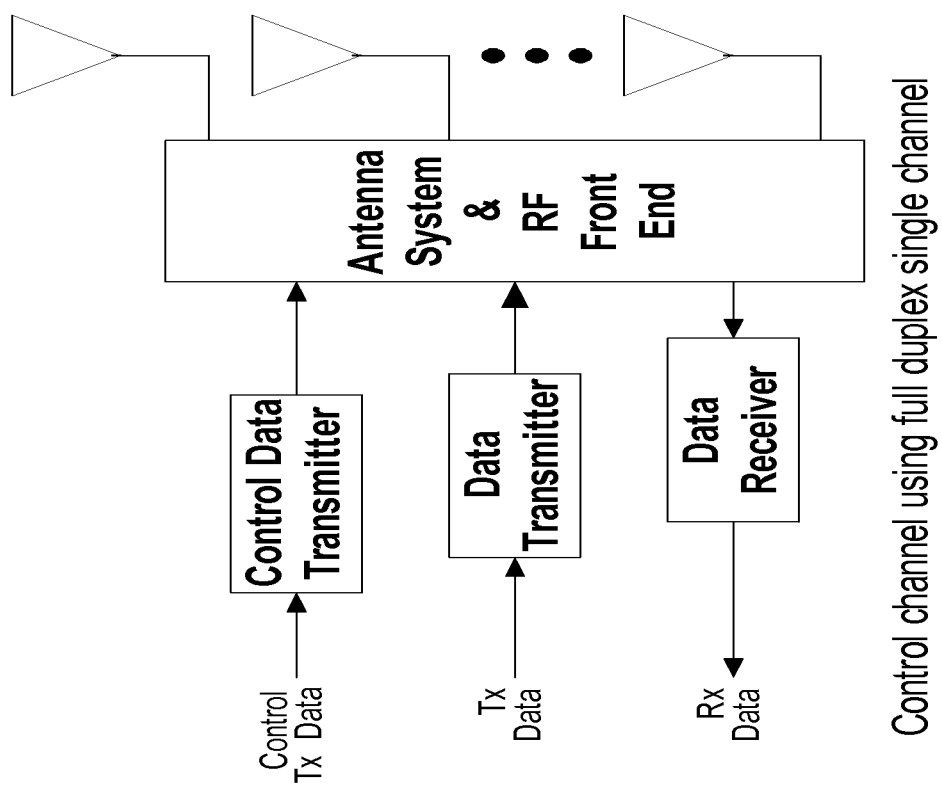
FIG. 15A
Control channel using full duplex single channel Resource blocks allocated to UL and DL operation.

A small band gap.

Clustering varies from slot to slot.

Distributed allocation from slot to slot.

FIG. 21A

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Example configurations

FIG. 21B

| Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 7 | D | S | U | F | F | D | S | U | F | F |
| 8 | D | S | U | F | F | F | F | F | F | F |
| 9 | D | S | U | F | F | D | S | F | F | F |
| 10 | D | S | F | F | F | D | S | U | F | F |
| 11 | D | S | F | F | F | D | S | F | F | F |
| 12 | D | S | U | F | F | F | S | U | F | F |
| 13 | F | S | U | F | F | D | S | U | F | F |
| 14 | F | S | U | F | F | F | S | U | F | F |
| 15 | D | S | U | F | F | F | S | F | F | F |
| 16 | D | S | F | F | F | F | S | F | F | F |
| 17 | F | S | F | F | F | F | S | F | F | F |
| 18 | D | S | F | F | F | F | F | F | F | F |
| 19 | F | S | U | F | F | F | F | F | F | F |
| 20 | F | S | F | F | F | F | F | F | F | F |

Example configurations with FDSC subframes.

FULL DUPLEX SINGLE CHANNEL COMMUNICATIONS

CROSS-REFERENCE TO RELATED APPLICATIONS

This application is the National Stage Entry under 35 U.S.C. § 371 of Patent Cooperation Treaty Application No. PCT/US2013/056892, filed Aug. 27, 2013, which claims the benefit of U.S. Provisional Patent Application No. 61/694,094, filed Aug. 28, 2012, titled "Full Duplex Single Channel Communications", U.S. Provisional Patent Application No. 61/817,838, filed Apr. 20, 2013, titled "Full Duplex Single Channel Communications", and U.S. Provisional Patent Application No. 61/824,326 filed, May 16, 2013 titled "Full Duplex Single Channel Communications", the entire disclosure of each of the four applications hereby incorporated by reference herein, for all purposes.

BACKGROUND

Conventional two-way communication systems separate the transmitted (Tx) and received (Rx) signals at each terminal in time, frequency, or space. Full duplex (FD) systems transmit and receive the radio frequency (RF) signal simultaneously. Most often this may be implemented by frequency division duplexing (FDD) where the Tx and Rx bands may be sufficiently separated in frequency such that filters can adequately attenuate any energy from the Tx signal that would leak into the Rx signal path and otherwise corrupt the Rx signal and prevent proper operation.

Frequency separation of the Tx and Rx bands apply in particular to mobile, portable, or nomadic devices where the antenna position cannot be precisely controlled, or the wavelength is on the order of, or larger, than the dimensions of the devices involved or the area available for antenna mounting.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments contemplate a TDD-type system where timeslots may be allocated as DL, UL, or FDSC; the base station (BS) may be full duplex single channel (FDSC) capable; and some, all, or none of the UEs (or WTRUs) may be FDSC capable. In one or more embodiments, FDSC timeslots may be contemplated that may be used (in some embodiments perhaps exclusively used) by a pair of radios, for example one BS and one UE, both having FD capability. In one or more embodiments, FDSC timeslots may be contemplated that may be shared among a BS with FDSC capability and two or more UEs, that may be half duplex.

Embodiments contemplate FDSC operation that may use a small band gap, zero band gap, partially overlapping Tx/Rx bands, and/or fully overlapping Tx/Rx bands.

Embodiments contemplate one or more measurement procedures that may decide which WTRUs may participate in FDSC operation, and/or to assist in FDSC timeslot assignment.

Embodiments contemplate one or more systems that may maintain a list of network devices that may be FDSC capable.

Embodiments contemplate one or more systems that may maintain a list of FDSC-capable network devices that may be current candidates for FDSC operation based on network topology, interference environment, signal quality, and/or other measurements or estimates of time-varying parameters.

Embodiments contemplate one or more systems that may adapt among FDSC modes of operation, and/or parameters of the FDSC modes.

Embodiments contemplate one or more systems that can operate in FDD and/or FDSC modes, perhaps depending on the available channels and their location. For example, embodiments contemplate a TVWS system that at one time may find several available channels with sufficient spacing for FDD operation, but at other times may find one channel available (and in some embodiments perhaps only one channel) that may support (and in some embodiments must support) two-way communications.

Embodiments contemplate a BS, AP, or other infrastructure device that may be FDSC capable and may transmit a control channel simultaneously with underlying UL or DL communications that may be part of a multiple access protocol.

Embodiments contemplate one or more power control algorithms for systems that may include one or more full duplex base stations and/or one or more full duplex or half duplex user equipment (UEs or wireless transmit/receive units (WTRUs)). Powers of one or more, or all, transmitting nodes, base station and UEs, in one or more, or multiple, cells may be set jointly based on one or more of pathlosses (or path gains), self-interference cancellation capabilities, and/or noise power level.

Embodiments contemplate systems that may comprise a base station. The base station may be configured for full-duplex single channel (FDSC) communication. The systems may also comprise a first wireless transmit/receive unit (WTRU). The first WTRU may be configured for FDSC communication. The first WTRU may communicate with the base station via a first communication channel that may include one or more frames in which one or more timeslots may be allocated to FDSC communication.

Embodiments contemplate systems that may comprise a base station. The base station may be configured for full-duplex single channel (FDSC) communication. The systems may comprise a first wireless transmit/receive unit (WTRU). The first WTRU may be configured for half-duplex (HD) communication. The systems may also comprise a second WTRU. The second WTRU may be configured for HD communication. The first WTRU and the second WTRU may communicate with the base station via a communication channel that may include one or more frames in which one or more respective timeslots may be allocated for either an uplink (UL) or a downlink (DL) for at least one of the first WTRU or the second WTRU.

Embodiments contemplate one or more techniques that may be performed by a base station. The base station may be a node of a wireless communication network and the base station may be in communication with one or more wireless transmit/receive units (WTRUs). Techniques may comprise determining a transmission-reception coupling respectively corresponding to one or more transmission paths. Techniques may also include determining a reception signal quality from the one or more WTRUs. And techniques may also include determining which of the one or more WTRUs may be capable of full-duplex single channel (FDSC) communication based at least on the transmission-reception coupling and reception signal quality.

Embodiments contemplate one or more techniques that may be performed by a wireless transmit/receive unit (WTRU). The WTRU may be in communication with a base station. The base station may be a node of a wireless communication network. Techniques may comprise determining a transmission-reception coupling respectively corresponding to one or more transmission paths. Techniques may also comprise determining a reception signal quality from the base station. Techniques may also comprise determining a capability of full-duplex single channel (FDSC) communication based at least on the transmission-reception coupling and reception signal quality.

Embodiments contemplate techniques that may be performed by a base station. The base station may be a node of a wireless communication network and the base station may be in communication with one or more wireless transmit/receive units (WTRUs). Techniques may comprise determining a transmission-reception coupling respectively corresponding to one or more transmission paths. Techniques may also include determining a reception signal quality from the one or more WTRUs. Techniques may also include determining at least a first WTRU and a second WTRU of the one or more WTRUs in which the first WTRU may capable of downlink (DL) half-duplex (HD) reception in at least one timeslot of a frame, where the second WTRU may use the at least one timeslot of the frame for uplink (UL) HD communication, based at least on the transmission-reception coupling and reception signal quality.

Embodiments contemplate one or more techniques that may include communicating a first uplink (UL) channel of a plurality of UL channels and a first downlink (DL) channel of plurality of DL channels in a frequency division duplex (FDD) communication mode of a base station. Techniques may also include communicating the first UL channel and the first DL channel with the base station from a first wireless transmit/receive unit (WTRU) in an FDD communication mode. The plurality of UL channels may have a first bandwidth and the plurality of DL channels may have a second bandwidth. The plurality of UL channels may have a first band center frequency. The plurality of DL channels may have a second band center frequency. Techniques may also include arranging a duplex spacing of the plurality of UL channels and the plurality of DL channels such that the duplex spacing may be no greater than an arithmetical average of the first bandwidth and the second bandwidth.

Embodiments contemplate a wireless transmit/receive unit (WTRU) that may be capable of full duplex single channel communication. The WTRU may comprise a processor that may be configured to at least apply at least one of a first preconfigured data to the an antenna interference suppression process, a second preconfigured data to a digital interference suppression process, and/or a third preconfigured data to an analog interference suppression process. At least one of the first preconfigured data, the second preconfigured data, or the third preconfigured data may provide an initial level of suppression.

Embodiments contemplate one or more techniques that may comprise configuring a base station for full-duplex single channel (FDSC) communication. Techniques may also comprise configuring a first wireless transmit/receive unit (WTRU) for FDSC communication. Techniques may also comprise allocating one or more timeslots of one or more frames of a first communication channel to FDSC communication. Techniques may also include communicating between the first WTRU and the base station via the first communication channel.

Embodiments contemplate one or more techniques that may comprise configuring a base station for full-duplex single channel (FDSC) communication. Techniques may also comprise configuring a first wireless transmit/receive unit (WTRU) for half-duplex (HD) communication. Techniques may also comprise configuring a second WTRU for HD communication. Technique may also comprise allocating one or more respective timeslots of one or more frames of a communication channel for either an uplink (UL) or a downlink (DL) for at least one of the first WTRU or the second WTRU. Techniques may also include communicating between the first WTRU and the second WTRU with the base station via the communication channel.

BRIEF DESCRIPTION OF THE DRAWINGS

A more detailed understanding may be had from the following description, given by way of example in conjunction with the accompanying drawings wherein:

FIGS. 7A-7E illustrate elements of an exemplary FDSC system that can adapt duplexing parameters among other duplexing techniques consistent with embodiments;

FIGS. 15A-15C illustrate a control channel as an example of an auxiliary signal using FDSC consistent with embodiments;

FIGS. 21A-21B illustrate example timeslot configuration alternatives in the TDD mode of LTE, consistent with embodiments;

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application. As used herein, the article "a" or "an", absent further qualification or characterization, may be understood to mean "one or more" or "at least one", for example.

Figure 1A:
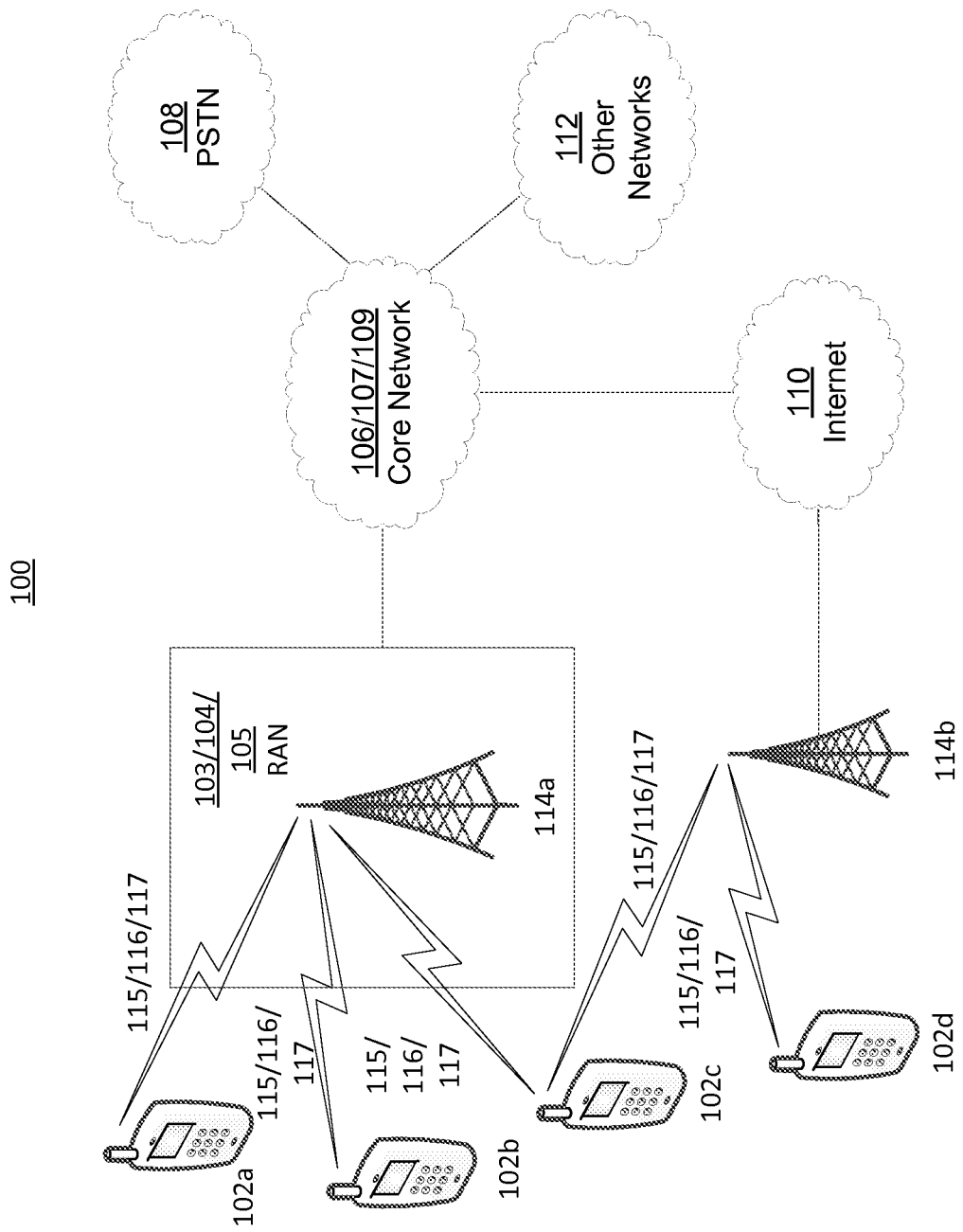
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a tablet, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more, or all, of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
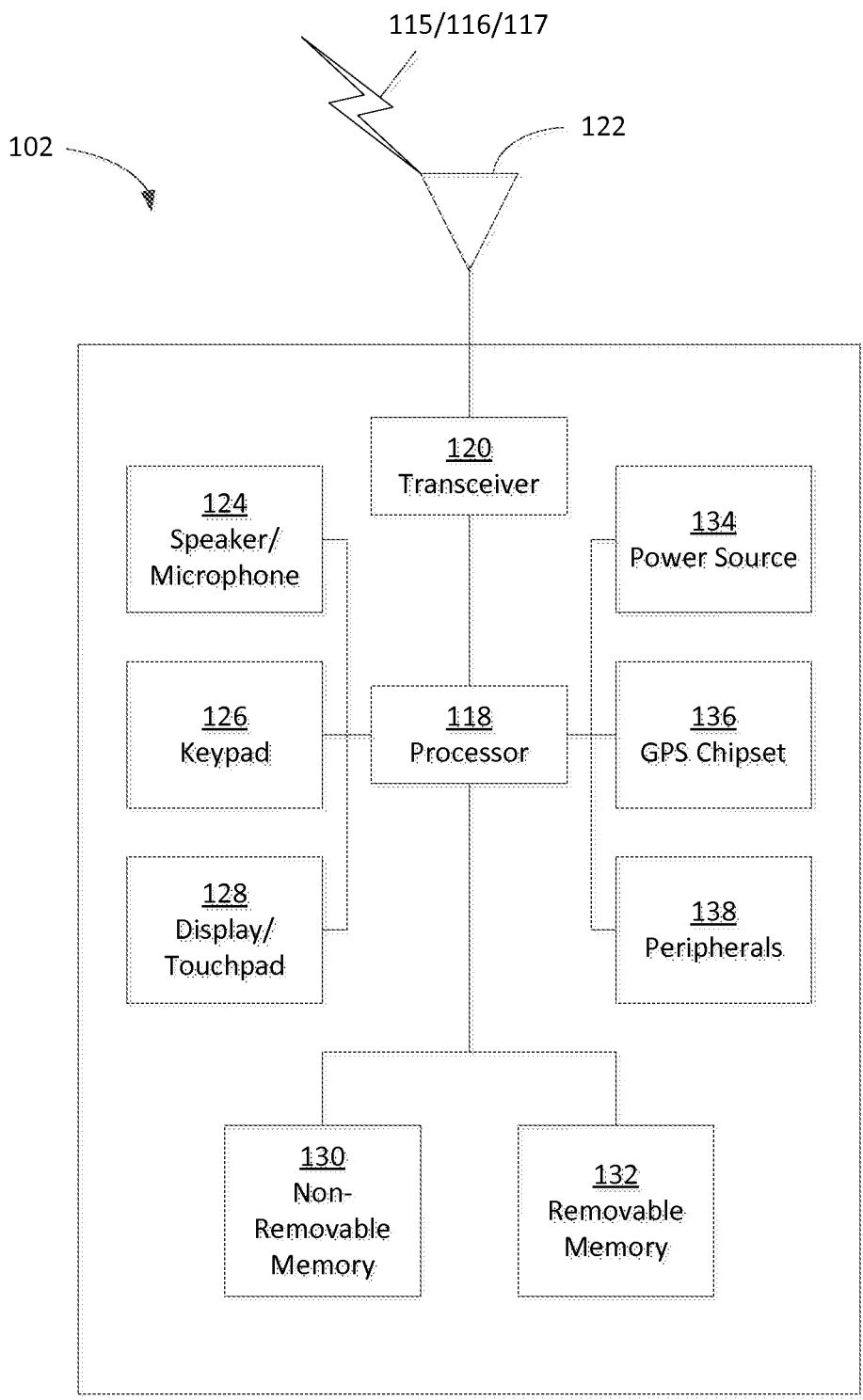
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more, or all, of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
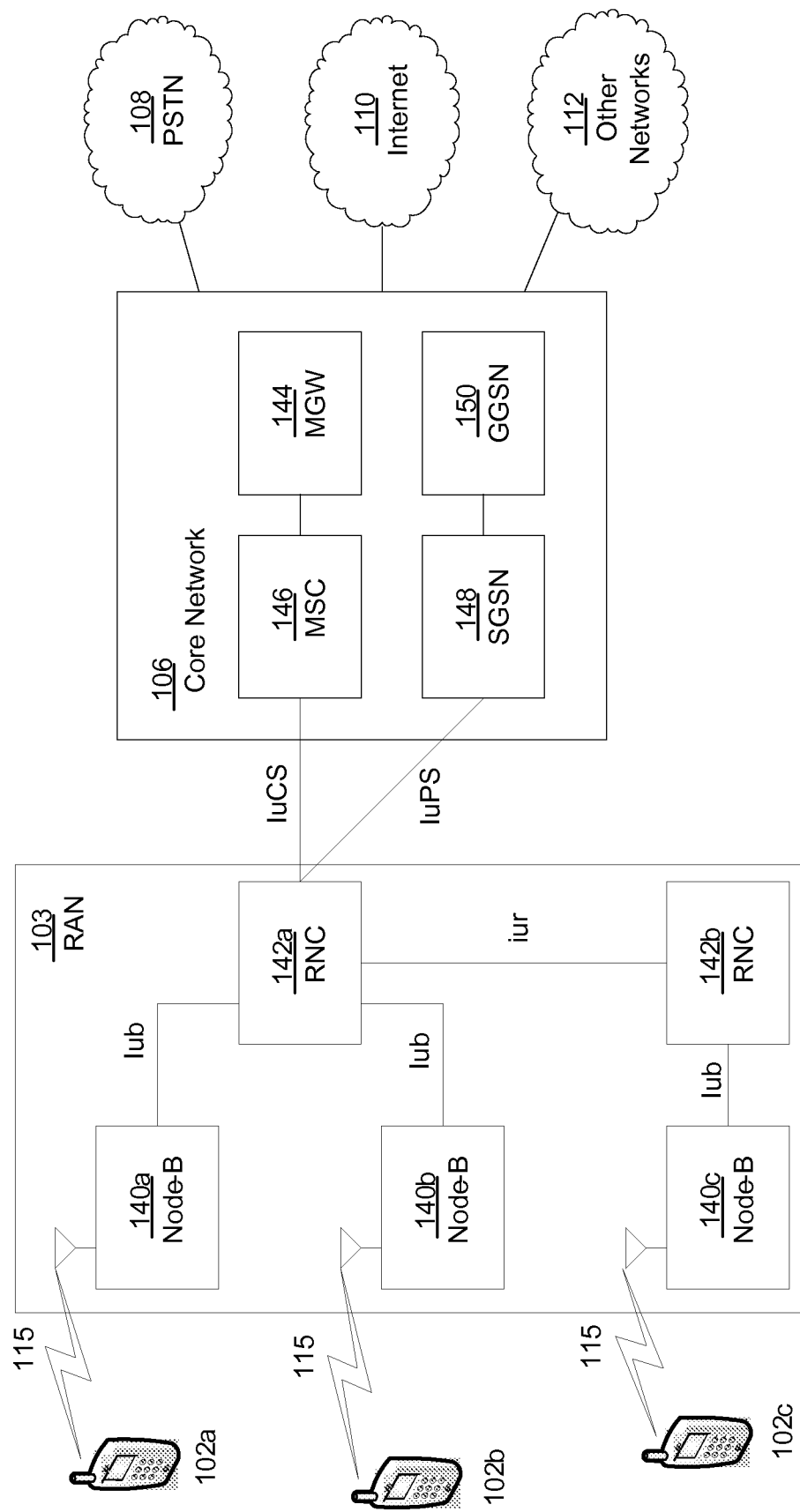
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
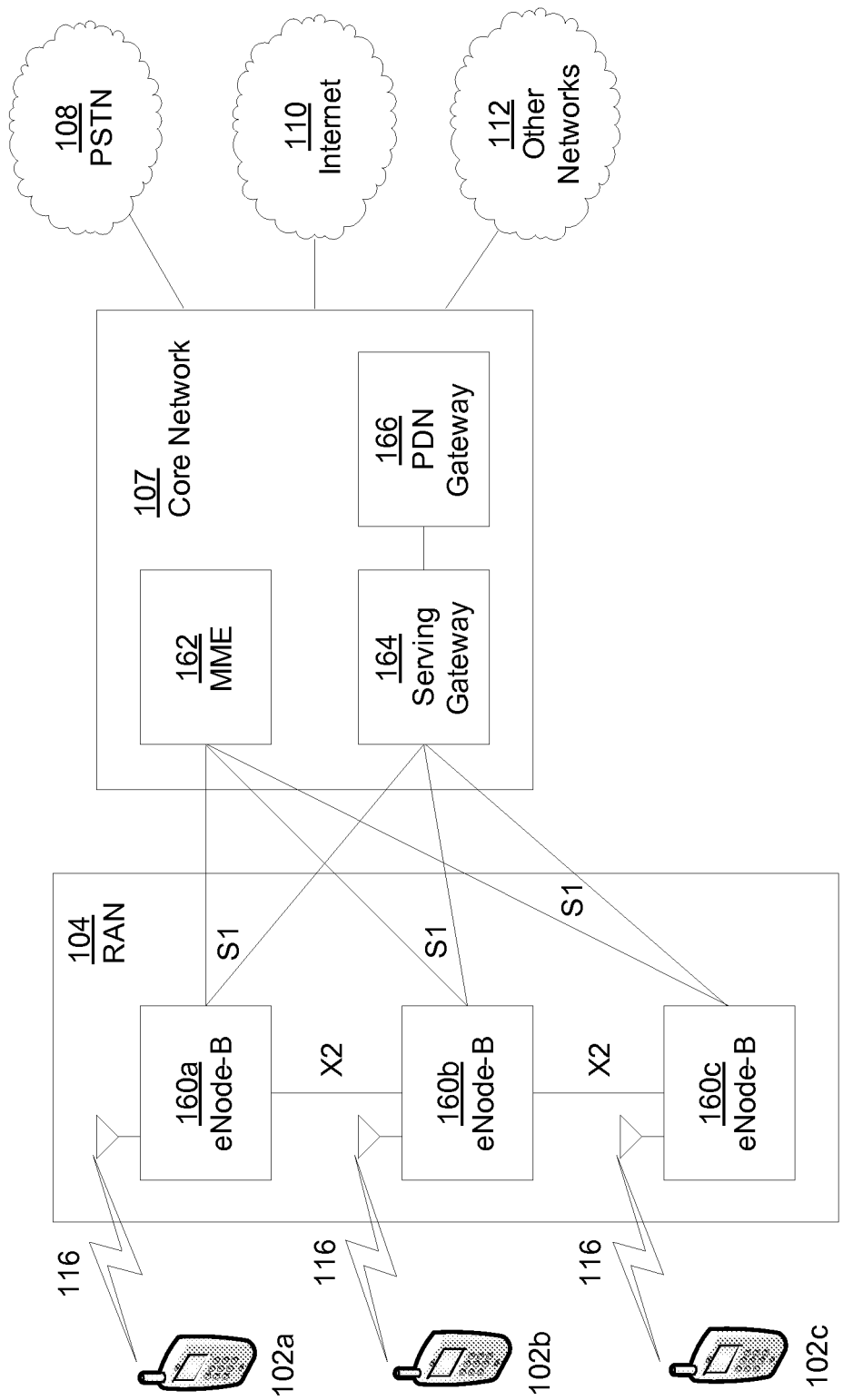
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
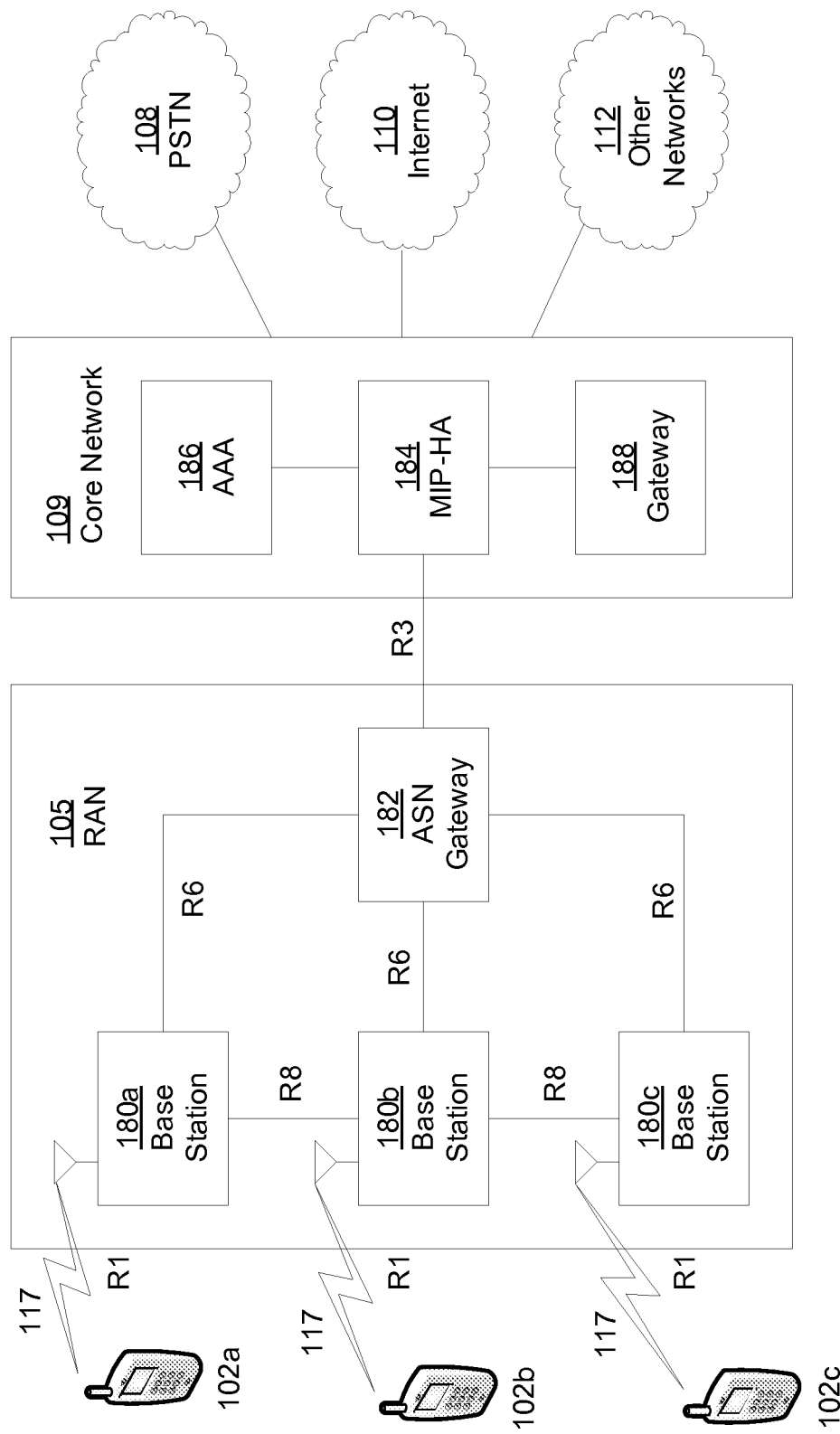
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Embodiments recognize that the separation of Tx and Rx antennas can provide some degree of isolation, but except in very low power, short range applications it may be typically not enough to enable a two-way link on the same, or very close, frequencies. Some high frequency systems, for example in millimeter wave bands, may be able to achieve full duplex, single frequency operation using separate Tx and Rx antennas, since the wavelength may be small and practicable antenna spacing and antenna gains may prove sufficient.

Embodiments contemplate the implementation of one or more full duplex single channel (FDSC) systems. From a spectrum allocation viewpoint, in one or more embodiments, this does not necessarily need to be single channel, since other users and services may share one or more, or all of the allocation, but the contemplated techniques may apply to dealing with a small, or zero, duplex spacing and the term FDSC may be used with that understanding. In one or more embodiments contemplate systems where full duplex operation may be useful or required in a frequency allocation where the large band gap, and/or antenna techniques, that enable simultaneous Tx and Rx may not be applicable or may not provide sufficient Tx-Rx isolation. Embodiments contemplate that such systems may implement some variant of time division duplex (TDD) where the Tx and Rx signals may be separated by timeslots or other access schemes designed to prevent, or minimize, their overlap. Implementing simultaneous Tx and Rx operation may have the potential to double the bandwidth efficiency of such systems.

Embodiments recognize the feasibility of FDSC communications, reasonable performance expectations for Tx-to-Rx suppression, and certain design issues for WLAN applications. One or more embodiments contemplate ways to realize the usefulness of FDSC communications while maintaining the range and reliability generally required or useful in a communication system.

One or more embodiments contemplate the use of FDSC in cellular systems. Embodiments contemplate alternatives to conventional FDD and TDD to achieve the improved capacity offered by FDSC communications and/or the ability to operate where channel assignments may not support conventional FDD operation.

One or more embodiments may apply to duplexing techniques that may not be strictly orthogonal, but perhaps not necessarily the case where the transmissions completely overlap in time and frequency. In other words, one or more embodiments may be compatible with small gaps between Tx and Rx bands or partial overlap of Tx and Rx bands that may have been previously considered impracticable.

Embodiments contemplate operation of one or more systems comprising some FDSC-capable devices and others that may not be FDSC-capable. Embodiments also contemplate measurement procedures to support FDSC operation. One or more embodiments contemplate the use of FDSC on a station-by-station, and/or a packet-by-packet basis in WLAN systems. One or more embodiments contemplate the improved performance using algorithms that may compile measurement data over time and may use that data to decide when and/or if FDSC transmissions may be feasible and/or useful.

Figure 1F:
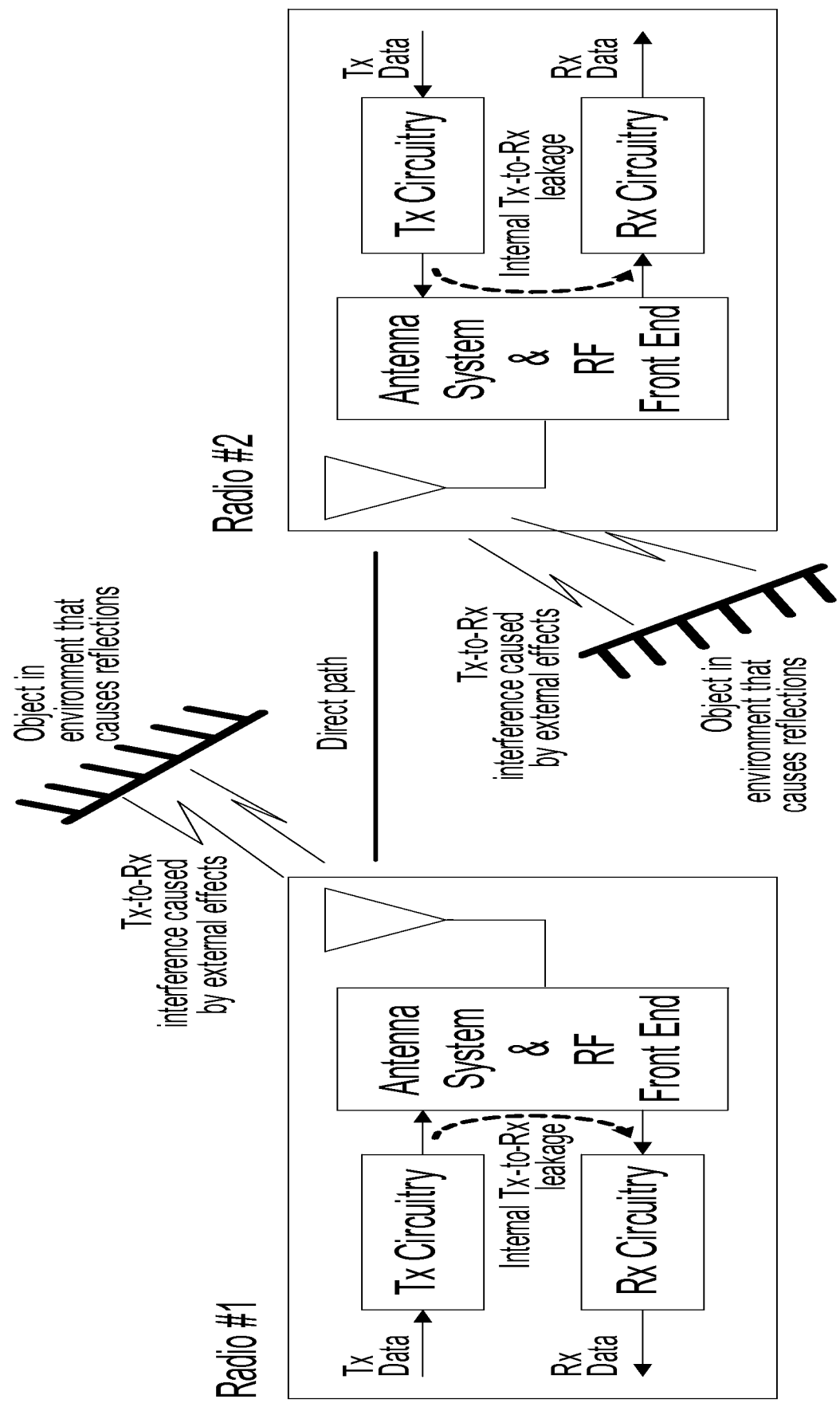
FIG. 1F illustrates an exemplary simple full duplex single channel communication system consistent with embodiments.

Embodiments recognize one or more examples of a Full Duplex Single Channel Communication System. FIG. 1F is an example of a full duplex single channel (FDSC) communication system. In FIG. 1F, two radios may be attempting to communicate by transmitting at the same time on the same frequency, with the goal of radio #2 being able to demodulate the signal from radio #1, while radio #1 demodulates the signal from radio #2. Embodiments recognize that, for a given amount of bandwidth, twice the amount of information may be conveyed compared to a time division duplexing approach (TDD) where the radios may take turns transmitting, or a frequency division duplexing (FDD) approach where the transmissions in one or more, or each, direction may take place using non-overlapping, non-interfering frequencies.

Embodiments recognize limiting factors may be that in practicable radios a substantial amount of the Tx signal power leaks into the Rx path, and/or that objects in the environment can reflect the transmitted signal back into the receiver. One or both of these factors may cause interference that may mask the ability of a receiver to demodulate the desired signal from the other radio. Embodiments contemplate an exemplary quantitative analysis as follows:

$P_{T1}$=Tx power from radio #1;
$P_{T2}$=Tx power from radio #2;
$PL_{12}$=Radio propagation loss from radio #1 to radio #2;
$PL_{21}$=Radio propagation loss from radio #2 to radio #1;
$CL_1$=Coupling loss of the transmit signal back into the receiver for radio #1;
$CL_2$=Coupling loss of the transmit signal back into the receiver for radio #2;
$SNR_{req'd1}$=Signal-to-noise ratio required by or useful to radio #1 to demodulate the desired signal from radio #2;
$SNR_{req'd2}$=Signal-to-noise ratio required by or useful to radio #2 to demodulate the desired signal from radio #1;

Embodiments may assume one or more, or all power levels may be in dBm; one or more, or all relative levels such as propagation loss, coupling loss, and SNRs may be in dB; and losses may be expressed as positive numbers in dB such that Rx levels equal Tx levels minus the loss. Further, embodiments may assume that the dominant interference may be the Tx signal that may be coupled back into the receiver due to internal leakage, external reflections, and/or any other phenomenon. For successful communication in both directions, it may useful (and in some embodiments perhaps necessary) that the received SNR at one or more, or each, radio may be larger than the required or useful SNR. At radio #1:

$$(P_{T2}-PL_{21})-(P_{T1}-CL_1)>SNR_{req'd1} \qquad (1)$$

At radio #2:

$$(P_{T1}-PL_{12})-(P_{T2}-CL_2)>SNR_{req'd2} \qquad (2)$$

For the purpose of illustration, and not limitation, one or more embodiments may make the assumptions that $P_{T1}=P_{T2}=P_T$, $PL_{21}=PL_{12}=PL$, and $CL_1=CL_2=CL$ and the requirement or usefulness for successful communications may become:

$$CL-PL>SNR_{req'd} \quad (3)$$

In other words, the coupling loss back into the receiver may exceed (and in some embodiments may need to exceed) the path loss by at least the required or useful SNR, for example. In general, this may be difficult to achieve. For example, embodiments contemplate a link subject to free space propagation loss:

$$\frac{P_{Rx}}{P_{Tx}} = G_{Tx}G_{Rx}\left(\frac{\lambda}{4\pi d}\right)^2 \quad (4)$$

TABLE 1

Example of achievable range in a FDSC communication system.

| Parameter | CL = 25 dB Isolation | CL = 50 dB Isolation | CL = 75 dB Isolation | CL = 100 dB Isolation |
|---|---|---|---|---|
| Tx power | 20 dBm | 20 dBm | 20 dBm | 20 dBm |
| Tx to Rx isolation | 25 dB | 50 dB | 75 dB | 100 dB |
| Tx leakage into Rx path | −5 dBm | −30 dBm | −55 dBm | −80 dBm |
| Required SNR | 10 dB | 10 dB | 10 dB | 10 dB |
| Minimum detectable signal | 5 dBm | −20 dBm | −45 dBm | −70 dBm |
| Maximum path loss (PL) | 15 dB | 40 dB | 65 dB | 90 dB |
| Maximum communication distance (d) | 0.1 m | 2.4 m | 42 m | 755 m | where $P_{Rx}$ is the received power level, $P_{Tx}$ is the transmitted power level, $G_{Tx}$ is the transmit antenna gain. $G_{Rx}$ is the receive antenna gain, $\lambda$ is the wavelength, and d is the distance between the transmitter and receiver. The PL, as a positive number in dB, is $10 \log_{10}(P_{Tx}/P_{Rx})$. For omni-directional antennas where $G_{Tx}=G_{Rx}=1=0$ dB, and a frequency of 1000 MHz where $\lambda=0.3$ m, Table 1 shows the exemplary achievable maximum communication distances for CL values from 25 to 100 dB. These distances may range from 0.1 to 755 m. As described herein, CL=25 dB may be achievable but a 0.1 m range may be too small to be useful. CL=100 dB may be ambitious, but may provide a useful range of up to 755 m. The mid values of CL=50 dB and 75 dB may provide 2.4 m and 42 m, respectively, which can be useful in certain communication network configurations.

In one or more embodiments, it may be concluded that FDSC communications can be useful over certain ranges and cell sizes, for example in what may be considered short range or small cells. Embodiments contemplate system design aspects consistent with such use, including how the short range capability can be combined with longer-range, larger-cell deployments, for example.

Embodiments recognize the feasibility of FDSC systems, for example using one or multiple antennas and applying the capability to wireless LAN or PAN systems. Embodiments recognize increased throughput, reducing the impact of hidden terminals, and/or improved fairness.

Embodiments recognize using at least two Tx and one Rx antenna for antenna cancellation of the Tx signal coupling.

Embodiments recognize that approximately 80 dB of cancellation can be achieved with the combination of antenna cancellation, RF interference cancellation, and/or digital cancellation. Experimental results with a Wi-Fi node near 2.5 GHz show 33 dB antenna cancellation and 46 dB combined antenna plus noise cancellation. Embodiments also consider 5 MHz wide 802.15.4 signals, and recognize that the cancellation can be more effective than with the 20 MHz wide Wi-Fi signals.

Embodiments recognize full duplex communication. Embodiments recognize systems with multiple antennas that may null the coupled signal, and analog cancellation for further suppression. Embodiments recognize the reduced propagation loss at lower frequencies may improve the effectiveness of full duplex, and systems implemented at 530 MHz.

Embodiments recognize approximately 70 dB suppression of the interfering Tx signal can be achieved with separate Tx and Rx antennas combined with analog and digital cancellation. Embodiments recognize the achievement of 81 dB. Embodiments also recognize the full duplex PHY (FD-PHY) and MAC (FD-MAC) layers developed by adopting the 802.11 packet structure. The extensions include shared random backoff among FD partners that may improve fairness in the network; extensions to the carrier sensing that may snoop one or more, or all, packet headers to help find FD Tx opportunities; and increased data buffer length with reordering to help maintain FD sessions. Embodiments recognize a 70% higher throughput than similar half-duplex systems.

Embodiments recognize antenna design alternatives and software-defined radio platforms based on 802.11 components. Embodiments recognize that clients may not be full duplex, and that the access point (and in some embodiments perhaps only the access point) may be full duplex (and in some embodiments may need to be full duplex). Embodiments also recognize suppression techniques using multiple antennas. Embodiments also recognize that antenna suppression can be implemented using a single antenna with cancellation circuitry, where in some embodiments at least some of the cancellation circuitry may be designed as part of the feed network. Embodiments recognize 40 dB Tx to Rx isolation over a 26 MHz bandwidth centered at 915 MHz, for example. Embodiments contemplate that further analog and digital cancellation may add to this result.

Embodiments contemplate duplexing alternatives. TDD and FDD may be at least two duplexing techniques that may be extended by contemplated embodiments to provide capacity improvements and/or channel selection flexibility available with FDSC communications.

Figure 2:
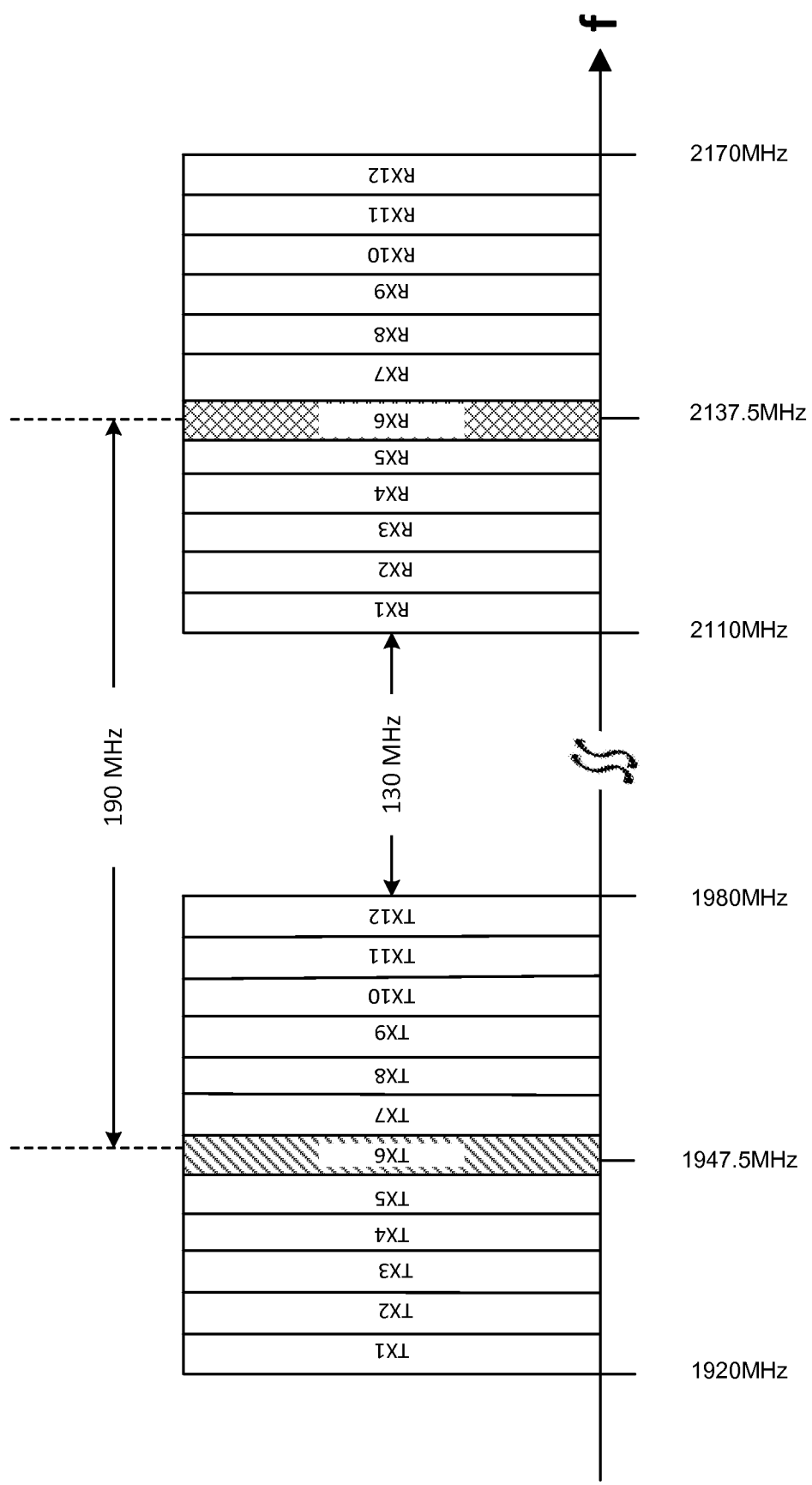
FIG. 2 illustrates an exemplary Uplink and Downlink Band I Spectrum Allocation for the 3GPP LTE system with 5 MHz channels bandwidths consistent with embodiments.

FDD may use non-overlapping, non-interfering frequency bands for radio transmission in one or more, or each, direction. For example, FIG. 2 shows an exemplary FDD allocation for Band 1 of the FDD LTE system when using 5 MHz channels. The uplink spans 1920 to 1980 MHz, separated into 12 channels one or more, or each, 5 MHz wide. The downlink spans 2110 to 2170 MHz, with one 5 MHz channel associated with one or more, or each, uplink channel. One or more, or each, pair of uplink and downlink channels may be separated by the duplex spacing, 190 MHz, for example. The separation between the high end of the uplink band and the low end of the downlink band, known as the band gap, may be 130 MHz. This may be a full duplex system. In some embodiments, the frequency separation of the uplink and downlink may enable the use of small, cost effective duplexing filters to isolate the Tx signal from the Rx path.

Figure 3:
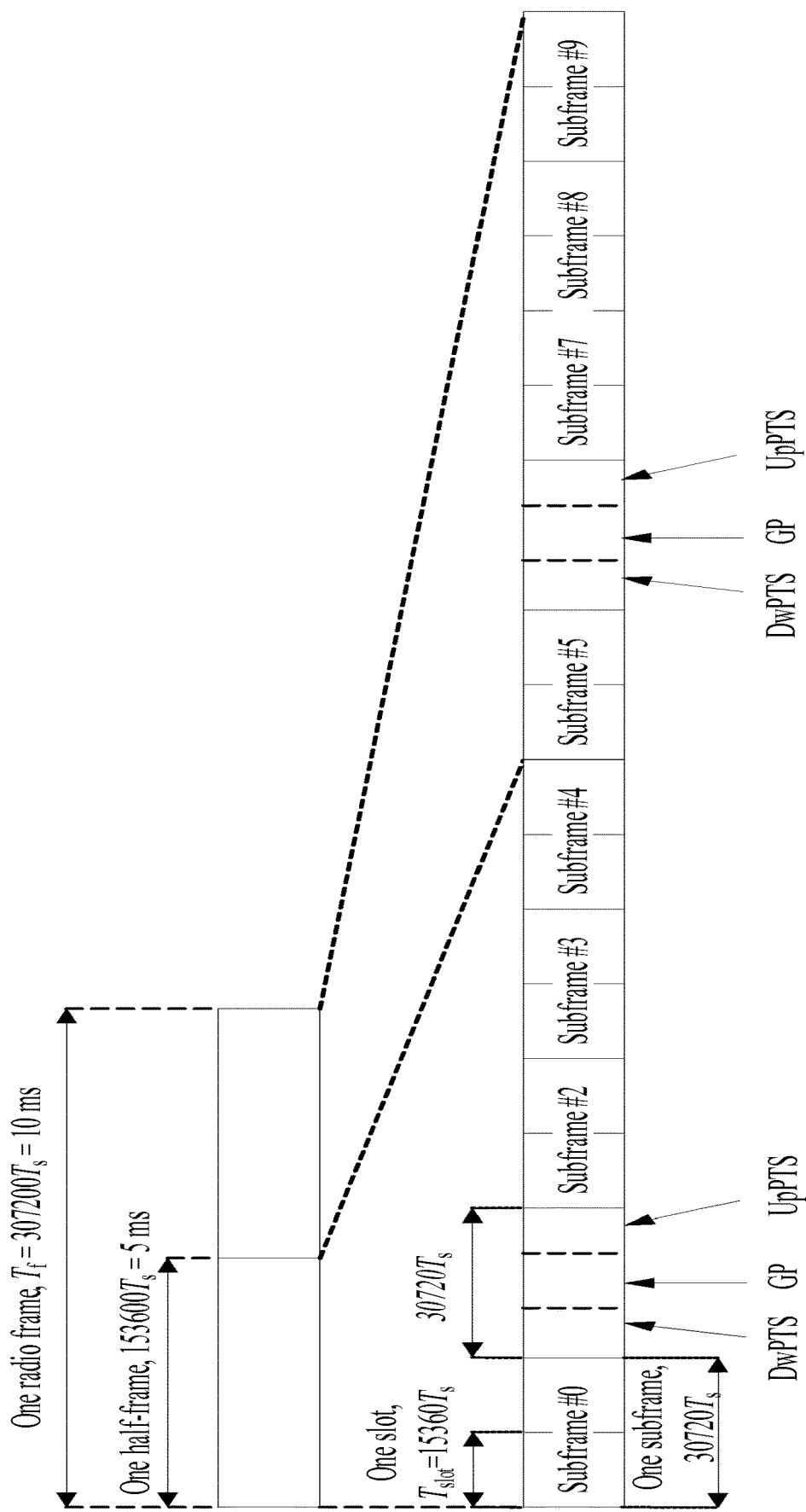
FIG. 3 is an exemplary illustration of a frame structure for the TDD mode of the 3GPP LTE system consistent with embodiments.

Embodiments contemplate that in TDD systems the radios may take turns transmitting during non-overlapping times that may be tightly synchronized across a network or cell, or may use a contention access scheme. FIG. 3 is an example of a TDD frame structure recognized by embodiments that may be used for the 3GPP LTE system. Subframes may be allocated for either uplink or downlink transmissions, with various switching points between uplink and downlink timeslots that may be selected from a preconfigured set. The switching points may be limited to special subframes comprising a downlink pilot timeslot (DwPTS), a guard period (GP), and/or an uplink pilot timeslot (UpPTS). The GP may allow the radios time to switch between Rx and Tx operation and may allow a certain level of imprecision in the time synchronization of Rx and Tx timeslots such that they may not overlap.

Figure 4:
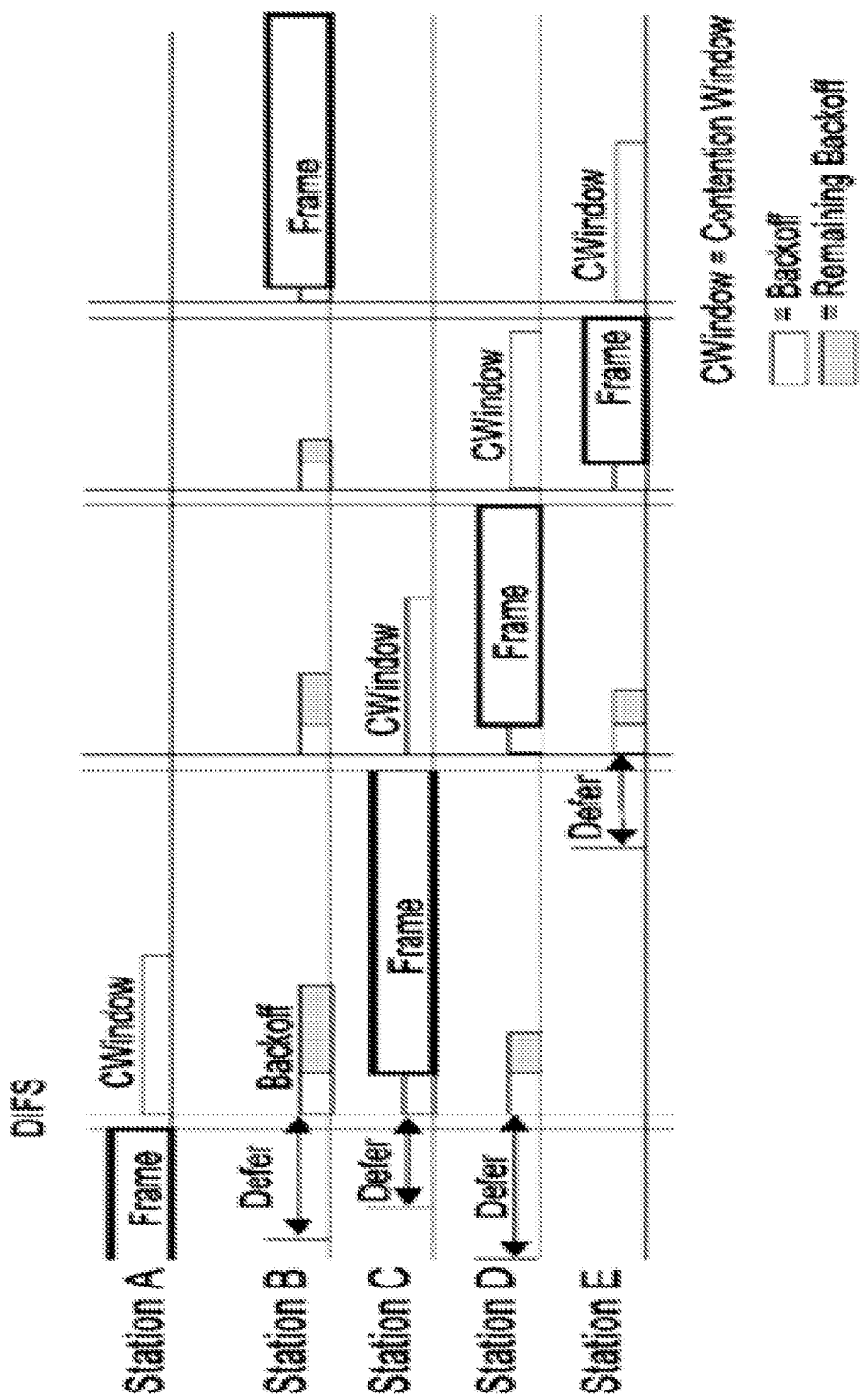
FIG. 4 is an exemplary illustration of an 802.11 contention access and backoff technique consistent with embodiments.

FIG. 4 is another example of a TDD system, showing the contention access and backoff scheme that embodiments recognize may be used by 802.11 systems. In such cases the Tx and Rx times for one or more, or each, radio may not be as strictly controlled. Rather, the radios may sense the channel for activity, and may defer their transmissions if a receiver algorithm concludes the channel may be busy, or may transmit if an algorithm may conclude that the channel may be idle and/or certain other Tx rules may be satisfied. In one or more embodiments, this approach may run the risk of collisions where two or more terminals unknowingly transmit at the same time, often preventing successful reception of one or more packets. Collisions may also be caused by a hidden node, or a hidden terminal, for example.

The FDSC techniques contemplated by embodiments herein may apply to improving the performance of FDD, and one or more versions of TDD described herein. FIGS. 5A-5E is a depiction of FDD channel configurations to which the contemplated FDSC techniques may apply. For clarity, a single channel in one or more, or each, direction is shown rather than the multi-channel allocation as may be often used, and previously illustrated in FIG. 2. The terms uplink (UL) and downlink (DL) will be used to describe the bands, and $f_{UL}$ and $f_{DL}$ may be the respective band center frequencies. DL typical refers to a transmission from a base station (BS), access point (AP), or other infrastructure device and UL typically refers to a transmission from a mobile terminal, WiFi station, or other non-infrastructure device, however, the techniques and discussion apply to any radio deployment where two-way communications may be useful.

Figure 5A:
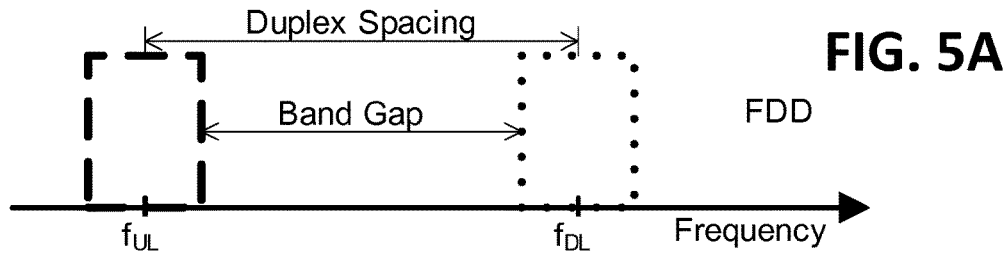
FIGS. 5A-5E illustrate example Duplex spacing alternatives consistent with embodiments.
Figure 5B:
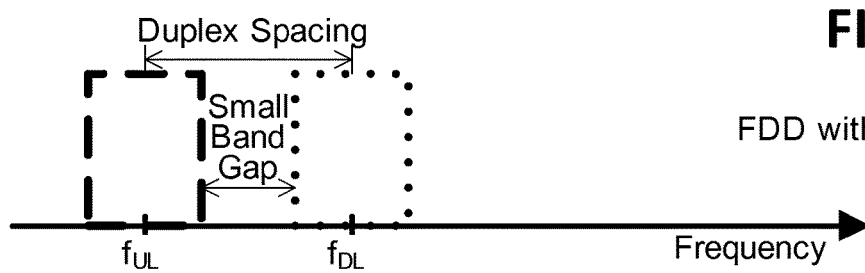

FIG. 5A shows FDD, where the duplex spacing and band gap may be sufficiently large to enable the use of small, cost-effective duplexing filters. If the frequency allocation does not permit a large enough spacing, embodiments contemplate the reduction of the duplex spacing and band gap as shown in FIG. 5B (for example, as in a UMTS system in a frequency band near 1350 MHz where the allocation permitted two 5 MHz UL channels and two 5 MHz DL channels with a 30 MHz duplex spacing and 20 MHz band gap, which may be less, and perhaps significantly less, than a typical UMTS allocation, an example of which was shown in FIG. 2). Embodiments recognize that the Tx-to-Rx interference may be unacceptable high, and embodiments recognize that an interference canceller may sample and suppress the coupling. Embodiments recognize that a minimum suppression of 6 dB may be useful, that a typical suppression of 12 dB may be more useful, and that the suppression algorithm may converge within 500 μs of a Tx event (and in some embodiments may need to converge within 500 μs of a Tx event).

Figure 5C:
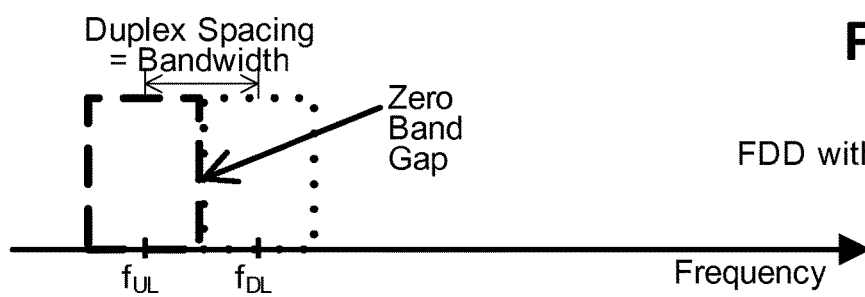

In the example shown in FIG. 5C, where the two bands may be positioned with no gap (e.g., a band gap that may be substantially zero), and the duplex spacing may be equal to the channel bandwidth. In some embodiments, the duplex spacing may be equal to the arithmetical average of the UL bandwidth and the DL bandwidth, for example where the UL and DL bandwidths may not be equal. More generally, the duplex spacing may be equal to the difference between $f_{DL}$ and $f_{UL}$ where the UL and DL bandwidths may be not equal. A larger amount of Tx-to-Rx interference may be expected, and a greater degree of suppression may likely be useful or in some embodiments perhaps required.

Figure 5D:
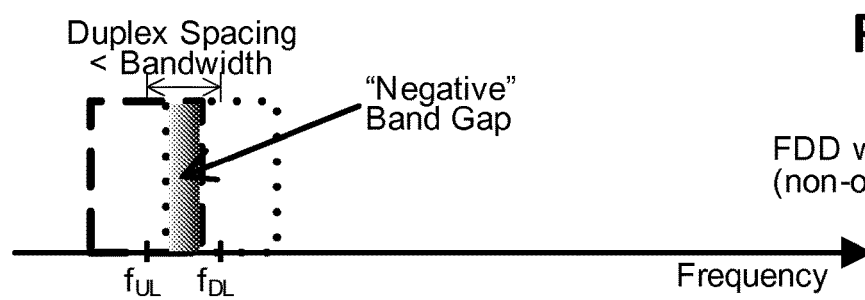

Embodiments contemplate that, to fit the UL and DL channels into a smaller total bandwidth—among other reasons, the UL and DL bands may be overlapped as shown in FIG. 5D (e.g., a bad gap that is less than zero). In some embodiments, the duplex spacing may be less than the arithmetical average of the UL bandwidth and the DL bandwidth, for example where the UL and DL bandwidths may not be equal Even a larger amount of Tx-to-Rx interference may be expected, and even a greater degree of suppression may be likely useful or in some embodiments perhaps required.

Embodiments recognize that the overlapping technique of FIG. 5D may be useful for future FDD standards in the category of non-orthogonal multiple access. Embodiments recognize that such applications may use the non-orthogonal approach to pack more users into the UL or DL, rather than to enable FDSC operation, for example. Embodiments recognize a 30% throughput improvement with an UL overlap of approximately 45%. Embodiments recognize the usefulness for an interference cancelling capability at the receiver that may suppress the inter-WTRU interference caused by the overlapping. In the FDSC system, the interference cancellation may be useful (or perhaps in some embodiments needed) to suppress the Tx signal that couples into the receiver rather than interference among received signals from other radios.

Figure 5E:

FIG. 5E shows the example of FDSC communication where the UL and DL bands may be directly on top of each other with the duplex spacing being equal to zero or substantially equal to zero. The $f_{UL}$ and $f_{DL}$ may be equal or substantially equal. The largest amount of Tx-to-Rx interference may be expected, and the greatest degree of suppression may be useful (and in some embodiments perhaps likely be required), compared to the other alternatives shown.

The embodiments contemplated in FIGS. 5A to 5D are varieties of FDD in that there is at least some frequency separation between the downlink and uplink. In such scenarios, once the band gap becomes so small that duplexing filters may not be sufficient to suppress the Tx-to-Rx interference within a WTRU or between WTRUs, and/or the uplink and downlink bands overlap such that suppressing the Tx-to-Rx interference may not be possible with filters, then the techniques disclosed herein, such as those referred to herein in the context of FDSC as shown in FIG. 5E, may apply. This includes, but is not limited to, techniques for interference suppression, techniques to determine if full duplex operation can be supported during a transmission time (including measurements and decision logic), and/or techniques to allocate timeslots for full duplex operation (including measurements and decision logic). For frequency channel arrangements with small band gaps or partial overlap, embodiments contemplate that the Tx-to-Rx interference may be less than with FDSC. In such scenarios, interference calculations and/or expected measurement output ranges may be adjusted accordingly. For example, embodiments contemplate approximately half of the interference in a 50% overlap arrangement compared to FDSC. In another example, for a small band gap, embodiments contemplate that estimates of the interference, perhaps based on a signal's spectral shape, may be made by, for example, integrating the energy that spills into the Rx channel.

Figure 6:
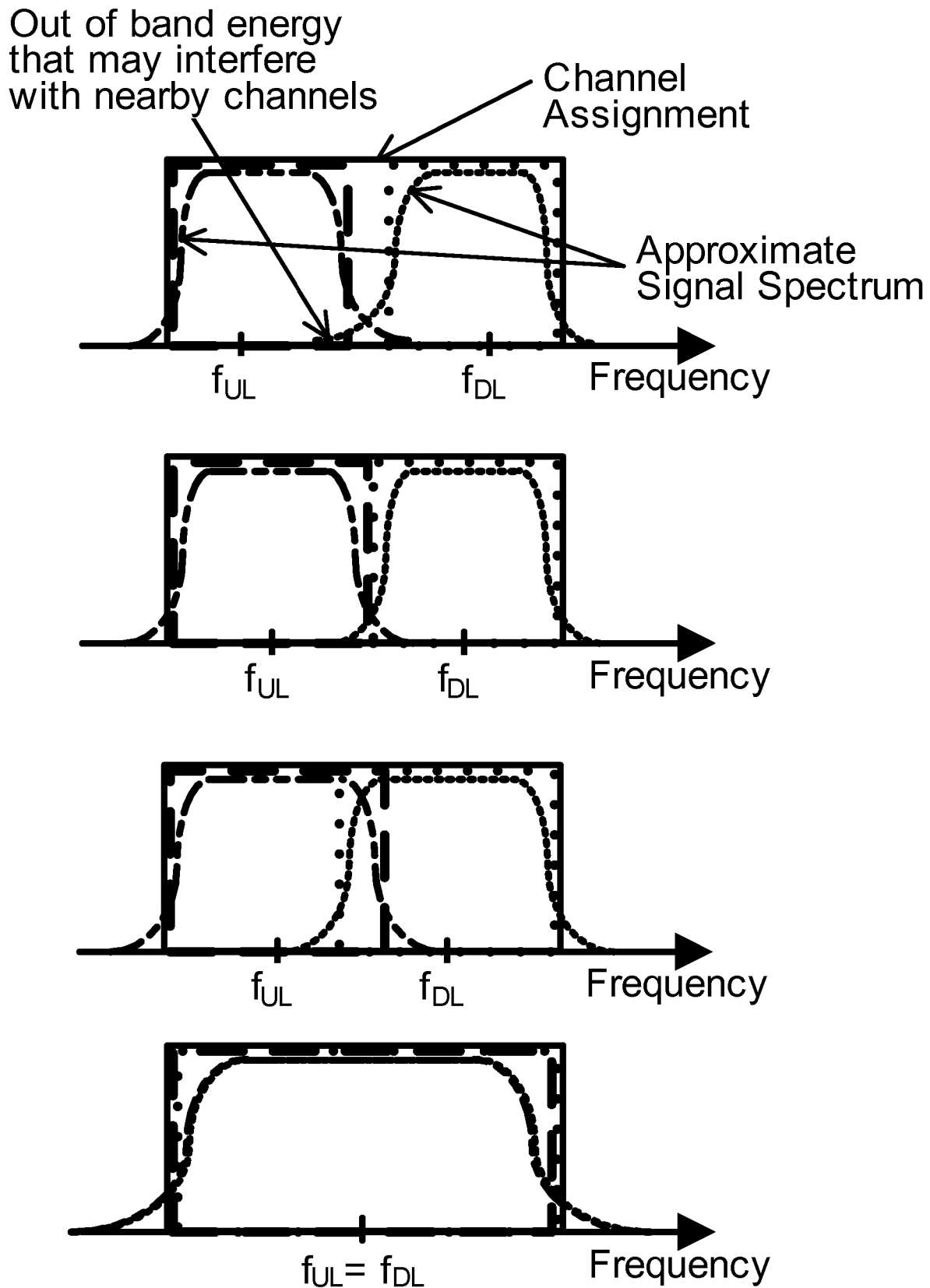
FIG. 6 is an illustration of exemplary Duplexing alternatives in a single allocated channel consistent with embodiments.

Embodiments contemplate full duplex single channel (FDSC) communication. FIG. 6 illustrates a single channel assignment which may be allocated to a radio for both transmit and receive operation. The overall channel may be occupied by an UL channel and a DL channel and may be configured with one of the full duplex techniques previously discussed in reference to FIGS. 5A-5E, that is, a small duplex spacing, zero duplex spacing, partial overlap, and/or full overlap. An approximate signal spectrum is shown, and as in practical communication systems, one or more, or each, signal may be designed to fit into the UL or DL channel but the spectrum tails or side lobes may cause interference even in the case of small or zero duplex gaps.

Embodiments contemplate that the system or radio may be given a single channel assignment and may use a fixed duplex configuration, or may adapt the configuration based on the level of interference, communications range, or other parameters or measurements that impact the ability to maintain reliable communications in both directions. For example, if the interference may be (relatively) large, the small duplex gap may be used, as the interference decreases the duplex gap may be decreased, and so on up through zero duplex gap, and partial or full overlap.

Embodiments contemplate that, if multiple channels may be available—among other reasons, the system may adapt between FDD and one of the contemplated FDSC alternatives. Among numerous distinctions, embodiments contemplate that for FDSC, one or both the UL and DL bands may be fit into one channel allocation, whereas for FDD the UL and DL may be given separate channels with sufficient duplex spacing as previously illustrated in the examples of FIG. 2 and FIG. 5A. And perhaps in some embodiments, other than filtering commonly used in radios, additional Tx-to-Rx interference suppression may not be required or useful.

Similarly, embodiments contemplate that the system may adapt between TDD and one of the FDSC alternatives, or among any of the duplexing techniques described herein.

An example of a system that may adapt between FDD and FDSC would be a TV White Space (TVWS) system that may query a database for channels that may be used on a secondary basis, and may have no guarantee of channel availability. Multiple channels may be available, sufficiently separated in frequency, and/or deemed to be of sufficient quality. In such scenarios, among other, FDD may be used. If one channel may be available (and perhaps in some embodiments only one channel may be available), or adjacent or closely spaced channels may be available (and perhaps in some embodiments only adjacent or closely spaced channels may be available), then a system may choose to use FDSC. One or more embodiments contemplate that the channel situation may change with time or location, so the flexibility to operate in FDD and/or FDSC modes may be useful.

Figure 7A:
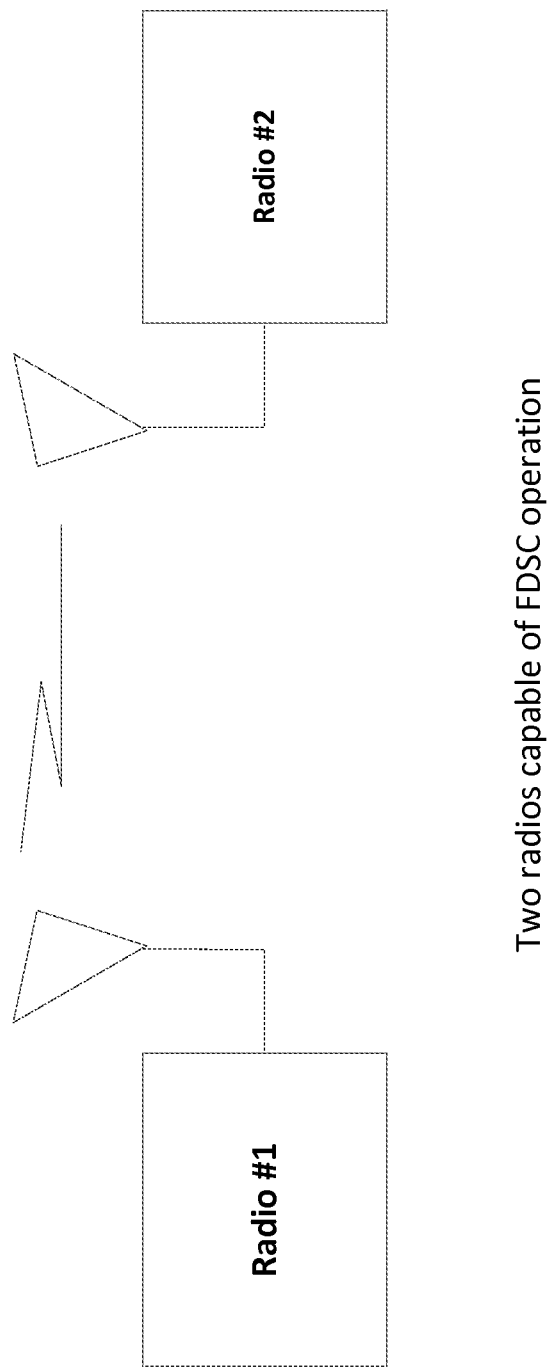
Figure 7B:
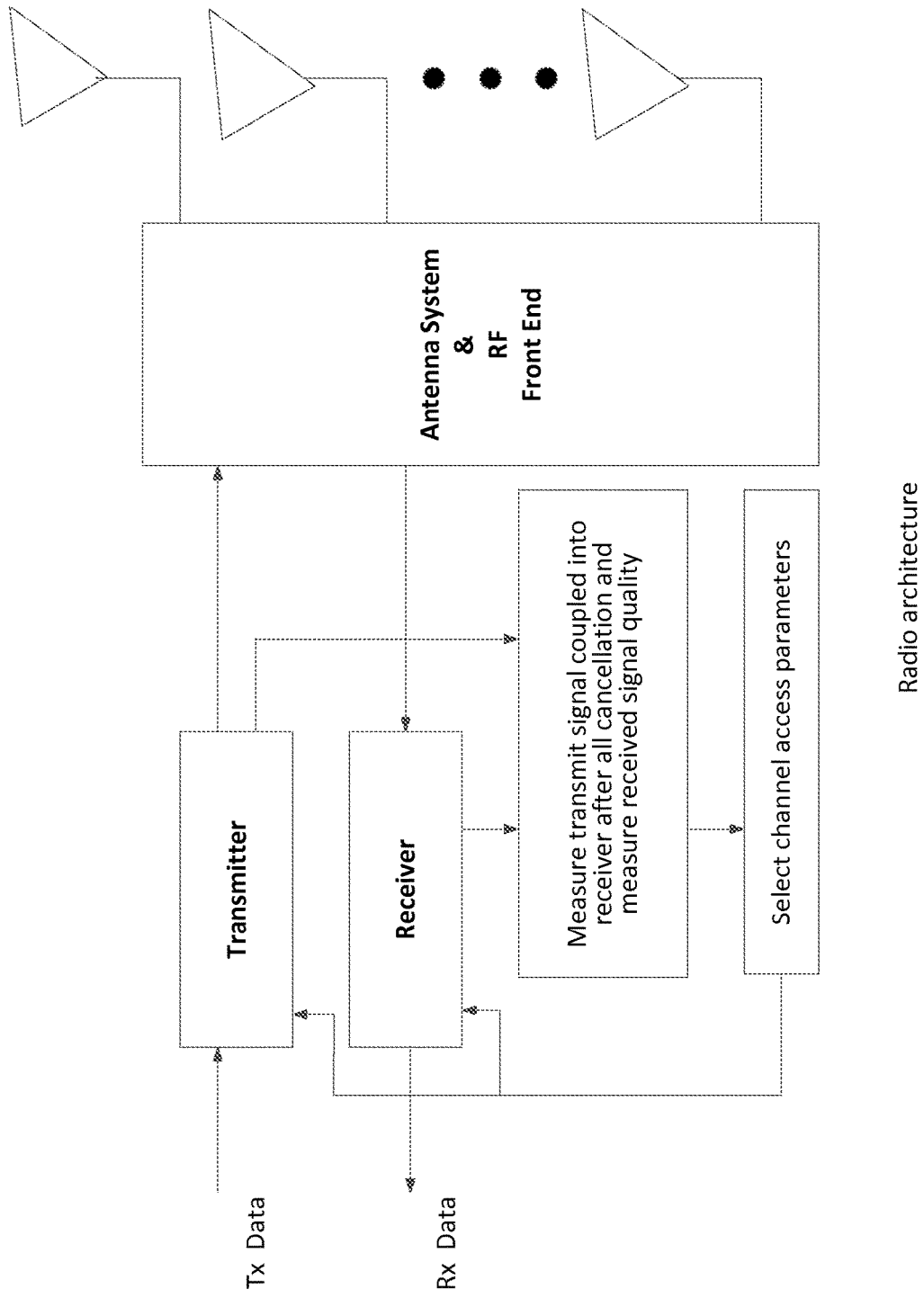

FIGS. 7A-7E illustrate elements of an example system that takes measurements and can reconfigure the duplexing parameters and/or duplexing techniques. FIG. 7A shows the two radios capable of FDSC operation and other duplexing modes. FIG. 7B is a diagram of the radio architecture. The antenna may be a single antenna, an antenna array, and/or multiple antennas. The transmitter output may go into the RF front end and antenna feed network. The receiver input may be taken from the RF front end and the antenna feed network. The interference suppression useful for, or perhaps required for, FDSC operation may be implemented in the antenna system, RF front end, receiver, or parts thereof. Measurements may be taken on the received signal to assess the signal quality, and may include for example the Tx signal power that may be coupled into the Rx path; the received SNR; bit, symbol or packets error rates; error vector magnitudes (EVM); ACK/NACK counts; and/or successful/unsuccessful CRC or checksum counts. FIG. 7C through FIG. 7E show various exemplary duplexing modes from which the radio system may select.

Figure 8B:
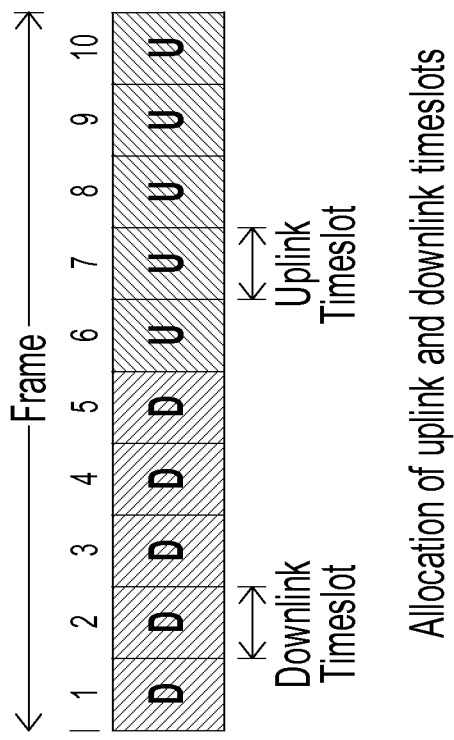
FIGS. 8A-8C are an exemplary cellular TDD system that may use FDSC techniques consistent with embodiments.
Figure 8C:
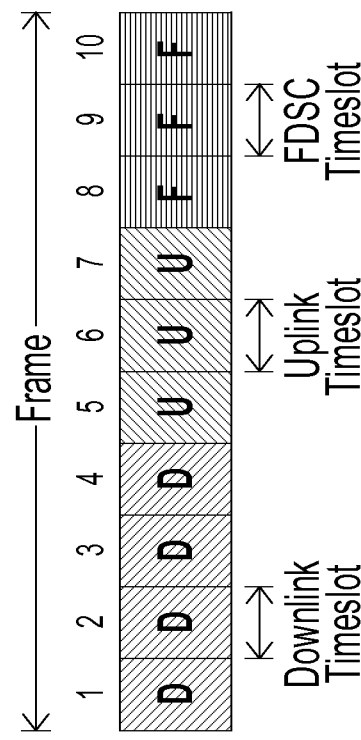
Figure 8A:
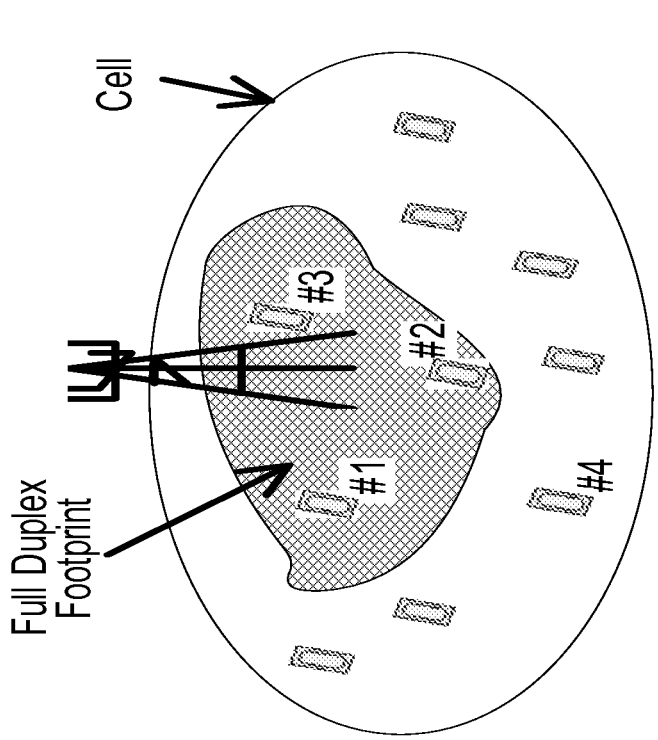

Embodiments contemplate extending a TDD cellular network to included FDSC timeslots. FIG. 8A shows a cellular deployment comprising a base station (BS) and several UEs (or WTRUs). A TDD timeslot allocation is shown in FIG. 8B. For clarity, FIG. 8B is simplified showing only one switching point between DL and UL, and omitting special timeslots, GPs, and/or other features that may be used for synchronization or control functions some of which were previously described in reference to FIG. 3.

Embodiments contemplate that the cell may be (relatively) small. Embodiments also contemplate that the BS and one or more, or every, WTRU may be FDSC capable. Embodiments also contemplate that the BS and/or one or more, or every, WTRU can provide sufficient Tx-to-Rx interference suppression. In some embodiments, one or more, or every, timeslot may be allocated for FDSC operation. In some embodiments, this may be difficult to achieve, perhaps due to interference effects described herein and/or some WTRUs that may not be FDSC capable, however embodiments expect that at least some subset of WTRUs may be capable of sustaining FDSC operation with the base station. One or more embodiments contemplate that this subset of WTRUs may be relatively close to the BS, perhaps since the lower the propagation loss the more likely the radios may be able to operate in FDSC mode, among other reasons. An example of this is illustrated in FIG. 8A which shows a small footprint within the cell containing three WTRUs that may have sufficiently favorable propagation to and from the BS to support FDSC at both the WTRUs and BS. FIG. 8C shows an example of a timeslot allocation where three timeslots may be allocated for FDSC operation. Timeslots #1 to #4 may be DL timeslots and timeslots #5 to #7 may be UL timeslots that may be allocated to WTRUs inside or outside of the full duplex footprint. Timeslots #8, #9, and #10 may be allocated to WTRUs #1, #2, or #3, or other WTRUs that may be within the full duplex footprint and used in an FDSC mode. In some embodiments, perhaps since the FDSC mode may simultaneously transmit in the UL and DL, among other reasons, this configuration may support seven simultaneous DL paths and six simultaneous UL paths for a total of thirteen communication links, for example. In some embodiments, the approach in FIG. 8A may support a maximum of ten communication links (and perhaps only the maximum of ten communication links). In the case of one or more, or every, link operating in a FDSC mode, the number of communication links may be doubled compared to TDD, for example. In some embodiments, the FDSC and/or half duplex (HD) communication may be conducted via TDD.

The combination of DL, UL, and FDSC timeslots may support a network comprising some WTRUs that may be FDSC capable and some that may not. For example, in some embodiments, a WTRU may be allocated an FDSC timeslot (and in some embodiments may only be allocated an FDSC timeslot) if it were both in the full duplex footprint, and capable of FDSC communications.

Embodiments contemplate that the ability to support FDSC communications, the FDSC modes it could support, and/or the parameter ranges of one or more, or each, mode may be part of the WTRU capability parameters. These capability parameters may be communicated to the BS, either from the WTRU via over the air signaling, or from other entities in the wireless network. WTRUs that may have the required or useful capabilities (and in some embodiments only such UEs) may be considered for allocation of FDSC timeslots.

Figure 9A:
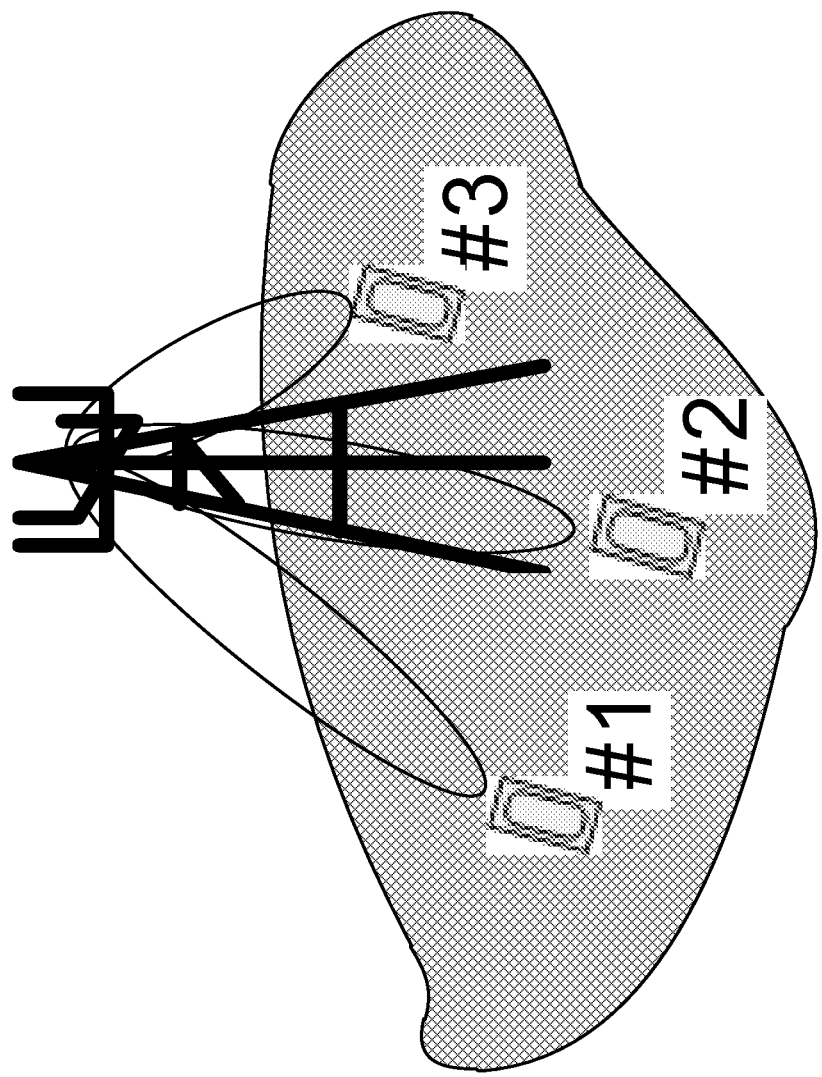
FIG. 9A is an example technique of using beamforming to improve the performance of FDSC or number of user equipment units (UEs) (or wireless transmit/receive units (WTRUs)) that can participate in FDSC consistent with embodiments.

As shown in FIG. 9, antenna beamforming may be used at the BS or at a WTRU to improve the ability to support FDSC communication links, or improve the performance of FDSC communications that can otherwise be supported. The beamforming may reduce the path loss by adding gain in the direction of the receiver or transmitter. Referring to equations (3) and (4), the beamforming may increase the values of $G_{Tx}$ or $G_{Rx}$, thereby decreasing the path loss, and providing a greater margin of CL−PL over $SNR_{req'd}$.

Figure 9B:
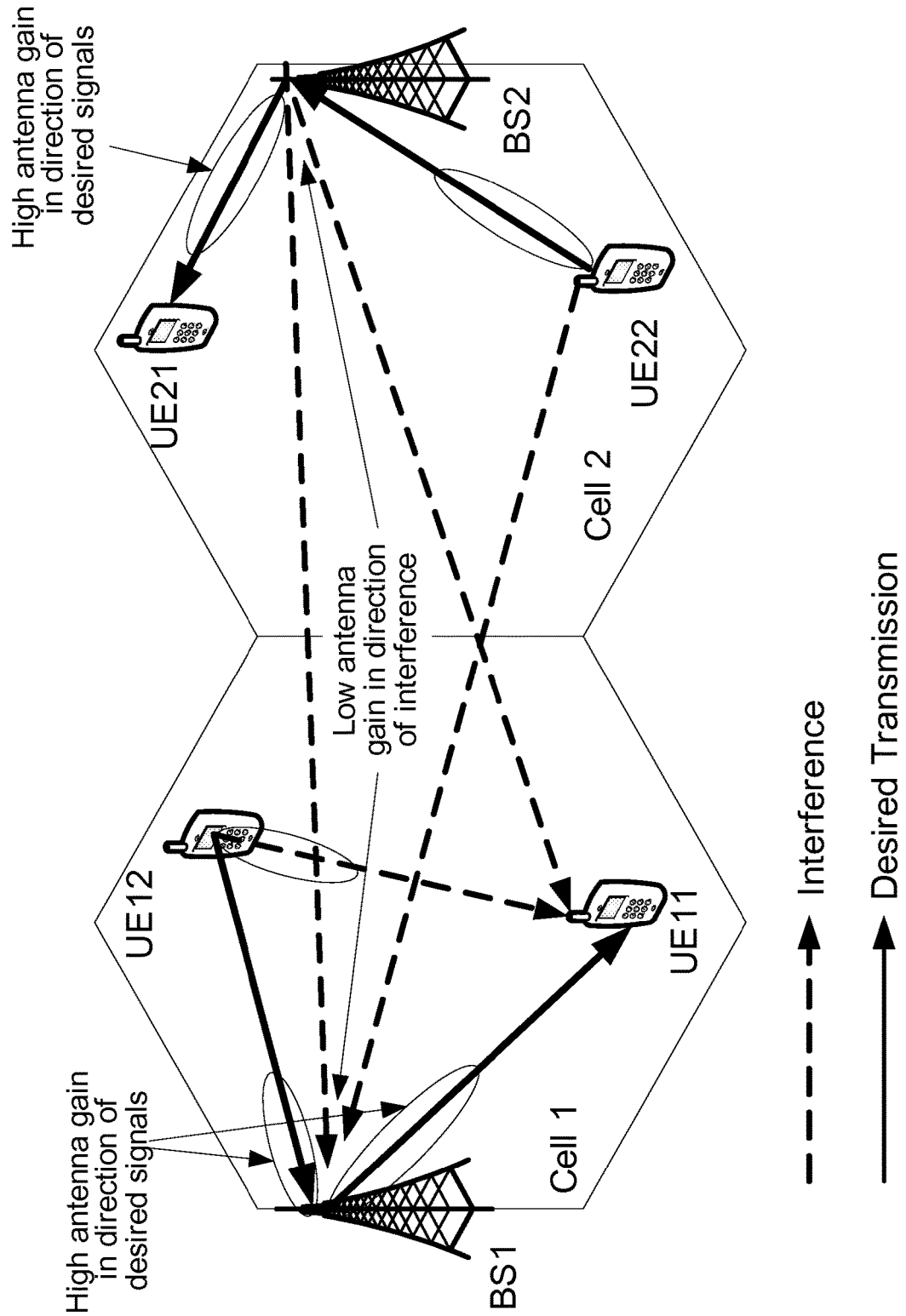
FIG. 9B is an example technique that may enable FDSC communications by reducing the interference from other transmitters in an example two cell network.

One or more embodiments contemplate that beamforming may also be used to reduce the gain the in the direction of an interfering signal (for example known as null steering) to improve the ability to support FDSC communications. In some embodiments, the total interference to which a receiver may be subject may be reduced by reducing the interference from other transmitters, which may improve the ability to demodulate a signal. FIG. 9B illustrates this in a two-cell example. In Cell 2, the BS transmits to UE21 and UE22 transmits to the BS. One or both of these transmissions may cause interference at the BS1 in Cell 1. In Cell 1, the BS1 may use beamforming to direct high gain in the desired Tx and Rx directions and/or to direct low gain in the direction of interfering signals. Similarly, in Cell 2 the BS2 may direct high gain in the Tx direction and/or low gain in the direction that may cause interference to Cell 1. In some embodiments, one or more of the UEs (WTRUs) in FIG. 9B may similarly use beamforming.

Figures 10A, 10B:
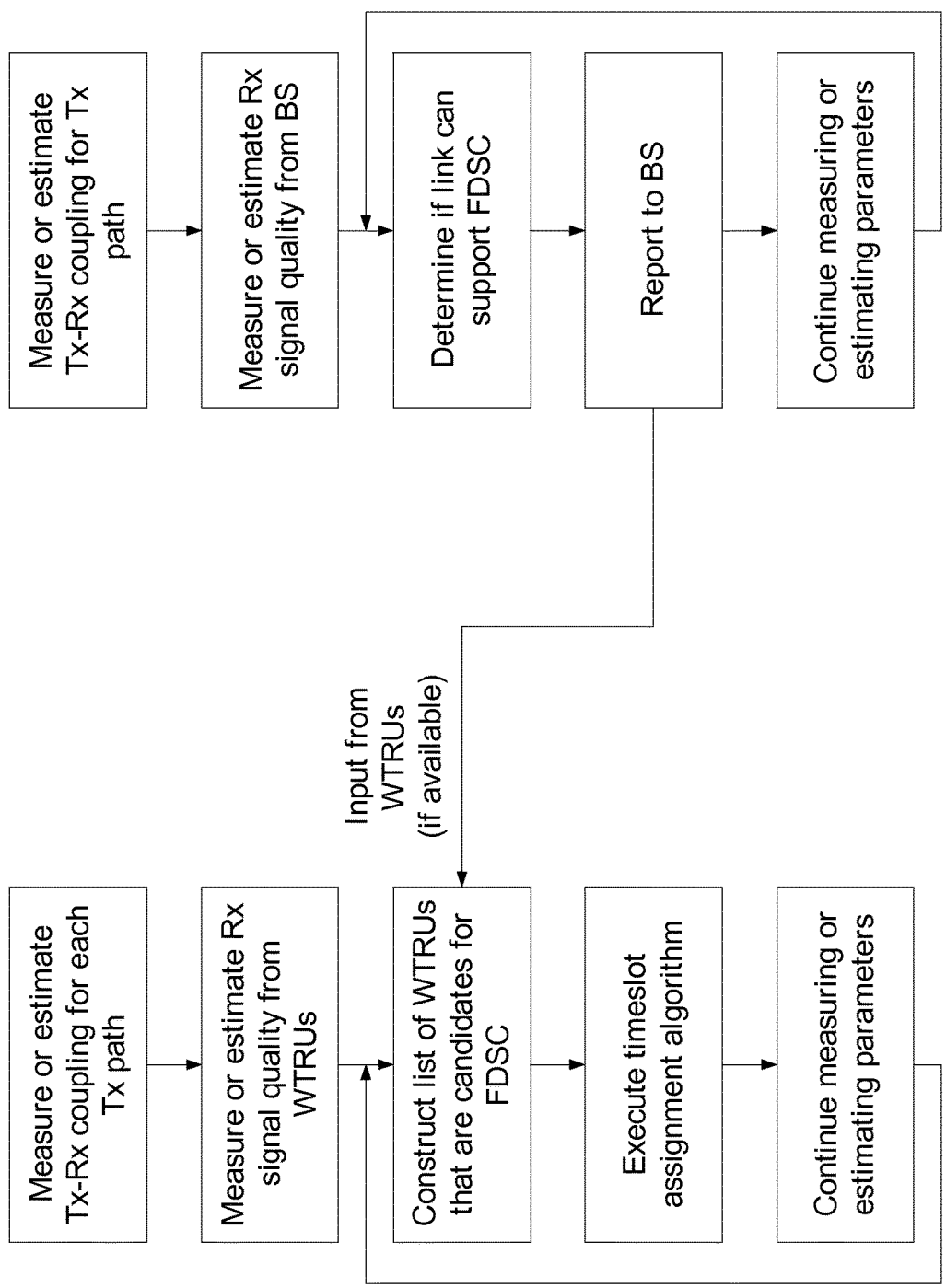
FIGS. 10A-10B illustrate example techniques for a base station (BS) and/or user equipment (UE or wireless transmit/receive unit (WTRU)) processing to support FDSC communications consistent with embodiments.

Cell topology, including the location and path loss to and from one or more, or each, of the WTRUs may not be known initially, and may change with time. FIGS. 10A-10B show techniques that may be used at the BS and one or more, or all, of the WTRUs to assist in configuring the FDSC communications.

In FIG. 10A, the BS may determine (e.g., measure or estimate) the Tx-Rx coupling for one or more, or each, Tx path (e.g., one or more, or each, signal transmitted to a WTRU for which at least some power may be coupled back into the receiver and may interfere with demodulation of one or more, or all, received signals). These measurements may be preconfigured values (e.g., predetermined, precalibrated, or the like). Since environmental effects, such as reflections, may impact the coupling, real time measurements may be used, perhaps in addition to or in combination with preconfigured values and/or stored values from previous measurements. There may be multiple antenna elements, multiple antennas, use of beamforming, adjustments based on Tx power level, or other effects that may cause different values for different Tx-Rx paths. Multiple measurements may be useful, and in some embodiments perhaps required.

The BS may determine (e.g., measure or estimate) the reception signal quality from one or more, or each, WTRU (e.g., those WTRUs that may be a candidate for FDSC communications). The signal quality estimate or measurement may be, for example, the received SNR; bit, symbol or packets error rates; error vector magnitudes (EVMs); ACK/NACK counts; or successful/unsuccessful CRC or checksum counts, among others.

The BS may determine one or more WTRUs that may be candidates for FDSC communication, and in some embodiments may construct a list of such WTRUs (e.g., organize or collect the identifiers of the candidate WTRUs in some kind of fashion, such as but not limited to in a record or table in a memory, or the like). The BS may use, for example, one or more of: a criterion similar to equation (3), such as the degree to which CL−PL exceeds $SNR_{req'd}$ (or an SNR threshold); thresholds applied to the quality estimates; thresholds applied to up/down counters that may be incremented or decremented based on the quality estimates; or a combination of the criteria described herein to make the determination of candidates and/or compile the list of candidates.

In some embodiments, the list may include a figure of merit for one or more, or each, WTRU that may be based on one or more of the measurements and/or quality criteria and may be used to rank or select the best candidates for FDSC operation, which may be believed to be most likely to support the best communications performance according to one or more of the quality parameters. The list may include parameter limits or ranges associated with some entries, such as maximum Tx power permitted or minimum Rx power required or useful. The maximum Tx power may be specified to avoid using a level that may cause distortion due to power amplifier nonlinearities or other effects that may limit the degree of cancellation that may be achieved. The minimum Rx power may be related to the receiver sensitivity that can be achieved when interference suppression algorithms may be active. The list may include more than one entry for one or more, or each, WTRU if a WTRU can support various modes of operation, for example, various modulation coding sets (MCS), and/or various FDSC configurations. In some embodiments, the base station may consider input or inputs from one or more WTRUs that may have performed determinations of their own regarding their capabilities of FDSC communication. The inputs from the one or more WTRUs may include one or more of the parameters either the same as or similar to those described herein from the perspective of the base station's FDSC communication capability determinations.

Embodiments contemplate that at least one algorithm may assign the timeslots as FDSC allocated timeslots. One or more algorithms may determine a number of timeslots to allocate to FDSC communications, which WTRUs to assign to FDSC operation (e.g., from the list of WTRUs that are candidates for FDSC operation), and/or which timeslots to assign to one or more, or each, WTRU assigned to FDSC operation. The algorithm may include criteria based on the mobility of the WTRUs, and may in some embodiments prefer to assign WTRUs to FDSC operation that may be less likely to quickly move out of the full duplex footprint, for example. Embodiments contemplate that propagation. WTRU locations, interferers, and/or other cell topology parameters may change with time. Embodiments contemplate that one or more timeslot assignment algorithms may, for example, maximize the data throughput in a cell, guarantee some level of service to each WTRU in a cell, and/or a combination of criteria.

The BS may continue to measure and estimate parameters and/or periodically construct or update the list of candidate WTRUs, perhaps during FDSC communication. Alternatively or additionally, embodiments contemplate that some of the estimates and/or measurements may have inaccuracies which may prevent the FDSC communications from being successful. By continuing the measurements and/or estimates during FDSC operation, one or more parameters may be adjusted and/or timeslots may be reassigned based on improved data, which may increase the likelihood of successful FDSC communication.

WTRUs that may be capable of performing the measurements and/or estimates may execute a process as shown in FIG. 10B (that may in some embodiments be similar to a BS procedure as described with respect to FIG. 10A). The WTRUs may make measurements in one or more, or all, timeslots. In some embodiments, the WTRUs may be directed to make such measurements by the BS. As part of the process, one or more WTRUs may determine if they can respectively support FDSC operation (e.g., rather than determining the ability of other WTRUs ability to perform FDSC communication and/or constructing a table containing data about FDSC communication parameters of other WTRUs). A WTRU may communicate the measurements, quality estimates, conclusions regarding its suitability for FDSC operation, and/or other pertinent data to the BS which may use one or more, or all, of the data in the determination of which WTRUs are FDSC communication capable and/or in constructing the table of WTRU candidates and/or executing the timeslot assignment algorithm.

Embodiments contemplate that, perhaps initially, measurements and estimates may be useful (and in some embodiments perhaps required) before timeslots may have been allocated. In some embodiments, the process of continuing the measurements and/or estimates may be performed after timeslots may have been allocated to improve the timeslot allocations and/or achieve improved signal quality at the BS or WTRU; and/or to improve capacity. For example, timeslots may be initially assigned as TDD timeslots. This may establish communication links to measure signal quality during active links and exchange measurements. This may then be used to configure certain timeslots for FDSC operation.

Table 2 is an example of a list (e.g. visual depiction of a record or records in a memory) a BS may maintain as part of the FDSC timeslot assignment process. The first column shows that five WTRUs may be possible FDSC candidates. The second column shows a measurement of the Tx to Rx coupling. The third column is an example of a parameter limit, showing the maximum Tx power that can be used in a FDSC mode. The fourth column has a further subdivision for one or more, or each, WTRU according to the MCS values one or more, or each, WTRU can use, where a higher MCS indicates a more complex modulation coding set that may communicate information at a higher rate but may require or find useful a higher received SNR. The required or useful SNR values are shown in the fifth column. The sixth column contains one criterion for an FDSC candidate which may be a minimum acceptable value of the estimated CL minus PL. This criterion may derive from equation (3), and in some embodiments may be computed by adding a 3 dB margin onto the required or useful SNR.

The seventh column contains a measured or estimated value of the BS Tx power to one or more, or each, UE (WTRU). The eighth column contains a measured or estimated value of the WTRU Tx power. Examples of ways the BS can obtain the WTRU Tx power include but may not be limited to the value being provided to the BS from the WTRU over a control or signaling channel; the value being prescribed to the WTRU by the BS; and/or the value being computed at the BS using the same rules, or approximations to the rules, that the WTRU uses to compute its Tx power. The ninth column contains a measured or estimated value of the Rx power from one or more, or each UE.

The tenth column is an example of an FDSC figure of merit for one or more, or each UE. It is an estimate of the CL minus the PL, where the CL estimate may be the measurement entered in the second column and the PL estimate may be the difference between the WTRU Tx and Rx powers entered in the eighth and ninth columns, respectively. In one or more embodiments, this figure of merit may be selected so it can be compared to the minimum acceptable value of CL minus PL entered in the sixth column.

The last column identifies the FDSC candidates and the usable MCS for one or more, or each, candidate. By way of

TABLE 2

Example of a list of FDSC candidates.

| UE # | CL = Tx-Rx Coupling (dB) | Max $P_{Tx\text{-}Bs}$ (dBm) | MCS | $SNR_{req'd}$ (dB) | Min CL − PL (dB) | Current Values $P_{Tx\text{-}Bs}$ (dBm) | $P_{Tx\text{-}UE}$ (dBm) | $P_{Rx\text{-}UE}$ (dBm) | FDSC Figure of Merit CL − ($P_{Tx\text{-}UE}$ − $P_{Rx\text{-}UE}$) (dB) | FDSC Candidate? |
|---|---|---|---|---|---|---|---|---|---|---|
| 1 | 71.5 | 15.0 | 1 | 5.0 | 8.0 | −12.0 | −12.0 | −70.5 | 13.0 | X |
|  |  |  | 2 | 9.0 | 12.0 |  |  |  |  | X |
|  |  |  | 3 | 13.0 | 16.0 |  |  |  |  |  |
|  |  |  | 4 | 17.0 | 20.0 |  |  |  |  |  |
| 2 | 73.0 | 15.0 | 1 | 5.0 | 8.0 | −4.0 | −4.0 | −67.0 | 10.0 | X |
|  |  |  | 2 | 9.0 | 12.0 |  |  |  |  |  |
|  |  |  | 3 | 13.0 | 16.0 |  |  |  |  |  |
|  |  |  | 4 | 17.0 | 20.0 |  |  |  |  |  |
| 3 | 71.0 | 15.0 | 1 | 5.0 | 8.0 | −2.0 | −2.0 | −54.5 | 18.5 | X |
|  |  |  | 2 | 9.0 | 12.0 |  |  |  |  | X |
|  |  |  | 3 | 13.0 | 16.0 |  |  |  |  | X |
|  |  |  | 4 | 17.0 | 20.0 |  |  |  |  |  |
| 4 | 69.5 | 15.0 | 1 | 5.0 | 8.0 | 10.0 | 10.0 | −65.0 | −5.5 |  |
|  |  |  | 2 | 9.0 | 12.0 |  |  |  |  |  |
|  |  |  | 3 | 13.0 | 16.0 |  |  |  |  |  |
|  |  |  | 4 | 17.0 | 20.0 |  |  |  |  |  |
| 5 | 70.0 | 15.0 | 1 | 5.0 | 8.0 | 20.0 | 33.0 | −38.5 | 11.5 |  |
|  |  |  | 2 | 9.0 | 12.0 |  |  |  |  |  |
|  |  |  | 3 | 13.0 | 16.0 |  |  |  |  |  |
|  |  |  | 4 | 17.0 | 20.0 |  |  |  |  |  | example, and not limitation, the rule that may be used in this example may be that the figure of merit in the tenth column may be greater than or equal to the minimum acceptable value of CL minus PL in the sixth column and the BS Tx power in the seventh column may be less than or equal maximum permitted power in the third column. In this example it can be seen that WTRUs #1, #2, and #3 may be FDSC candidates with one or more acceptable MCS values. WTRU #4 may not a candidate because the figure of merit may be too low. WTRU #5 may be not a candidate because the BS Tx power may be too high.

In one or more embodiments, the timeslot allocation decisions may be semi-static, that is, changes may be made on a timescale that may be long compared to a frame length. Alternatively or additionally, the decisions may be scheduling-type decisions that may be made on a frame-by-frame basis, or other timescale that may be shorter than or no more than a few frames. Scheduling-type decisions may consider data that may be queued for Tx on either side of the link as part of the decision, where such data queue status may be reported on a real-time or near real-time basis. A hybrid approach may also be considered where the allocation of timeslots as UL, DL, or FDSC may be semi-static but the use of an FDSC timeslot as UL, DL, or FD may be scheduled.

Embodiments contemplate full duplex base stations with half duplex WTRUs (or WTRUs). One or more systems where the base station may be FDSC capable and selected FDSC capable UE's participate in FDSC communications were described previously herein. Since FDSC capability may impose additional design requirements on a device, for purposes of backwards compatibility; or avoiding the cost, size, or power of additional features; it would be useful to provide a system-level FDSC capability that may be compatible with devices at one end of the link that may be half duplex (HD).

Figure 11:
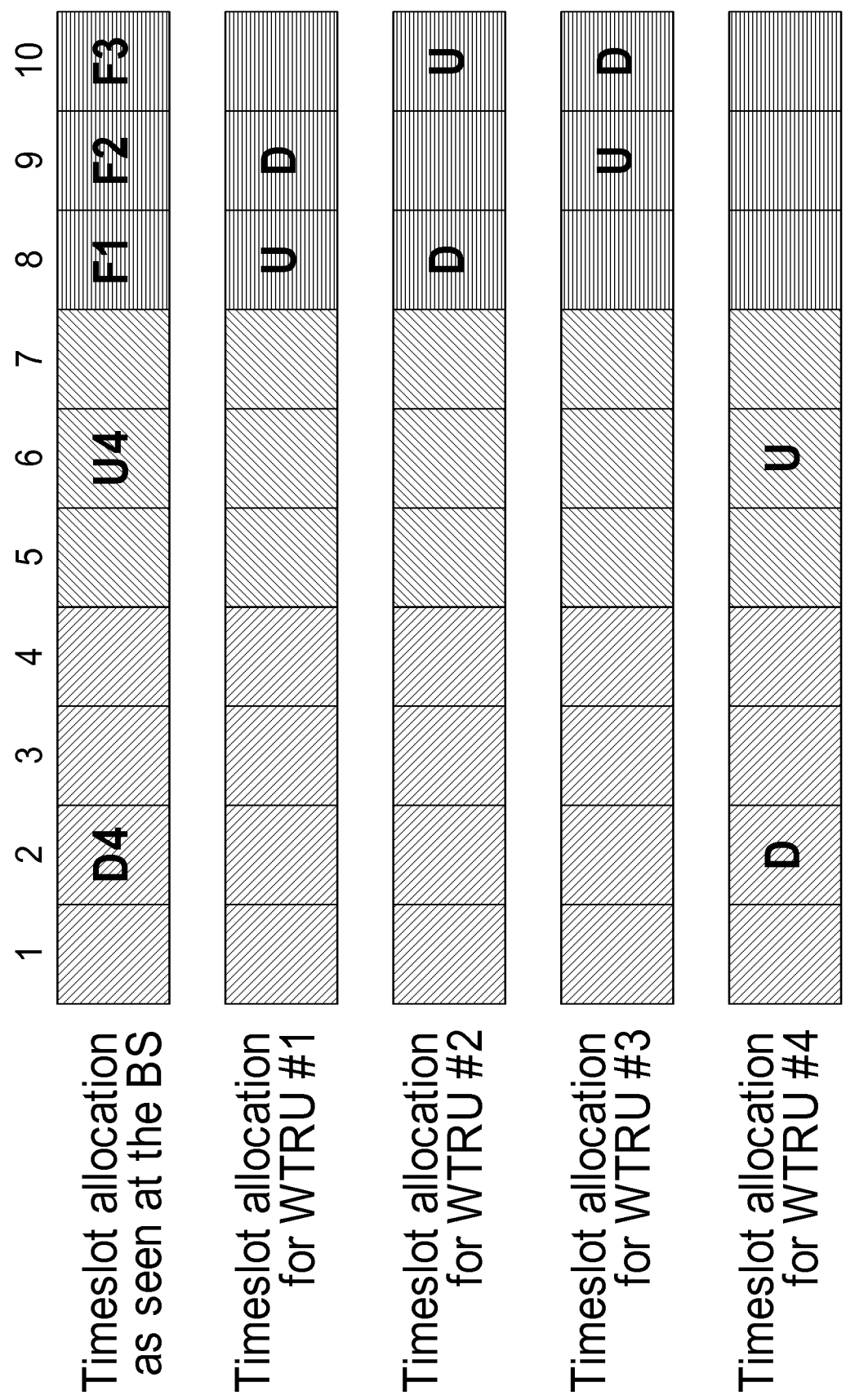
FIG. 11 is an illustration of exemplary timeslots allocated to FDSC operation with half duplex WTRUs consistent with embodiments.

Referring back to FIGS. 8A-8C, by way of example and not limitation, one or more embodiments may assume that the BS may be FDSC capable and one or more, or all, WTRUs may be capable of HD operation (perhaps only HD operation). From the BS viewpoint, timeslots may operate in the FDSC mode, however the WTRUs may require or find useful timeslots that may be either UL or DL (perhaps only UL or DL). FIG. 11 is an example of how this can be accomplished. Assume that WTRUs #1, #2, and #3 may be within a footprint that can support FDSC operation. The BS treats timeslots #8, #9, and #10 as FDSC, but one direction (perhaps only one direction) of transmission may be assigned to one or more, or each, UE. For example, WTRU #1 may be assigned timeslot #8 for UL use, and timeslot #9 for DL use. WTRU #2 may be assigned timeslot #8 for DL use, and timeslot #10 for UL use. WTRU #3 may be assigned timeslot #9 for UL use, and timeslot #10 for DL use. WTRU #4 may be assigned timeslot #2 for DL use, and timeslot #6 for UL use where timeslots #2 and #6 may be HD timeslots at both the BS and WTRU #4. Timeslots #8, #9, and #10 may be HD for one or more, or each, UE, but FD for the BS. For example, in timeslot #8 the BS may receive from WTRU #1 and transmit to WTRU #2. Similarly in timeslot #9 the BS may transmit to WTRU #1 and receive from WTRU #3.

In one or more embodiments, even though the WTRUs may be HD, the system may determine (and in some embodiments must determine) which WTRUs can be assigned timeslots that the BS may use for FDSC operation. This is similar to previously described embodiments, however, for the HD device, the in-cell interference that appears in an FDSC-allocated timeslot may come from another WTRU rather than the BS, for example.

Figure 12:
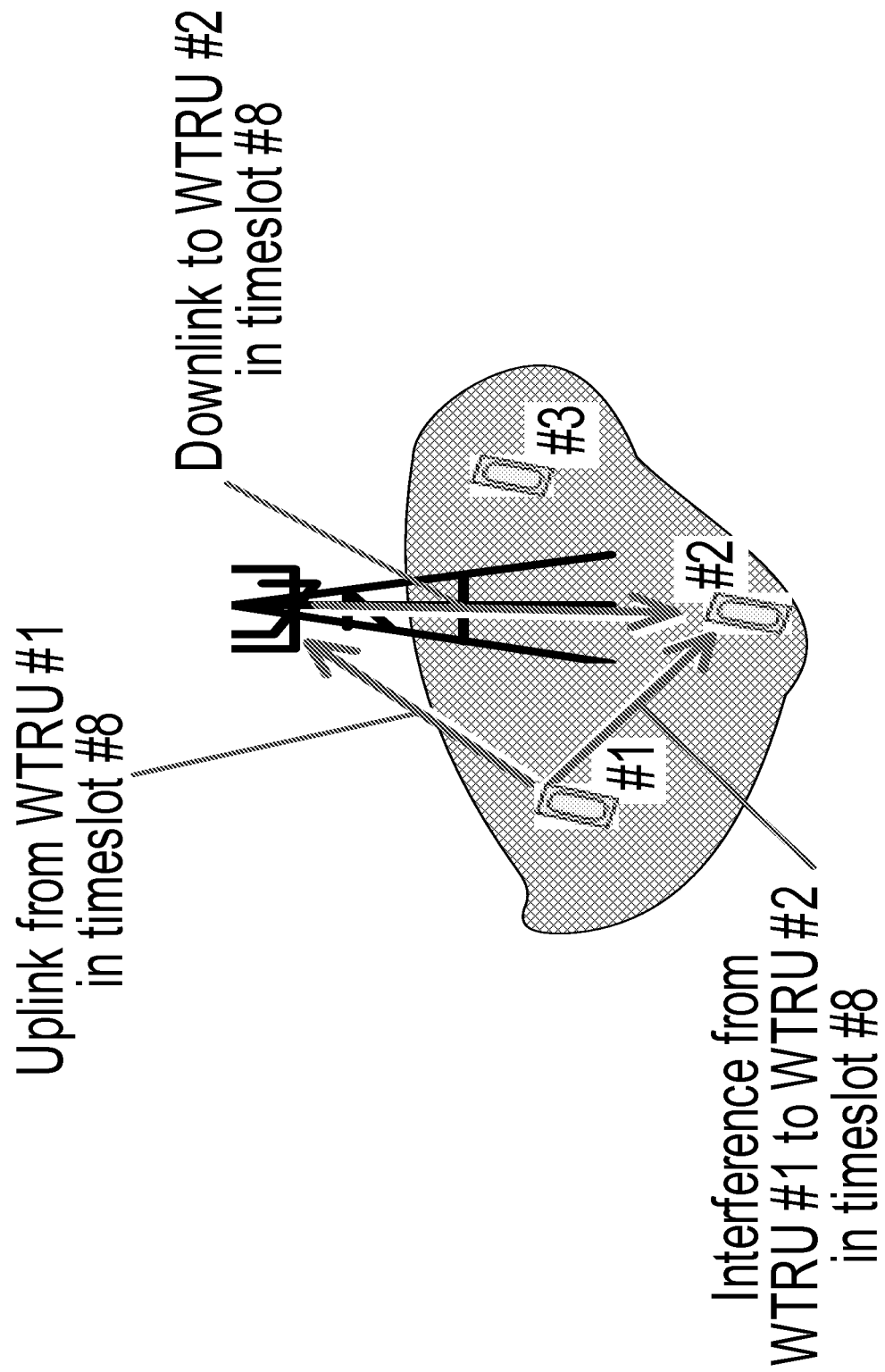
FIG. 12 is an illustration of exemplary desired and interfering signals in FDSC operation with HD WTRUs consistent with embodiments.

Embodiments contemplate that further understanding may be developed by a simple analysis similar to equations (1) and (2). As an example, consider timeslot #8 from FIG. 11 and the desired and interfering signals shown in FIG. 12. One or more embodiments may assume that a significant (perhaps the only significant) interference for BS FDSC operation may be the BS's own Tx signal. WTRU #2 may be the HD WTRU with the DL timeslot assignment. One or more embodiments may assume that the significant (perhaps the only significant) interference to WTRU #2 may be the Tx signal from WTRU #1 which may have the UL assignment.

By way of example, and not limitation, one or more embodiments may define the following values in dB or dBm, as appropriate:

$P_{BS}$=Tx power from the BS;
$P_{UE1}$=TX power from WTRU #1;
$PL_{1-BS}$=Radio propagation loss from WTRU #1 to the BS;
$PL_{1-2}$=Radio propagation loss from WTRU #1 to WTRU #2;
$PL_{BS-2}$=Radio propagation loss from the BS to WTRU #2;
$CL_{BS}$=Coupling loss of the transmit signal back into the receiver at the BS;
$IC_{2-1}$=Interference cancellation of the signal from WTRU #1 at WTRU #2;
$SNR_{req'd-BS}$=Signal-to-noise ratio required by or useful to the BS to demodulate the desired signal from WTRU #1; and/or
$SNR_{req'd-2}$=Signal-to-noise ratio required by or useful to WTRU #2 to demodulate the desired signal from the BS.

One or more embodiments contemplate that successful demodulation at the BS may follow equation (1) with just a change of subscripts:

$$(P_{UE1}-PL_{1-BS})-(P_{BS}-CL_{BS}) > SNR_{req'd-BS} \qquad (5)$$

One or more embodiments contemplate that successful demodulation at WTRU #2 may depend on sufficient received power from the BS and sufficiently low interference from WTRU #3.

$$(P_{BS}-PL_{BS-2})-(P_{UE1}-PL_{1-2}-IC_{2-1}) > SNR_{req'd-2} \qquad (6)$$

In equation (6), $P_{BS}-PL_{BS-2}$ equals the Rx power from the BS at WTRU #2. $(P_{UE1}-PL_{1-2})$ is the interference from WTRU #1 that appears at WTRU #2 which may be calculated as the Tx power from WTRU #1 less the path loss to WTRU #2. Equation (6) includes the terms $(P_{UE1}-PL_{1-2}-IC_{2-1})$ which may further reduce the interference by assuming interference cancellation may be performed at WTRU #2 on WTRU #1's signal.

In a full duplex radio, the CL may comprise the effect of various possible interference cancellation techniques as described herein. Since the source of the interference may be the Tx signal from the same radio, a local copy of the interference source may be available and may generally be used in the interference cancellation algorithm. Some embodiments contemplate that the interference cancellation referenced in equation (6) may not have that benefit since the interference may come from a different UE. Nevertheless there may be numerous receiver architectures that can be used for interference cancellation including for example, successive interference cancellation (SIC) and/or parallel interference cancellation (PIC).

One or more embodiments contemplate that antenna directionality, beamforming, and/or null steering can benefit performance. From the expression for free space propagation loss in equation (4), and the definition of PL in the paragraph that follows equation (4), embodiments contemplate that beamforming may increase the antenna gain in the direction of the BS from WTRU #1 and in the direction of WTRU #2 from the BS may make the inequalities of equations (5) and (6) easier to satisfy. Further, a very low antenna gain, e.g., null steering, in the direction of WTRU #2 from WTRU #1 may increase $PL_{1-2}$ which may decrease the interference at WTRU #2 and may make equation (6) easier to satisfy.

Figures 13A, 13B:
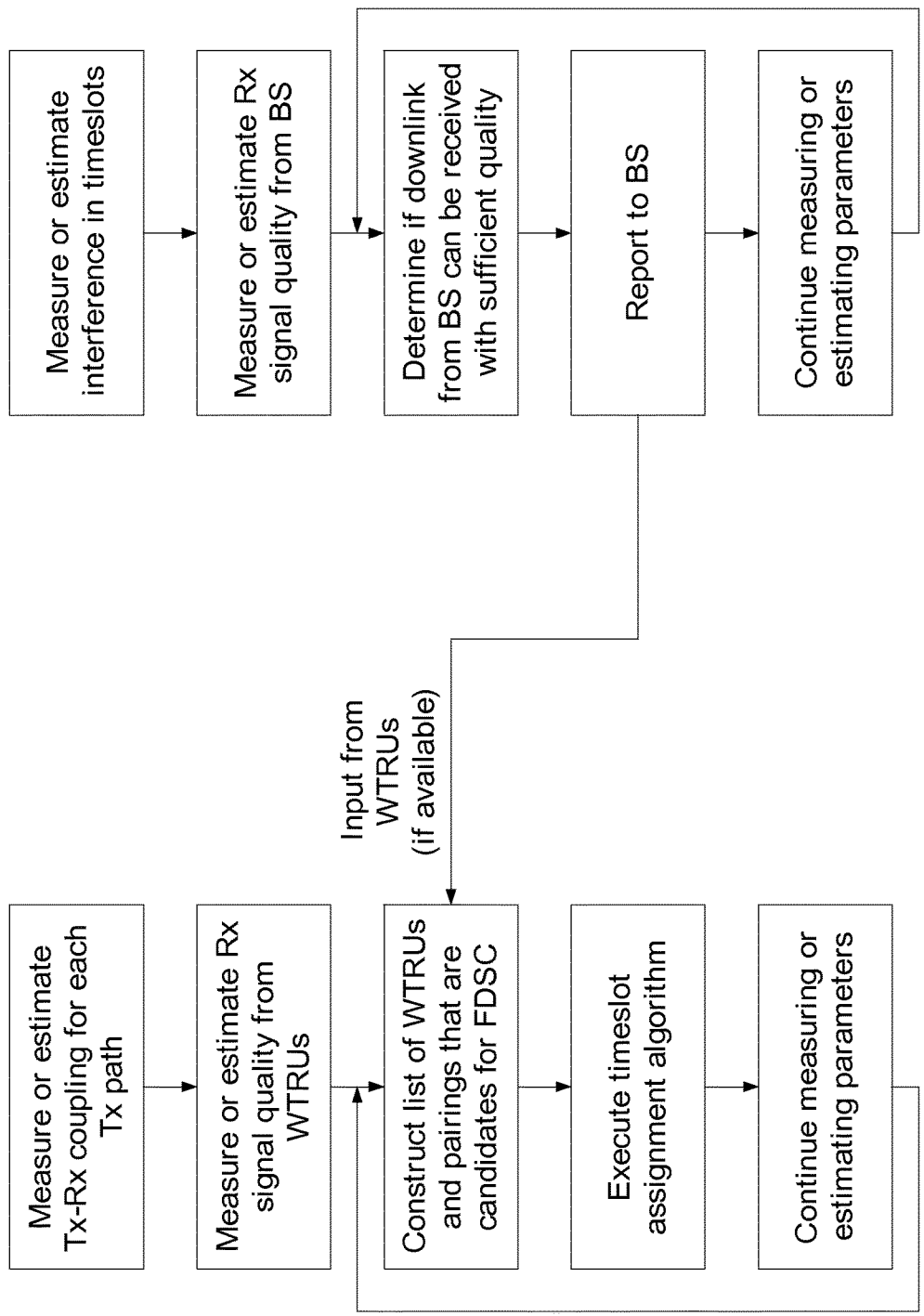
FIGS. 13A-13B illustrate example techniques for a base station (BS) and/or WTRU processing to support FDSC communications with HD WTRUs consistent with embodiments.

In some embodiments, perhaps even considering the usefulness of interference cancellation and beamforming, it may be reasonable to expect that two WTRUs sharing a timeslot may be sufficiently separated to prevent the UL transmission from preventing demodulation of the downlink signal. Embodiments contemplate one or more techniques to determine if the BS may allocate some slots to FDSC operation and which HD WTRUs may be assigned to those slots. An example of such a technique is shown in FIGS. 13A-13B. One or more of the first two elements in FIG. 13A may be the same or similar as shown in regard to FIG. 10A and may represent the measurements a BS may perform to determine if the BS can operate some or any timeslots FDSC mode. That is, measurements to determine whether the BS may be able to select timeslots such that there is, or can be with appropriate parameter selection, sufficiently low coupling of the BS Tx signal into the BS Rx path and/or a sufficiently strong signal from one or more WTRUs such that the WTRU signal can be successfully demodulated.

Embodiments may include determining one or more WTRUs that may be candidates for HD operation in timeslots the BS may use in the FDSC mode (e.g., FDSC from the BS perspective and HD from the WTRUs perspectives). In some embodiments, a list of such WTRUs may be constructed. This may be similar to and/or used in combination with the techniques described in reference to FIG. 10A and described herein. In some embodiments, the BS may also consider (and in some embodiments perhaps must also consider) whether the WTRU may be able to receive the BS DL signal given potential interference from a different WTRU sharing the timeslot for its own UL, among other considerations. In some embodiments, the BS may pair WTRUs (and in some embodiments perhaps must pair WTRUs) such that the DL signal can be demodulated using at least one criterion, that may be based on, for example, equation (6) and/or other measurements or estimates of signal quality.

For example, in FIG. 11, WTRUs 1 and 2 are paired in timeslot 8, WTRUs 1 and 3 are paired in timeslot 9, and WTRUs 2 and 3 are paired in timeslot 10. In some embodiments, the BS may attempt to do this autonomously based on estimates of WTRU parameters and propagation that may be derived from the cell topology or other deployment-related information, location data, and/or previous measurements from WTRUs. In addition, or alternatively, the process may include a degree of trial and error where timeslots assignments may be made, then may be adjusted if communications may not be successful. Unsuccessful communications can be indicated by lack of ACK signals from the WTRU, or other control signaling that may be exchanged on an UL channel once they may be configured, for example.

Embodiments contemplate that, perhaps when aforementioned determinations have been made and/or the list of WTRUs and/or pairings may be available, an algorithm may assign the timeslots. The algorithm may determine the number of timeslots to allocate to FDSC communications, which WTRUs to assign to FDSC operation, and which slots to assign to one or more, or each, WTRU. The algorithm may include criteria based on the mobility of the WTRUs, and may assign WTRUs to FDSC operation that may be less likely to quickly move out of the full duplex footprint or move closer to another WTRU which may significantly change the interference levels. Embodiments contemplate that propagation, WTRU locations, interferers, and other cell topology parameters may change with time. The BS may continue to measure and estimate parameters and periodically construct or update the list of candidate WTRUs. Additionally or alternatively, in some embodiments, the estimates and/or measurements may have inaccuracies in them which may prevent the FDSC communications from being successful. In some embodiments, perhaps by continuing the measurements and/or estimates during FDSC operation, parameters may be adjusted and/or timeslots may be reassigned based on improved data which may improve the likelihood of successful FDSC communication.

As shown in FIG. 13B, embodiments contemplate that the techniques of FIG. 13A may be augmented by including measurements from WTRUs that may be provided to the BS to use in the timeslot assignment algorithm. The WTRUs may measure interference in one or more, or all, timeslots, timeslots allocated for DL operation (in some embodiments perhaps only such timeslots), or timeslots they may be directed to measure by the BS. For example, to reduce the number of measurements required or useful, the BS may direct certain WTRUs to make measurements during Tx timeslots that may be candidates for FDSC operation and may be already assigned as UL timeslots to other WTRUs.

Embodiments contemplate that the WTRU measurements may be performed before the timeslot allocations in which case preallocated or common control channels may (and in some embodiments may be required) to communicate the data to the BS. Alternatively, the measurements can be performed after timeslots may have been allocated to monitor performance or to support revised allocations that may achieve improved signal quality at the BS or WTRU or improve capacity. For example, timeslots may be initially assigned as TDD timeslots for the BS and WTRU. This may establish communications links to measure signal quality during active links and exchange measurements. This may then be used to configure certain timeslots for FDSC operation, for example.

Embodiments contemplate Full Duplex Base Stations with FDSC-capable and Half Duplex WTRUs. A cellular network may include an FDSC-capable BS and a combination of FDSC-capable and HD WTRUs. Timeslots may be allocated according to the device capabilities using a combination of the processes described herein.

Figure 14:
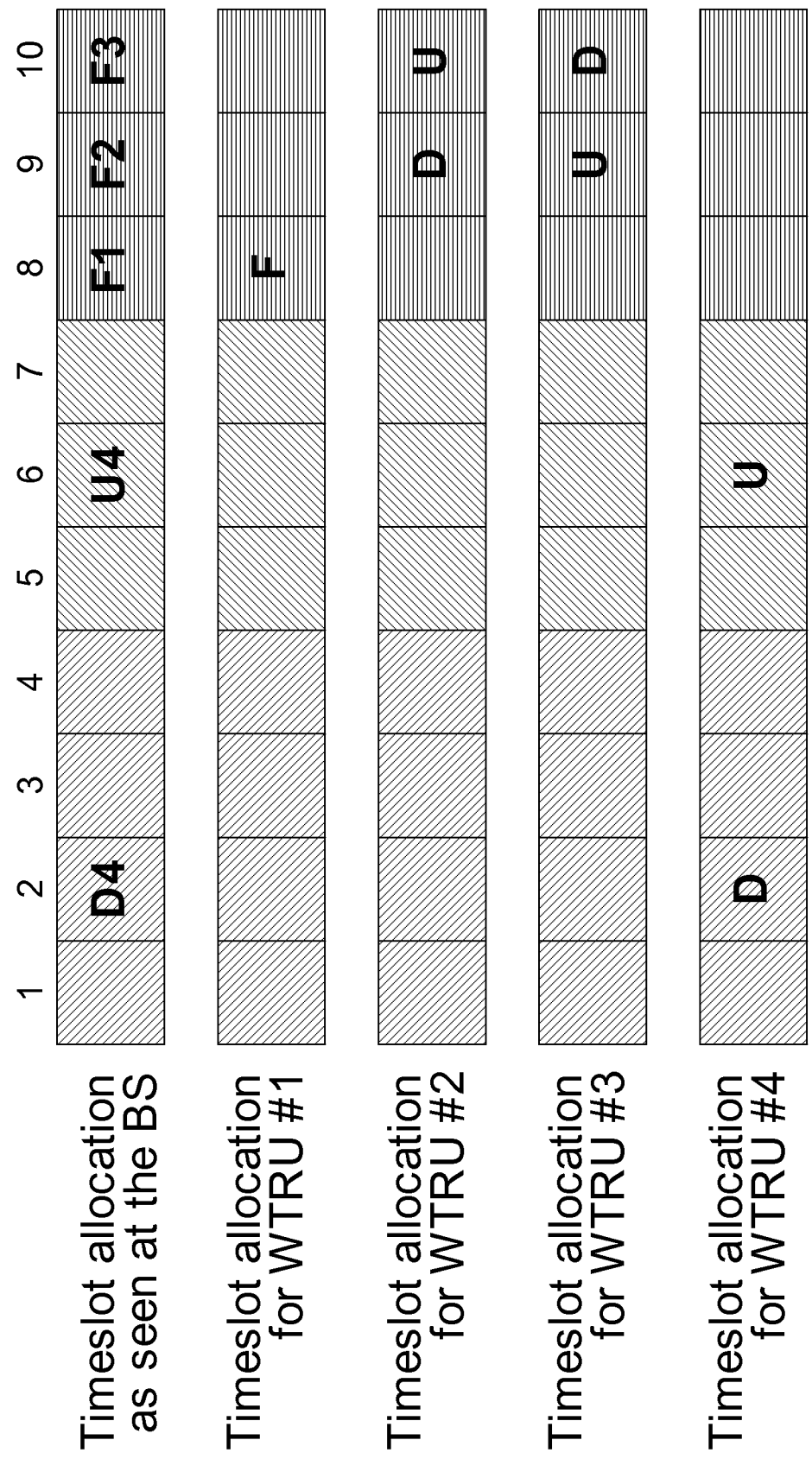
FIG. 14 is an illustration of exemplary timeslots allocated for a combination of FDSC-capable and half duplex WTRUs consistent with embodiments.

FIG. 14 is an example of a timeslot allocation where WTRU #1 may be FDSC capable and WTRUs #2 and #3 may not. From the BS viewpoint (or perspective), timeslots #8, #9, and #10 may be allocated for FDSC operation. Since WTRU #1 may be FDSC-capable, its timeslot may also be allocated for FDSC operation, that is, both UL and DL. WTRU #2 may be allocated timeslot #9 for the DL and timeslot #10 for the UL, and WTRU #3 may be given the opposite allocation. WTRU #4 may be given the allocation shown.

Embodiments contemplate that an FDSC-capable device can operate in FDSC or HD modes. Also, a timeslot that may have been designated for FDSC operation may operate as an UL or DL timeslot, for example.

Analyses described herein, for example equations (1) through (6), address at least in part the Tx to Rx interference caused within the FDSC device or from another device sharing an FDSC timeslot. However, embodiment recognize that there may be sources of interference such as adjacent channel interference, inter-cell interference, and/or other intentional or unintentional man-made interference that may impact performance of a communication link. Embodiments recognize radio resource management (RRM) techniques in cellular system design that may address interference issues.

One or more embodiments contemplate that, for cellular deployments—among other deployments, the FDSC footprint may be concentrated around the base station rather than near the cell edge where inter-cell interference may be a greater concern, for example. Embodiments contemplate that adjacent channel interference and other intentional or unintentional man-made interference remain an issue as with one or more, or all, cellular systems.

One or more embodiments contemplate that the measurements and processes described herein, and in reference to FIGS. 10A-10B and FIGS. 13A-13B, may include the effects of one or more, or all, interference and such interference may be reflected in timeslot assignments or other resource scheduling decisions.

Embodiments contemplate that a common allocation of TDD UL and DL timeslots may be used across a multi-cell system, and/or a group of nearby cells. This may also be considered for the FDSC extensions, where a certain group of timeslots may be designated, or semi-statically allocated, as available for FDSC operation over a group of cells. The timeslots may be specifically designated as either DL/FDSC, and/or UL/FDSC, to limit the local allocation rules consistent with broader system-level RRM requirements, for example.

Embodiments contemplate a full duplex control channel. Since a lower level Tx signal may create less interference on the Rx path, a system may limit the use of FDSC to a low power auxiliary channel. For example, FIG. 15A shows a radio that may multiplex the transmission of system control data along with Tx data from higher layers of the protocol stack. FIG. 15B is an example that shows a continuous low power BS transmission simultaneous with another multiple access protocol among the BS and network users. The other multiple access technique may be TDD and may use any of the duplexing techniques and/or frequency spacings described herein. At any time within the signal where the BS may transmit (and perhaps in some embodiments must transmit) control channel data simultaneously with other Tx data transmission with a frequency duplex spacing that may not be compatible with conventional filter-based receiver techniques, the FDSC approaches contemplated herein may apply.

In some embodiments, the auxiliary signal may be a low power signal. It may operate at a low data rate compared to the data rate of the other Tx Data signal shown in FIG. 15A. The auxiliary signal may include a large amount of forward error correction (e.g., a low rate code), or spread spectrum coding, to improve the ability of a receiver to demodulate it in the presence of other received signals or undesired interference. Since the devices intended to receive the auxiliary signal may not have FDSC capability, and may ignore (in some embodiments perhaps need to ignore) the Rx signal during Tx events, the auxiliary signal may be encoded such that decoding can be successful regardless of the periodic or occasional UL interruptions. For example, it may include repetition of one or more, or all, or parts of the message, repetition of one or more, or all, parts of the parity bits, and/or may use a rateless code that may be decoded with any sufficient set of decoded symbols, for example LT codes.

Embodiments contemplate that there may be various reasons to blank the auxiliary signal and not use FDSC during certain intervals as shown in FIG. 15C. This may be useful, for example, during BS transmit intervals where the control data may be multiplexed into the Tx Data at a higher protocol layer, or to minimize the risk of missing the reception of high priority Rx signals at certain times, and/or to provide the opportunities to receive low level Rx signals that may be below the receiver sensitivity when FDSC may be active.

Embodiments contemplate interoperability with WiFi, Zigbee, and other wireless systems. The description of FDSC operation herein may be focused on cellular operation. Alternatively or additionally, the contemplated design concepts may be applied to other wireless systems including those based on 802.11, or WiFi certified, and/or 802.15.4 systems which may include Zigbee devices, and/or other wireless devices and networks that may comply with industry or proprietary standards.

For example, a WiFi access point or 802.15.4 network coordinator may take the role of determining and assigning which terminals may participate in FDSC modes similar to the processes described herein. Similarly, the contemplated techniques can be applied to one or more members in various network configurations including, for example, infrastructure, ad hoc, star, and peer-to-peer.

Embodiments contemplate a continuous auxiliary or control channel, similar to the embodiments described herein, may be transmitted by an AP, network coordinator, or other network member. For example, a configuration may have (and in some embodiments may only have) an AP or network coordinator that may be FDSC capable so it may transmit the continuous channel that may enable other HD devices to more quickly synchronize to, or join, the network. Embodiments contemplate that this may decrease the "on time" of the very low power devices, reduce their power consumption, and/or increase the battery life.

Figure 16:
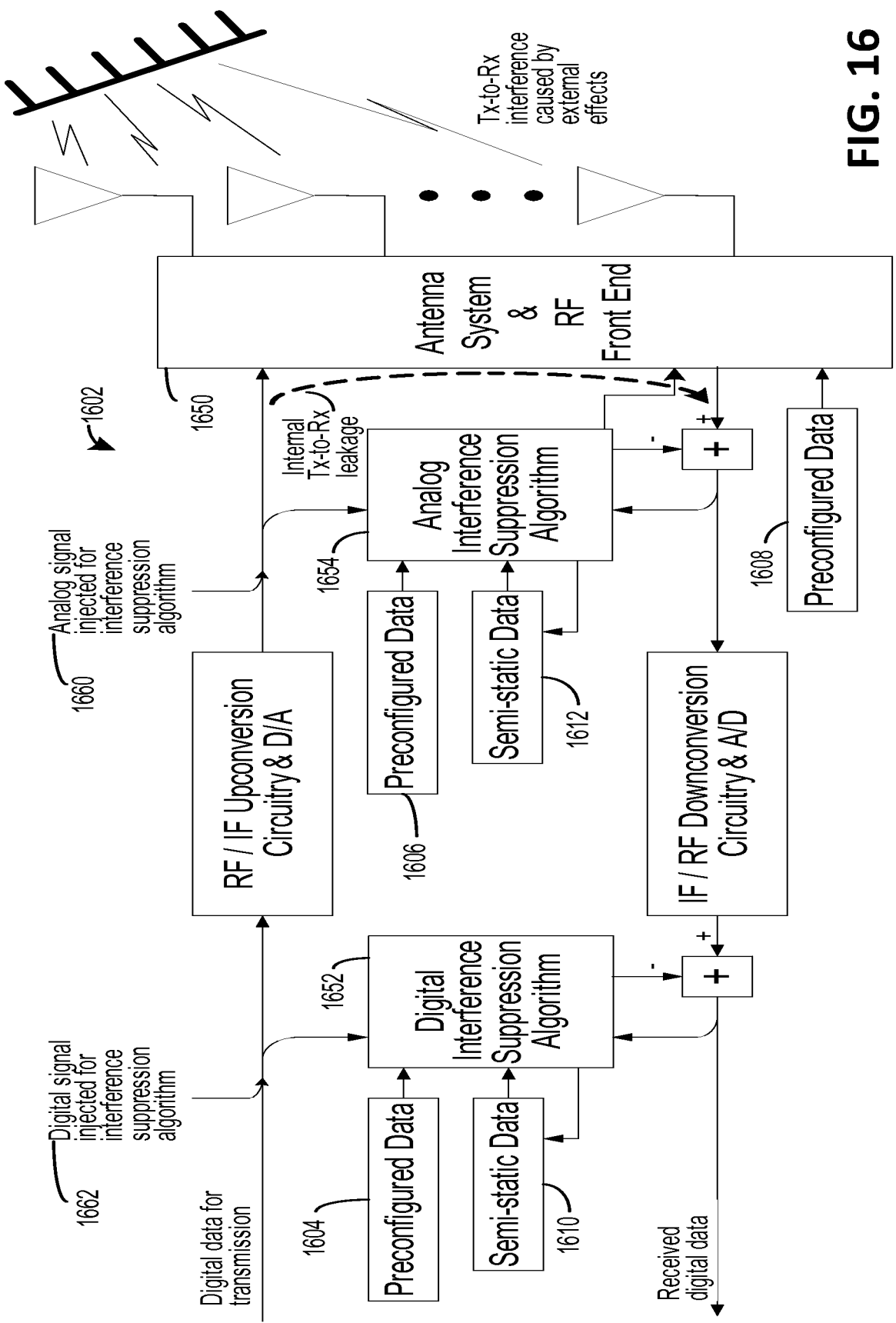
FIG. 16 is an illustration of exemplary interference suppression architecture for FDSC operation consistent with embodiments.

Embodiments contemplate interference suppression architecture and techniques. FIG. 16 is a block diagram of a transceiver 1602 (example of a wireless transmit/receive unit) that may be capable of FDSC operation. The device may have at least three levels of interference (e.g., Tx interference and/or Tx-Rx interference (external and/or internal)) suppression that as described herein: antenna, analog, and/or digital. The antenna interference suppression may be integrated into the antennas and Antenna System and RF Front End block 1650 (e.g., an antenna interference suppression system, subsystem, and/or process). The analog and digital interference suppression systems, subsystems, and/or processes 1652 and 1654 are also illustrated in FIG. 16.

Embodiments contemplate that the suppression algorithms may be, at least to some extent, preconfigured based on design calculations, and/or calibration during the manufacturing and testing process. There may be adjustable components that control impedances, delays, attenuations, and/or other parameters in the antenna system and RF front end block (e.g., antenna interference suppression system, subsystem, and/or process 1650) for which initial settings or initial values may be determined and stored, for example, in one or more memory devices indicated as Preconfigured Data 1604, 1606, 1608. Similarly, one or more respective digital and analog interference suppression systems, subsystems, and/or processes 1652 and 1654, may include algorithms for the analog and/or digital interference suppression may be preconfigured with algorithm coefficients and/or other parameters that may be stored, for example, in one or more memory devices indicated as Preconfigured Data 1604 and 1606.

The Preconfigured Data 1604, 1606, 1608 may be read from memory when the device may be powered-on, when the algorithm may be first activated, and/or when the algorithm may be reset to provide an initial level of interference suppression, perhaps less than the desired value but sufficiently close to provide adaptive algorithms or further adjustments with a starting point that would aide or speed convergence to more desirable values. For example, when first turned on, the Preconfigured Data 1604, 1606, and/or 1608 may provide 35 dB of interference suppression and as the algorithms operate they may update the settings or variables to achieve closer to 85 dB of interference suppression.

Embodiments contemplate that one or more, or all, of the interference suppression algorithms may be adaptive. In some embodiments, coefficients and parameters may be modified as the algorithms operate. For example, the device characteristics that cause the leakage may vary from device-to-device, or with time, temperature, handling, installation, and/or other environmental factors. In some embodiments, the Tx signal reflections may be dependent on the deployment of the device. The coefficients and parameters may be updated via adaptive algorithms that may operate according to various rules, for example: on a periodic basis, such as every certain number of milliseconds; on an event basis, such as when powered-on, reset, and/or after a certain number of transmissions; based on measurements, such as when estimated interference suppression may fall below a threshold; and/or environment factors, such as temperature changes or significant relocation. As the algorithms adapt, new (e.g., fresh) values of settings and/or variables may be stored in one or more memory devices indicated as Semi-static Data 1610 and/or 1612.

The Semi-static Data 1610 and 1612 are shown as separate from the Preconfigured Data to indicate that, in some embodiments, the system may want to retain the Preconfigured Data for use, for example, when the equipment is first powered-on after being turned off, and/or to reinitialize certain algorithms, perhaps if they fail to converge to the desired performance, among other reasons. Alternatively or additionally, when powered-on after being turned off, the system may first access the Semi-static Data 1610 and/or 1612 on the expectation that such data may be more current and/or may provide initial performance closer to the desired value. Returning to the example above, when turned on after being off for a short time, the Preconfigured Data 1604, 1606, and/or 1608 may provide 35 dB of interference suppression, while the Semi-static data 1610 and/or 1612 may provide 50 dB of interference suppression, which may allow adaptive algorithms to reach the desired value of 85 dB suppression more quickly.

The transceiver system may include respective analog and/or digital signals (1660 and/or 1662), that may be injected perhaps to assist with (e.g., increase and/or improve) the respective analog, digital, and/or antenna interference suppression processes (1650, 1652, and/or 1654). For example, these signals may be designed with certain power levels, pulse widths, period, and/or other parameters, to exercise (e.g., make visible for correction) certain non-linearities or distortions caused by the RF front end, power amplifier, and/or other components in a controlled and/or measurable manner. They may be designed to provide a precise (e.g. predetermined) power ratio between the desired transmit signal and the injected signal, perhaps to assist in calculating power-related parameters that may be useful to (or perhaps in some embodiments required by) the adaptive algorithms. Alternatively or additionally, they may be designed to have a high processing gain or other features that may assist in characterizing and cancelling the Tx signal that may be reflected back into the receiver by external objects. The injected signals may be used during initial calibration and measurement (and in some embodiments perhaps only during initial calibration and measurement), may be used occasionally during normal operation, may be used during specific idle times or other times related to the signal design, and/or may operate continuously.

Embodiments contemplate the use of digital pre-distortion. Embodiments recognize that digital pre-distortion (DPD) may be used to pre-distort a signal while still in the digital baseband (DBB) in a such a way that after the signal may be distorted in Tx RF, in particular nonlinear distortions (e.g., such as but not limited to those in the power amplifier (PA)), the resulting signal may have reduced (e.g., much smaller) nonlinear distortion and thus lower out of band emissions (OOBE). Embodiments contemplate that the same nonlinear distortions may fundamentally limit the amount of cancellation that can be achieved by linear processing in the analog interference suppression algorithm, e.g., the analog reference signal may not capture the nonlinear distortions. In one or more embodiments, applying DPD can remove non-linear components (e.g., such as those from the output of the PA). In some embodiments, the analog reference signal may include some nonlinear components, which embodiments described herein may address.

Figure 17:
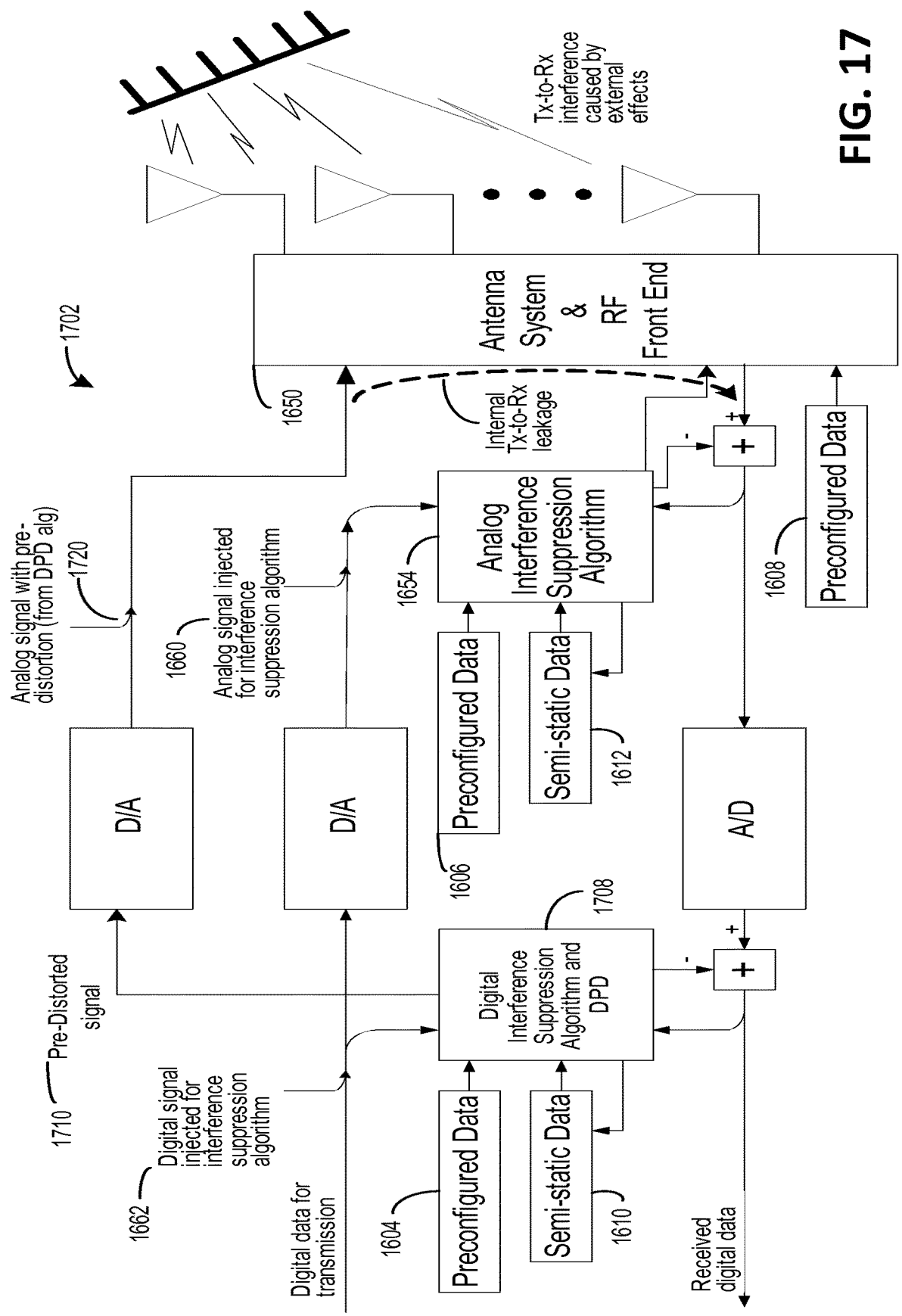
FIG. 17 is an illustration of an exemplary FDSC architecture with pre-distortion consistent with embodiments.

Embodiments contemplate one or more techniques, such as but not limited to the use of DPD. In some embodiments, a DPD analog output and/or linear analog output may be provided. For example, one may be for the RF front end and/or the other may be for the analog interference suppression algorithm. An example is shown in the FIG. 17. In FIG. 17, a transceiver 1702 (WTRU) includes many of the elements as described with reference to FIG. 16. FIG. 17 also includes a digital interference suppression system/subsystem/process 1708 which may also include DPD functionality. The digital interference process 1708 may generate the digital pre-distorted signal 1710. Also as seen in FIG. 17, the antenna interference suppression process 1650 may receive (e.g., via injection) an analog signal that includes digital pre-distortion 1720.

Figure 18:
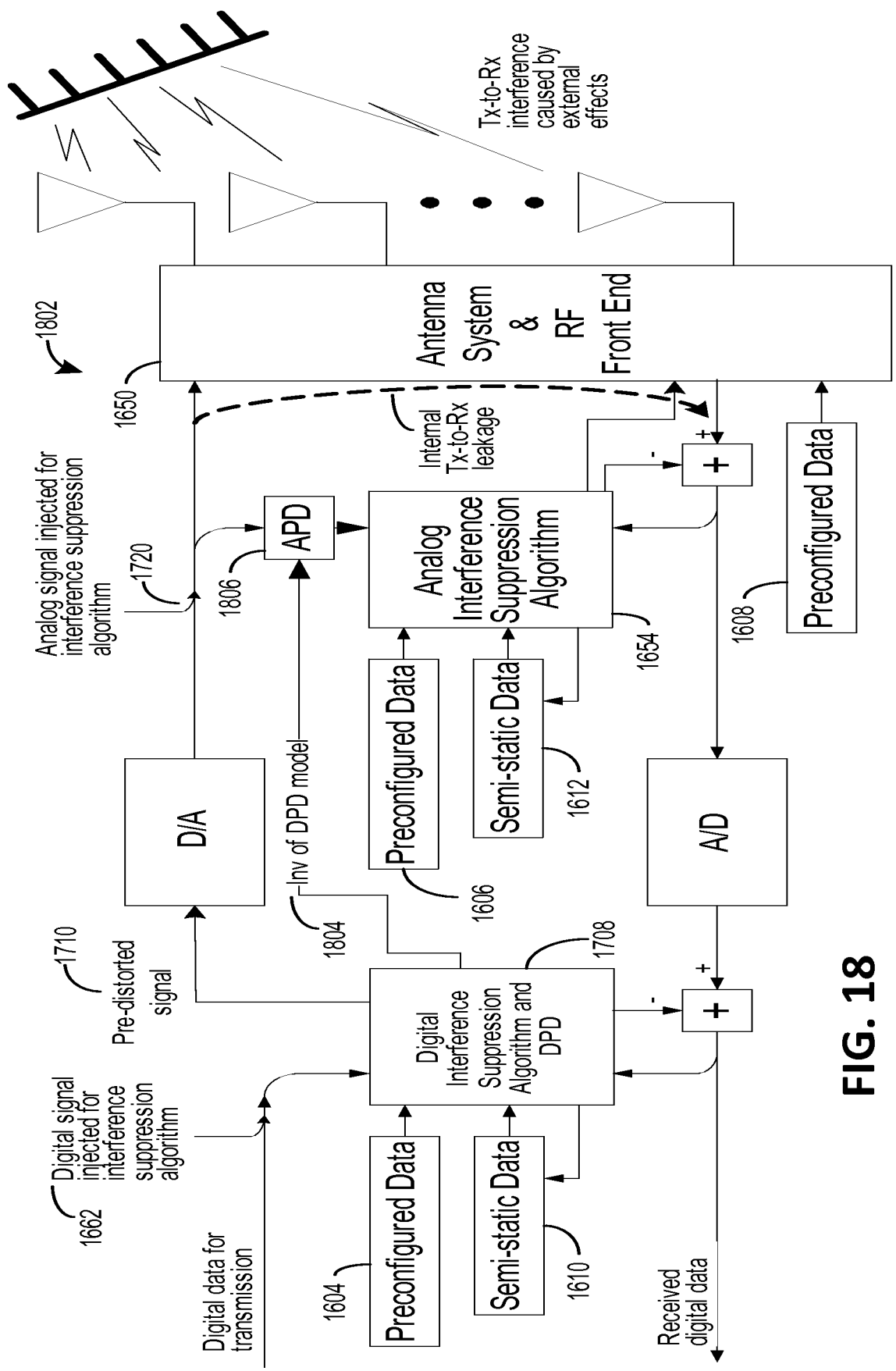
FIG. 18 is an illustration of an another exemplary FDSC architecture with pre-distortion consistent with embodiments.

Embodiments contemplate the use of DPD and/or the use of a model of the PA (or inverse of the DPD) and/or analog pre-distortion (APD) of the analog reference before input to the analog interference suppression process. An example is shown in FIG. 18. In FIG. 18, a transceiver 1802 (WTRU) includes many of the elements as described with reference to FIG. 16 and FIG. 17. Also as seen in FIG. 18, the transceiver 1802 also includes a signal representative of an inverse model of the DPD 1804. Analog pre-distortion (APD) 1806 may be performed on the inverse model of the DPD 1804 and/or the analog signal that includes digital pre-distortion 1720, perhaps before one or both are introduced (e.g., via injection) to the analog interference suppression process 1654.

Figure 19:
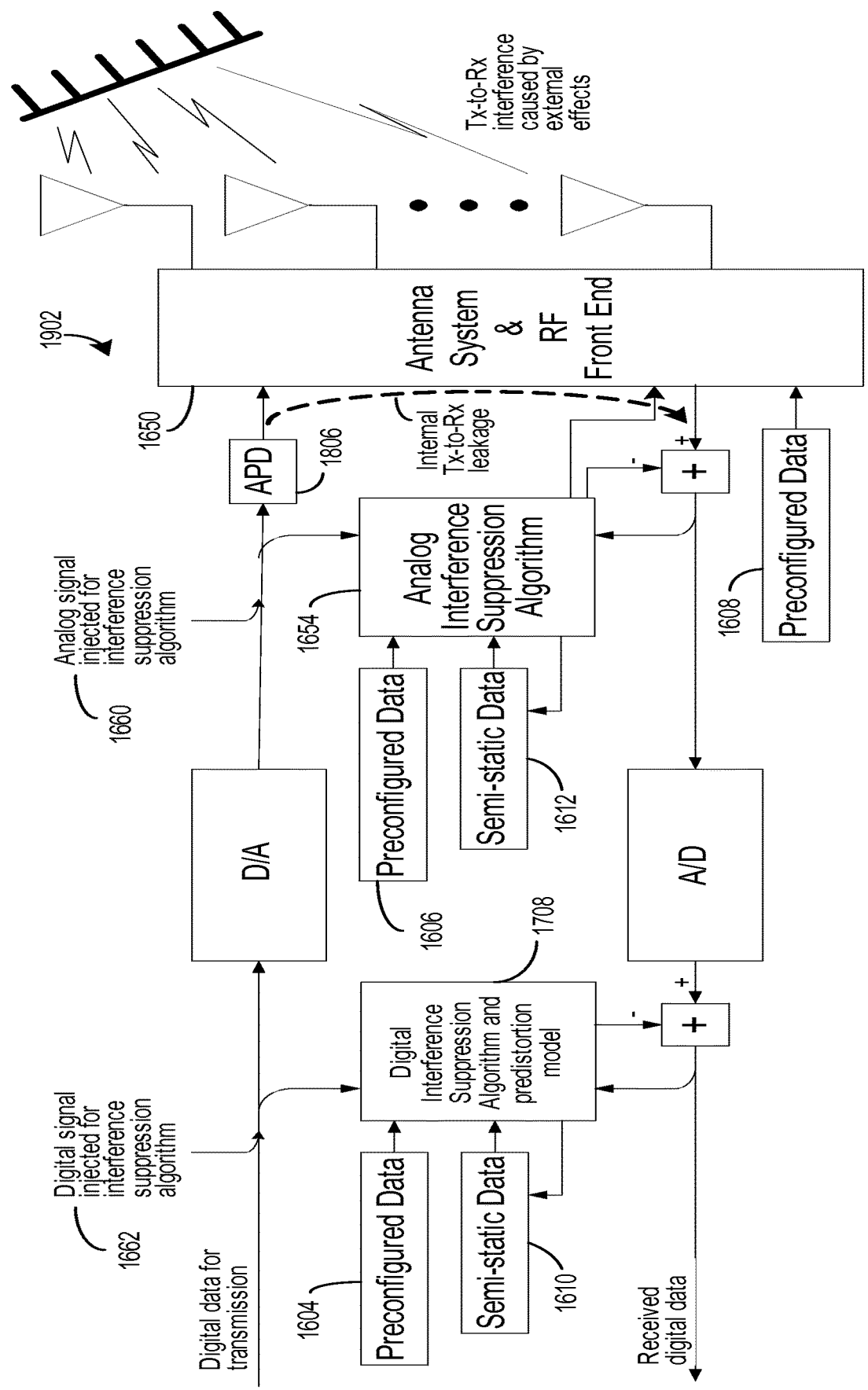
FIG. 19 is an illustration of another exemplary FDSC architecture with pre-distortion consistent with embodiments.

Embodiments contemplate the use of analog pre-distortion, perhaps applied to the signal going to the RF front end (e.g., not the analog interference suppression algorithm). An example is shown in FIG. 19. In FIG. 19, a transceiver 1902 (WTRU) includes many of the elements as described with reference to FIG. 16, FIG. 17, and FIG. 18. Also as seen in FIG. 19, the analog pre-distortion (APD) 1806 may be applied to the analog signal 1660 prior to the application (e.g., via injection) of the analog signal 1660 to the antenna interference suppression process 1650.

Embodiments contemplate that the technique illustrated in FIG. 17 may use additional data converters. The techniques illustrated in FIG. 18 and FIG. 19 may use nonlinear analog processing. In one or more embodiments, the technique of FIG. 19 may not use DPD.

Embodiments contemplate the application of FDSC to OFDM, SC-FDMA, and related signal structures. OFDM and SC-OFDM systems, such as LTE, and multicarrier systems in general, may comprise signals that may use closely spaced, aligned, and/or overlapped carriers and the FDSC techniques described herein may be applied.

Figure 20A:
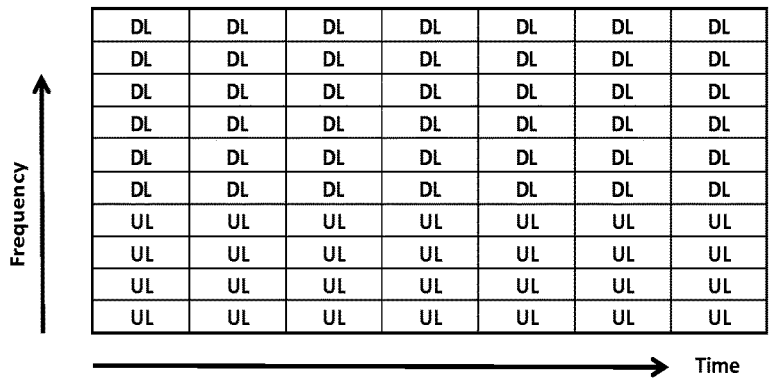
FIGS. 20A-20D illustrate various example allocations of UL and DL resource blocks consistent with embodiments.
Figure 20B:
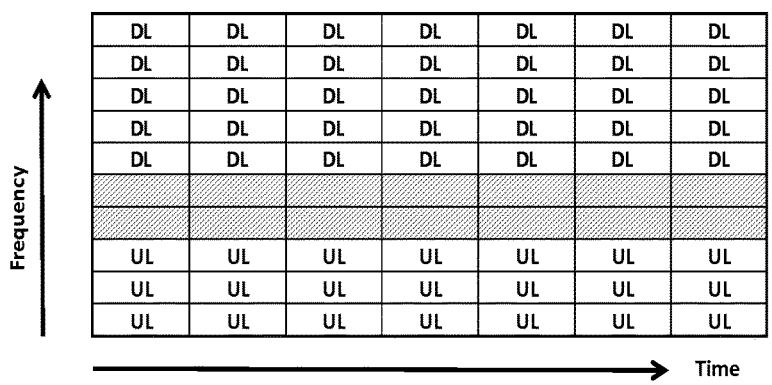
Figure 20C:
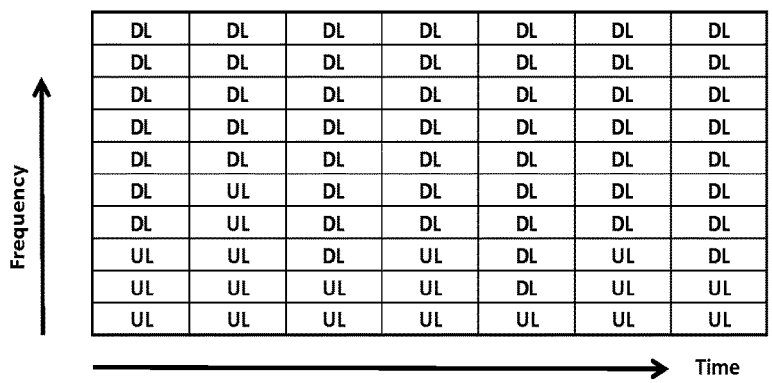
Figure 20D:
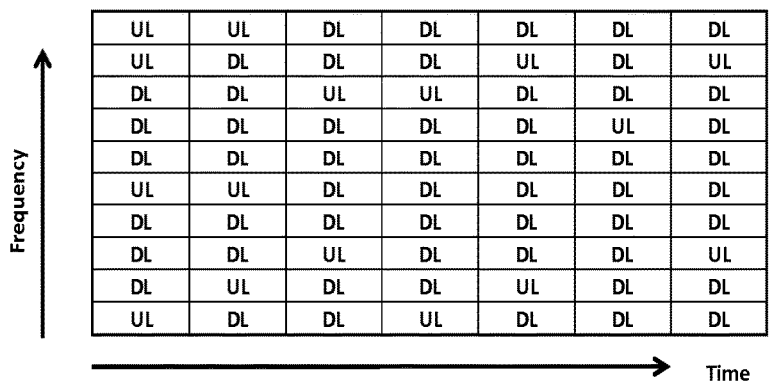

For example, LTE may use a 15 kHz subcarrier called a resource element. Resource elements may be grouped into resource blocks comprising twelve adjacent subcarriers in the frequency domain that may occupy a 0.5-ms slot. FIGS. 20A-20D illustrate various example allocations of UL and DL resource blocks. FIG. 20A shows an allocation of UL and DL resource blocks that may be similar to the zero-band gap approach previously shown, and discussed in reference to FIG. 6. In FIG. 20B several resource blocks may be unallocated to provide a small band gap. In FIG. 20C, the clustering of UL and DL allocations may vary from slot to slot, but remain grouped such that there may be one transition point (and in some embodiments perhaps only one transition point) from DL to UL in the frequency domain. In FIG. 20D, the UL and DL allocations may be distributed across frequency, which may be useful in frequency selective channels.

Embodiments contemplate that this structure may use an extension of the LTE TDD signal format previously shown in FIG. 3 for timeslots that may be allocated for FDSC operation as explained herein. For clarity, FIG. 20A-FIG. 20D are simplified and contemplate but do not show special timeslots, GPs, or other features that may be used for synchronization of control functions.

One or more embodiments contemplate one or more full duplex single channel (FDSC) timeslot configurations in the TDD Mode of LTE. An example frame structure for the TDD mode of LTE was illustrated in FIG. 3. FIG. 21A and FIG. 21B illustrate timeslot configuration alternatives in the TDD mode of LTE. Embodiments recognize at least seven configurations that may be allowed by one or more standards as illustrated in FIG. 21A. U denotes an uplink subframe, D a downlink subframe, and S a special subframe that may comprise the DwPTS, guard period, and/or UpPTS. Subframes 0, 1, 2 and 5, outlined in bold, may have fixed assignments. The other subframes may be assigned as uplink or downlink, for example.

In one or more embodiments, an S subframe may be used when switching from downlink to uplink, but perhaps in some embodiments not when switching from uplink to downlink. The guard time within the S subframe may allow time for a radio to switch between receive and transmit, and in some embodiments may allow a timing advance at a WTRU to operate such that the uplink transmission may not overlap a downlink timeslot.

FIG. 21B shows several additional example frame configurations. One or more, or every, configuration may retain subframe 1 as an S. Configuration 7 may be similar to configuration 0 in that it may have two S's each surrounded by dedicated D and U subframes. The remaining subframes may be assigned as FDSC denoted with an F. Configuration 8 may be similar to configuration 5. Subframes 3 to 9 may be assigned as F rather than D, for example. Additional configurations are shown, and many others can be constructed based on the disclosure. Further, one or more of the described configurations may be used in combination, either in whole or in part.

In a TDD system, a WTRU transmitting an uplink signal can interfere with a WTRU receiving a downlink signal. One or more embodiments contemplate that a subframe may be designated as FDSC. In some embodiments, the algorithm that may assign one or more WTRUs to a subframe for uplink and/or downlink operation, and/or that may also assign parameters of the transmission (for example, transmit power), may also manage the interference and/or may assure that one or more downlink signals and/or one or more uplink signals can be demodulated (e.g., one or more algorithms described herein). Although a subframe may be designated as F, in some embodiments, the subframe may operate as U or D, for example to control interference.

In some embodiments, F frames may be used without S frames (or a guard period) between them. In such embodiments, an uplink transmission with timing advance may overlap with downlink signals in the same subframe and/or in the previous subframe. The algorithm that may assign one or more WTRUs to a subframe for uplink and/or downlink operation may avoid interference to one or both subframes.

Multi-cell TDD systems may use the same subframe configuration in one or more, or all, cells, perhaps to avoid inter-cell uplink-to-downlink and/or downlink-to-uplink interference. Embodiments recognize that, perhaps if FDSC may be used in a multi-cell deployment, both types of interference may be possible. The algorithm that may assign one or more WTRUs to a subframe for either uplink or downlink operation may assign subframes, and/or may assign parameters (for example, transmit power), to avoid such interference. In some embodiments, measurements may be exchanged between cells to facilitate avoidance of interference.

Embodiments contemplate subframe combinations other than those illustrated in FIG. 21B. For example, in some embodiments, the S subframe may be used for backwards compatibility. In embodiments in which that may not be a concern, the S subframe may be eliminated. U, D, and/or F subframes may subsume control and/or guard period functions that may have been previously handled by one or more S subframes under control of the subframe assignment algorithm, for example.

Figure 22:
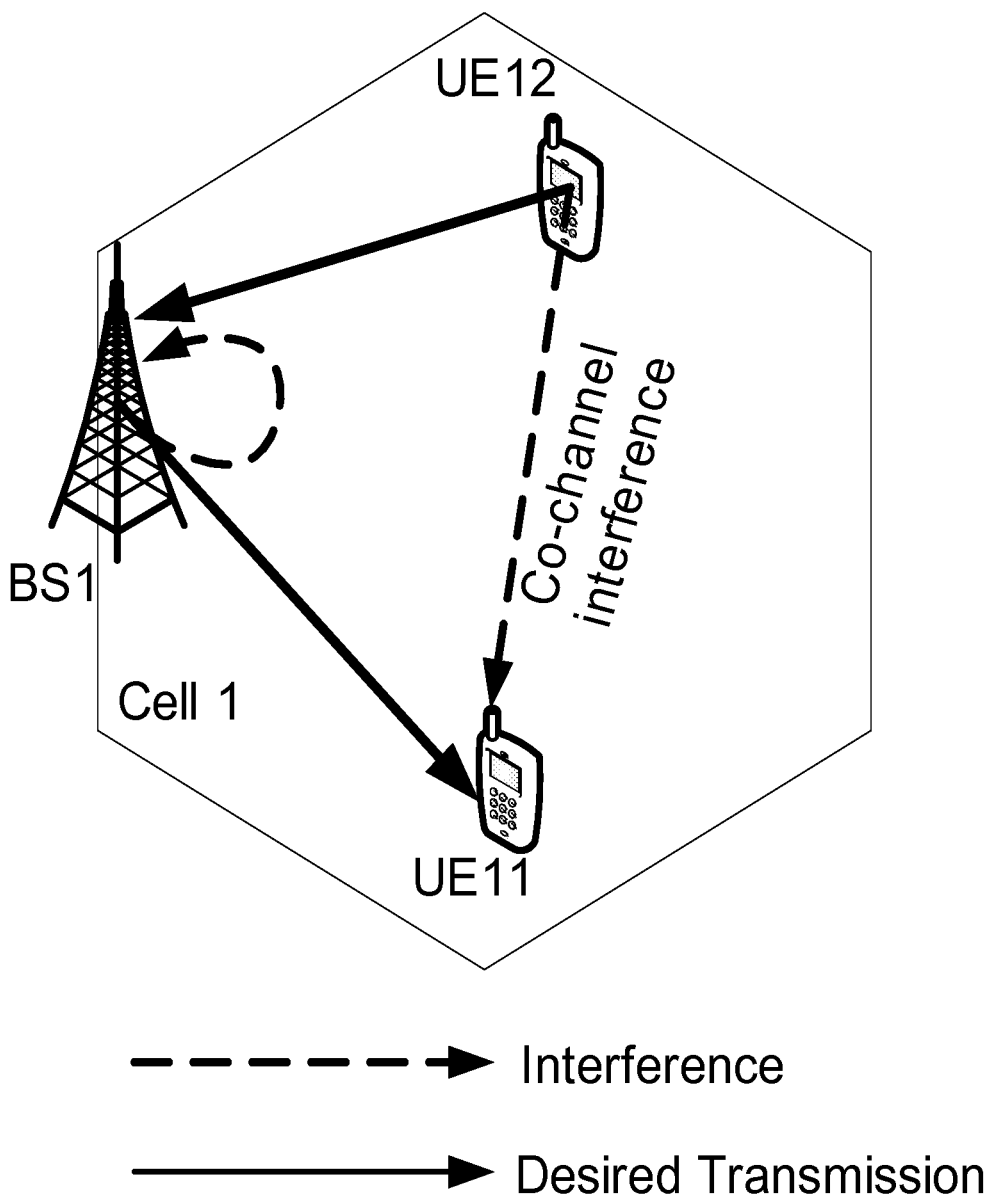
FIG. 22 is an illustration of example interference patterns in a single cell with a full duplex base station and half duplex user equipment (UEs or wireless transmit/receive unit WTRUs), consistent with embodiments.
Figure 23:
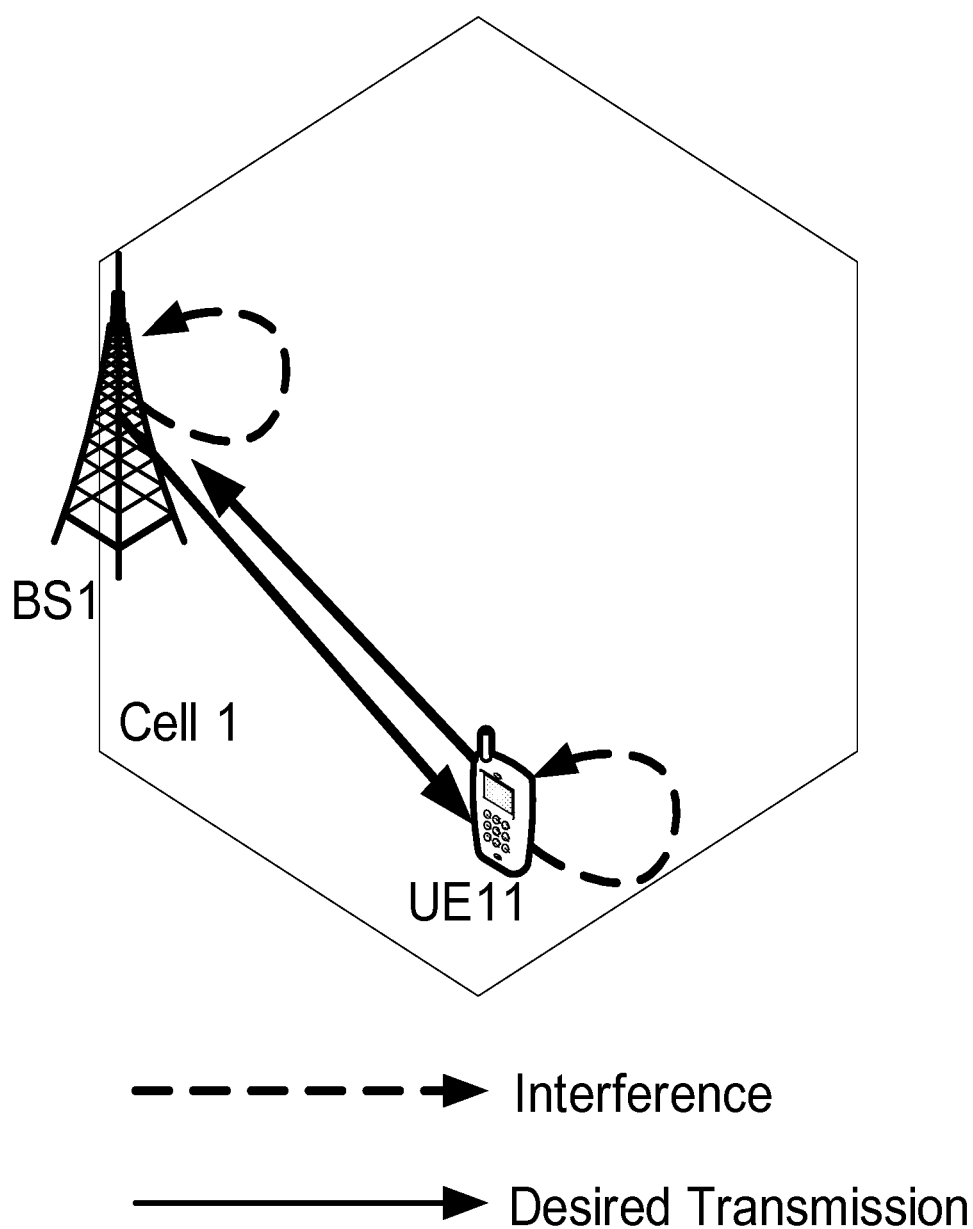
FIG. 23 is an illustration of example interference patterns in a single cell with a full duplex base station and a full duplex user equipment (UE or wireless transmit/receive unit WTRU), consistent with embodiments.

Embodiments contemplate that full-duplex (FD) radio may have the potential to improve the spectral efficiency. Embodiments also contemplate that the co-channel interference due to simultaneous transmissions from different nodes (base station or UE) could degrade the overall system performance. One or more embodiments contemplate systems that may include a FD BS and/or multiple half-duplex (HD) WTRUs or FD WTRUs in one or more, or each, cell. For HD WTRUs, the FD BS can communicate with at least two UEs, one in the downlink (DL) direction and one in the uplink (UL) direction simultaneously, perhaps over single channel or sub-channel. FIG. 22 shows a single cell scenario with HD WTRUs. FIG. 22 shows an example in which the received signal at UE11 may include interference from the UE12 and the received signal at the BS1 may include residual self-interference. Embodiments contemplate similar interference issue management techniques for FD UEs, for example as shown in FIG. 23. Embodiments contemplate that those interferences could degrade the performance of the system. Embodiments also contemplate that the issues described herein could be more complicated in multi-cell scenarios, in which signals transmitted by FD BS or WTRUs from one cell could create interference to the receivers (FD BS or UEs) in other cells, among other scenarios, for example.

In some embodiments, perhaps to mitigate the damage that may be due to those interference, among other reasons, the transmit power from the BS and/or the WTRU in UL direction may be controlled (e.g., carefully controlled). One or more embodiments contemplate a closed form technique to set the powers of those nodes, perhaps jointly. In some embodiments, it may be assumed that one or more, or all, pathlosses, self-interference cancellation gains, and/or noise powers may be known. One or more embodiments contemplate application of the techniques described herein to system architectures, such as those with centralized baseband process and/or control.

Embodiments contemplate the following exemplary symbol definitions and/or acronyms for purposes of explanation and not limitation:

P_x: Transmit power from node x;
$PG_{x \to y}$: Path gain from node x to node y. It may be a real value between 0 and 1;
$SINR_x$: Required received SINR at node x;
G_x: Self Interference cancellation gain at node x. It may be a real value between 0 and 1;
N_x: Noise power at the node x; and/or
$T_{x \to y}$: Intra-cell interference power gain from node x to node y, due to path gain from node x to node y (e.g., if x and y are distinct nodes), or due to self-interference cancellation gain at node x (e.g., if x and y are the same node)

In some embodiments, a BS node in i-th cell may be labeled as BSi. An WTRU node may be labeled as UEij, where i is the index of BS which the WTRU may be connected to, and j is the index of WTRU in the i-th cell.

In some embodiments, for cell m, UEm1 may receive DL signal, and UEm2 may transmit UL signal. In some embodiments, the BS nodes may be (perhaps always may be) in the full duplex mode, transmitting and receiving at the same time. A FDSC capable WTRU may be in the full duplex mode, transmitting UL signal to its serving BS, and receiving DL signal from its serving BS. In such scenarios, UEm1 and UEm2 may represent the same UE, and different notation may be used to distinguish the DL and UL transmission (perhaps only the DL and UL transmission). The self-interference power at UEm2 (or UEm1) may be denoted as $P_{UEm2}G_{UEm2}$. In some embodiments, perhaps if the serving WTRUs in cell m may be in the half duplex mode, UEm1 and UEm2 may represent distinct UEs. One or more, or each of UEm1 and/or UEm2 may be an FDSC capable UE, perhaps in the half duplex mode due to scheduling. One or more, or each, of them may be a WTRU that might not be FDSC capable and may (perhaps may only) transmit/receive in the half duplex mode. In such scenarios, in the half duplex mode, the interference power from UEm2 to UEm1 may be denoted as $P_{UEm2}PL_{Uem2 \to UEm1}$. In some embodiments, for notation simplicity, the intra-cell interference power at the DL WTRU UEm1, either due to self-interference when it may be in the full duplex mode or due to intra-cell interference from the UL WTRU UEm2 when it may be in the half duplex mode, could be expressed as:

$$P_{UEm2}T_{UEm2 \to UEm1}$$

where the intra-cell interference power loss from UEm2 to UEm1 may be:

$$T_{UEm2 \to UEm1} = G_{UEm2}$$

perhaps when it may be in the full duplex mode, among other scenarios, and may be:

$$T_{UEm2 \to UEm1} = PG_{UEm2 \to UEm1}$$

perhaps when it may be in the half duplex mode, among other scenarios.

One or more embodiments contemplate single cell scenarios. In scenarios such as shown in FIG. 22, the serving WTRUs may be in the half duplex mode. Given a desired received SINR at the BS1 and UE11, the transmit power from the BS1 and the UE12 may (and in some embodiments perhaps should) satisfy the following equations:

$$PG_{UE12 \to BS1}P_{UE12} = SINR_{BS1}(G_{BS1}P_{BS1} + N_{BS1}) \quad (7)$$

$$PG_{BS1 \to UE11}P_{BS1} = SINR_{UE11}(PG_{UE12 \to UE11}P_{UE12} + N_{UE11}) \quad (8)$$

In scenarios as shown in FIG. 23, the single serving UE (or WTRU) may be in the full duplex mode. Given a desired received SNR at the BS1 and UE11, the transmit power from the BS1 and the UE11 may (and in some embodiments, perhaps should) satisfy the following equations:

$$PG_{UE11 \to BS1}P_{UE11} = SINR_{BS1}(G_{BS1}P_{BS1} + N_{BS1}) \quad (9)$$

$$PG_{BS1 \to UE11}P_{BS1} = SINR_{UE11}(G_{UE11}P_{UE11} + N_{UE11}) \quad (10)$$

In some embodiments, UE11 and UE12 may represent the DL and UL UEs, respectively. In some embodiments, such as those in the full duplex mode, UE11 and UE12 actually refer to the same UE. In some embodiments, by using the notation of the intra-cell interference power loss from UE12 to UE11, the transmit power equations (7) and (8) in the half duplex mode and equations (9) and (10) in the full duplex mode could be unified into the following:

$$PG_{UE12 \to BS1}P_{UE12} = SINR_{BS1}(G_{BS1}P_{BS1} + N_{BS1}) \quad (11)$$

$$PG_{BS1 \to UE11}P_{BS1} = SINR_{UE11}(T_{UE12 \to UE11}P_{UE12} + N_{UE11}) \quad (12)$$

In some embodiments, perhaps where $P = (P_{UE12} \ P_{BS1})^T$. The above two equations can be expressed as:

$$AP = b$$

where $$A = \begin{pmatrix} PG_{UE12 \to BS1} & -SINR_{BS1}G_{BS1} \\ -SINR_{UE11}T_{UE12 \to UE11} & PG_{BS1 \to UE11} \end{pmatrix}$$

and $$b = \begin{pmatrix} SINR_{BS1}N_{BS1} \\ SINR_{UE11}N_{UE11} \end{pmatrix}$$

In some embodiments, perhaps since matrix A may be a singular matrix, among other reasons, there may be no joint solutions for Equations (11) and (12). Some embodiments may assume the BS1 can cancel the self-interference completely or with a fixed residual power. In such scenarios, $P_{BS1}G_{BS1}$ in Eq. (11) may be zero or a constant and perhaps two powers can be computed. In some embodiments, both powers may be smaller than expected such that the desired SINRs might not be achieved. In some embodiments, the base station power could be set based on CQI feedback from UE11. In such scenarios, the residual power $P_{BS1}G_{BS1}$ can be computed accordingly. In some embodiments, $P_{BS1}$ may be set based on other contemplated rule(s) (e.g., as in LTE). In such scenarios, $P_{UE12}$ may be computed according to Eq. (11).

Figure 24:
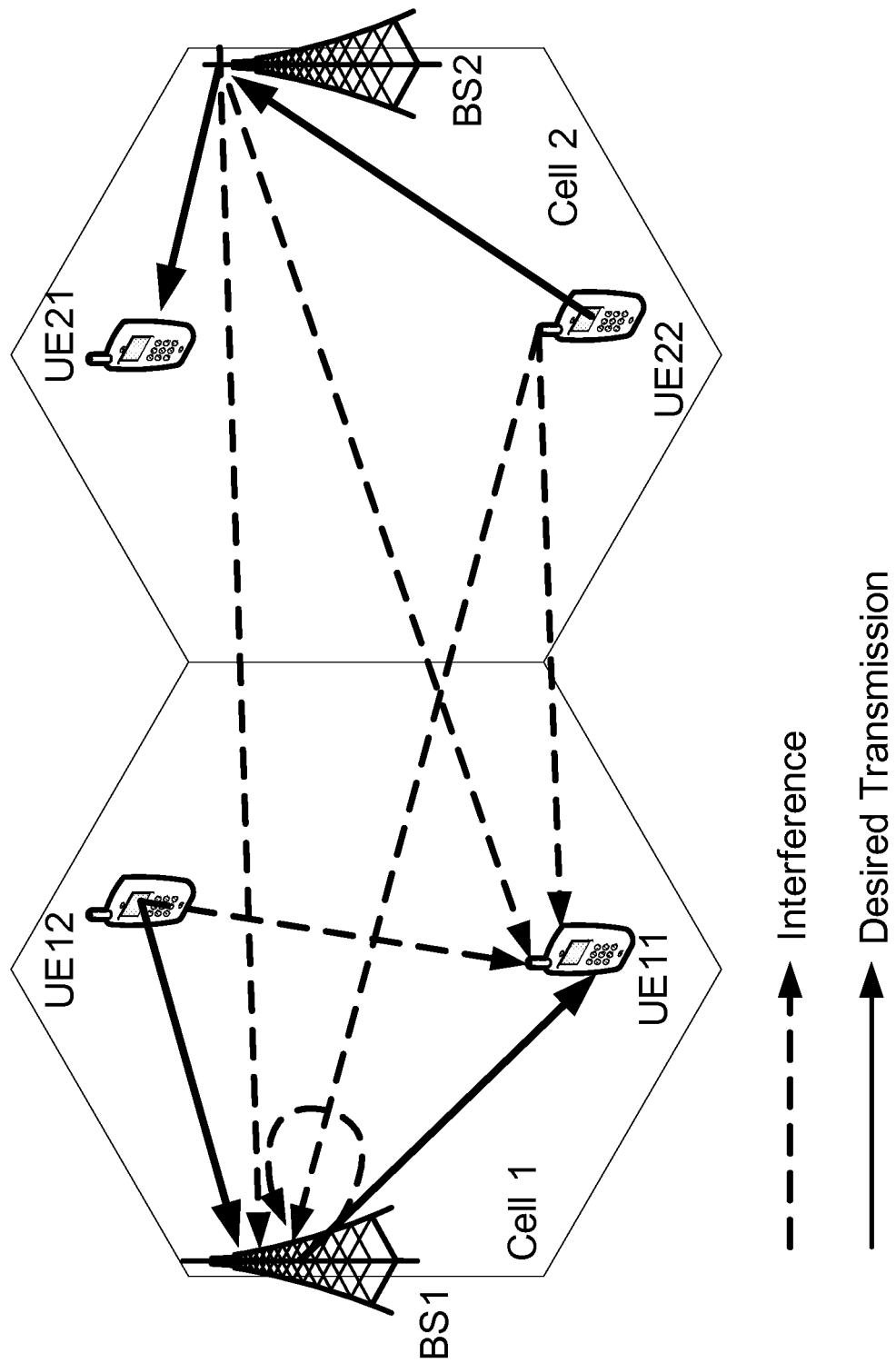
FIG. 24 is an illustration of example interference patterns in a dual cell with full duplex base stations and half duplex user equipment (UEs or wireless transmit/receive units WTRUs) consistent with embodiments.

One or more embodiments contemplate at least two cell scenarios. In such scenarios, the power setting may account for (and in some embodiments may need to account for) inter-cell interferences. FIG. 24 depicts the example scenario when one or more, or all, WTRUs (UEs) in both cells may be in the half duplex mode. In FIG. 24, for clarity, only the interferences from Cell 2 to Cell 1 are shown (e.g., interferences from Cell 1 to Cell 2 may occur, but are not shown). In some embodiments, perhaps following the same idea in a single cell scenario, the transmit powers from four nodes in two cells can be expressed as:

$$PG_{UE12 \to BS1}P_{UE12} =$$
$$SINR_{BS1}(PG_{BS2 \to BS1}P_{BS2} + PG_{UE22 \to BS1}P_{UE22} + G_{BS1}P_{BS1} + N_{BS1})$$
$$PG_{UE22 \to BS2}P_{UE22} =$$
$$SINR_{BS2}(PG_{BS1 \to BS2}P_{BS1} + PG_{UE12 \to BS2}P_{UE12} + G_{BS2}P_{BS2} + N_{BS2})$$
$$PG_{BS1 \to UE11}P_{BS1} = SINR_{UE11}(PG_{UE12 \to UE11}P_{UE12} +$$
$$PG_{BS2 \to UE11}P_{BS2} + PG_{UE22 \to UE11}P_{UE22} + N_{UE11})$$
$$PG_{BS2 \to UE21}P_{BS2} = SINR_{UE21}(PG_{UE22 \to UE21}P_{UE22} +$$
$$PG_{BS1 \to UE21}P_{BS1} + PG_{UE12 \to UE21}P_{UE12} + N_{UE21})$$

One or more embodiments contemplate a general scenario, such as when the serving UE(s) in one or more, or each, cell may be in the full duplex mode or half duplex mode, the transmit powers from four nodes in two cells can be expressed as the same as above with $PG_{UE12 \to UE11}$ being replaced by $T_{UE12 \to UE11}$ and $PG_{UE22 \to UE21}$ being replaced by $T_{UE22 \to UE21}$, where UEm1 and UEm2 may represent the DL and UL WTRUs in cell m, and $T_{UEm2 \to UEm1}$ may represent the intra-cell power loss from UEm2 to UEm1, as described herein.

In some embodiments, $$P = (P_{UE12}, P_{UE22}, P_{BS1}, P_{BS2})^T$$

In such scenarios, the above equations can be expressed in matrix format $$AP = b$$

where $A = (a_{ij}, i, j = 1, \ldots, 4)$ is a 4 by 4 matrix with $$A = \begin{pmatrix} PG_{UE12 \to BS1} & -SINR_{BS1}PG_{UE22 \to BS1} & -SINR_{BS1}G_{BS1} & -SINR_{BS1}PG_{BS2 \to BS1} \\ -SINR_{BS2}PG_{UE12 \to BS2} & PG_{UE22 \to BS2} & -SINR_{BS2}PG_{BS1 \to BS2} & -SINR_{BS2}G_{BS2} \\ -SINR_{UE11}PG_{UE12 \to UE11} & -SINR_{UE11}PG_{UE22 \to UE11} & PG_{BS1 \to UE11} & -SINR_{UE11}PG_{BS2 \to UE11} \\ -SINR_{UE21}PG_{UE12 \to UE21} & -SINR_{UE21}PG_{UE22 \to UE21} & -SINR_{UE21}PG_{BS1 \to UE21} & PG_{BS2 \to UE21} \end{pmatrix}$$

and:

$$b = \begin{pmatrix} SINR_{BS1}N_{BS1} \\ SINR_{UE11}N_{BS2} \\ SINR_{BS2}N_{UE11} \\ SINR_{UE21}N_{UE21} \end{pmatrix}$$

In some embodiments, the matrix A may be non-singular. In some embodiments, there may be a unique solution for one or more, or all, the powers in P to perhaps achieve their desired received SINR. In some embodiments, the powers for one or more, all, transmitting nodes may depend on one or more (or all) of a desired received SINR, path gains, self-cancellation gains, and/or noise power, for example.

One or more embodiments contemplate extensions of the 2-cell scenario to any number (M≥2) of cells, which may interfere with each other. At any given time, one or more, or each, cell may have at least one WTRU transmitting a signal to its BS in uplink (UL) and/or one WTRU receiving a signal from the BS in downlink (DL). For cell m, UEm1 may receive DL signal, and/or UEm2 may transmit UL signal. In some embodiments, the transmit power from UEm2, for m=1, ..., M, may be set (and in some embodiments perhaps should be set) as:

$$G_{UEm2 \to BSm}P_{UEm2} - \qquad (13)$$
$$SINR_{BSm}\left(\sum_{\substack{i=1 \\ i \neq m}}^{M}(PG_{BSi \to BSm}P_{BSi} + PG_{UEi2 \to BSm}P_{UEi2}) + G_{BSm}P_{BSm}\right) =$$
$$SINR_{BSm}N_{BSm}$$

In some embodiments, the transmit power from BSm for m=1, ..., M may be set (and in some embodiments perhaps should be set) as:

$$P_{BSm}PG_{BSm \to UEm1} - SINR_{UEm1}\left(P_{UEm2}T_{UEm2 \to UEm1} + \qquad (14)\right.$$
$$\left.\sum_{\substack{i=1 \\ i \neq m}}^{M}(P_{BSi}PG_{BSi \to UEm1} + P_{UEi2}PG_{UEi2 \to UEm1})\right) =$$
$$SINR_{UEm1}N_{UEm1}$$

In some embodiments, $$P = (P_{UE12}, P_{UE22}, \ldots, P_{UEM2}, P_{BS1}, P_{BS2}, \ldots, P_{BSM})^T$$

Equations (13) and (14), for m=1, ..., M, can be expressed in matrix format $$AP = b$$

where in some embodiments, A may be a 2M×2M matrix with elements that may be the coefficients of $P_{UE12}$, $P_{UE22}$, ..., $P_{UEM2}$, $P_{BS1}$, $P_{BS2}$, ..., $P_{BSM}$ in equations (13) and (14).

In some embodiments, the vector b may be a 2M dimensional vector, which can be expressed as:

$$b = (SINR_{BS1}N_{BS1}, \ldots, SINR_{BSM}N_{BSM}, SINR_{UE11}N_{UE11} \ldots, SINR_{UEM1}N_{UEM1})^T$$

and in some embodiments, the matrix A may be non-singular, such as for M≥2.

One or more embodiments recognize that some standards and/or regulations may limit the maximum transmit power for different types of nodes in the network. In some embodiments, the transmit power generated using one or more of the techniques described herein may (and in some embodiments, perhaps should) be bounded by the specified maximum transmit power.

Embodiments contemplate that one or more of the calculations described herein may be included in a scheduling algorithm to pair the DL and UL UEs, and/or selection of FD or HD operations. In some embodiments, the algorithm may utilize centralized control. Some embodiments contemplate one or more simplifications.

In some embodiments, perhaps if the base station power may be set based on other rules (e.g., CQI reports from DL UEs), among other scenarios, one or more of the techniques described herein to find the transmit power of WTRUs may be applied. In some embodiments, the number of cells, M, may be (and in some embodiments perhaps may need to be) larger than 2. In some embodiments, a WTRU may be a user equipment (UE), a relay node (RN), or mobile terminal (MT), among other wireless devices.

Embodiments contemplate the following exemplary symbol definitions and/or acronyms for purposes of explanation and not limitation: λ—Wavelength; ACK—Acknowledgment; AP—Access point; APD—Analog predistortion; BS—Base station; CL—Coupling loss; CRC—Cyclic redundancy check; d—Distance between transmitter and receiver; DBB—Digital baseband; DPD—Digital predistortion; DL—Downlink; DwPTS—Downlink pilot timeslot; EVM—Error vector magnitude; FD—Full duplex; FD-MAC—Full duplex MAC layer; FD-PHY—Full duplex PHY layer, FDD—Frequency division duplex; FDSC—Full duplex single channel; GP—Guard period; $G_{Tx}$—Tx antenna gain; $G_{Rx}$—Rx antenna gain; HD—Half duplex; LAN—Local area network; MCS—Modulation coding set; NACK—Negative acknowledgment; OOBE—Out of band emissions; PA—Power amplifier, PAN—Personal area network; PIC—Parallel interference cancellation; PL—Propagation loss; $P_{Rx}$—Rx power; $P_T$, $P_{Tx}$—Tx power; RF—Radio frequency; RRM—Radio resource management; Rx—Receive; SIC—Successive interference cancellation; SNR—Signal-to-noise ratio; TDD—Time division duplex; Tx—Transmit; TVWS—Television white space; UE—User equipment; UL—Uplink; UpPTS—Uplink pilot timeslot; and WTRU—wireless transmit/receive unit.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A base station, the base station for communicating with one or more wireless transmit/receive units (WTRUs), the base station comprising:
    a memory; and
    a processor, the processor configured to:
        allocate a first full duplex timeslot of a frame of a communication channel to full duplex single channel (FDSC) communication;
        allocate a second full duplex timeslot of the frame of the communication channel to FDSC communication;
        communicate with a first WTRU via FDSC using the first full duplex timeslot; and
        send a downlink half duplex (HD) communication to a second WTRU and receive an uplink HD communication from a third WTRU using the second full duplex timeslot that is allocated to FDSC communication.

2. The base station of claim 1, wherein the processor is further configured such that the first full duplex timeslot is used exclusively by the base station for communication with the first WTRU.

3. A method performed by a base station, the base station for communication with one or more wireless transmit/receive units (WTRUs), the method comprising:
    allocating a first full duplex timeslot of a first frame of a first communication channel to full duplex single channel (FDSC) communication;
    allocating a second full duplex timeslot of the first frame of the first communication channel to FDSC communication;
    communicating with a first WTRU via FDSC via the first full duplex timeslot; and
    sending a downlink half duplex (HD) communication to a second WTRU and receiving an uplink HD communication from a third WTRU using the second full duplex timeslot that is allocated to FDSC communication.

4. The method of claim 3, further comprising conducting the communication with the first WTRU exclusively via the first full duplex timeslot.

* * * * *